United States Patent [19]

Aten et al.

[11] Patent Number: 4,674,652

[45] Date of Patent: Jun. 23, 1987

[54] CONTROLLED DISPENSING DEVICE

[76] Inventors: Edward M. Aten, 328 Plantation Rd., Bristol, Va. 24201; Larry E. Parkhurst, 1707 Hawthorn Pl., Boulder, Colo. 80302

[21] Appl. No.: 722,073

[22] Filed: Apr. 11, 1985

[51] Int. Cl.[4] ........................ B65B 59/00; G06F 15/20

[52] U.S. Cl. .......................................... 221/3; 221/15; 221/71; 221/265; 364/479

[58] Field of Search .................. 222/1; 186/55; 221/3, 221/5, 9, 13, 15, 25, 30-31, 71-74, 265-266, 263-264; 340/309.3, 309.4, 309.15; 206/531, 532, 534; 364/479

[56] References Cited

U.S. PATENT DOCUMENTS

| | | | |
|---|---|---|---|
| 772,503 | 10/1904 | Dodson | 221/71 X |
| 1,845,879 | 2/1932 | Knee | 221/3 X |
| 2,941,643 | 6/1960 | Donnelly | 221/9 X |
| 3,131,830 | 5/1964 | Schaef | 221/25 |
| 3,369,697 | 2/1968 | Glucksman et al. | 221/154 X |
| 3,815,780 | 6/1974 | Bauer | 221/15 |
| 3,917,045 | 11/1975 | Williams et al. | 221/15 X |
| 3,968,900 | 7/1976 | Stambuk | 221/3 |
| 3,984,030 | 10/1976 | Morini | 221/30 |
| 3,985,264 | 10/1976 | Shaw et al. | 221/13 X |
| 4,223,801 | 9/1980 | Carlson | 221/3 |
| 4,293,845 | 10/1981 | Villa-Real | 340/309.3 |
| 4,572,403 | 2/1986 | Benaroya | 221/15 X |

*Primary Examiner*—Joseph J. Rolla
*Assistant Examiner*—Michael S. Huppert
*Attorney, Agent, or Firm*—Cushman, Darby & Cushman

[57] ABSTRACT

A controllable dispensing device for use by a drug therapist for the unsupervised administration to a patient of a drug therapy regimen. A field unit is loaded with a plurality of medication containers in a predetermined sequence. Along with the medication, a program of dosing times is stored in an electronic memory of the field unit. This program is defined using a computerized base unit and is transferred to the field unit via an interface between the base and field units. The field unit includes a display and alarm for altering the patient as to the times for dispensing and administering the medications in the containers. The field unit permits dispensing of containers only in accordance with the predefined schedule and records the actual times of container dispensing. Later, the field unit can be debriefed by the base unit via the interface and the base unit prepares a report of medication compliance for the drug therapist.

88 Claims, 31 Drawing Figures

FIG. 3
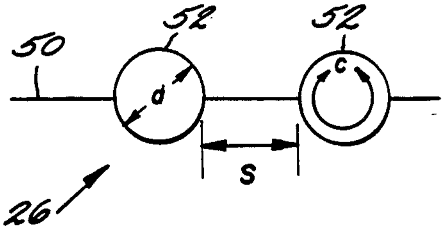
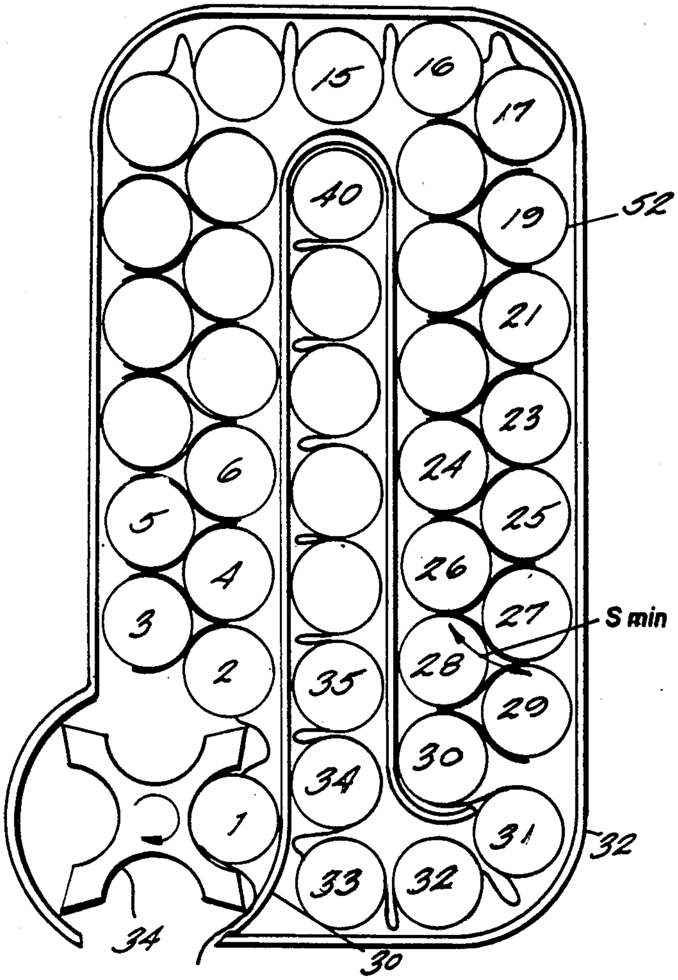
FIG. 4
FIG. 5
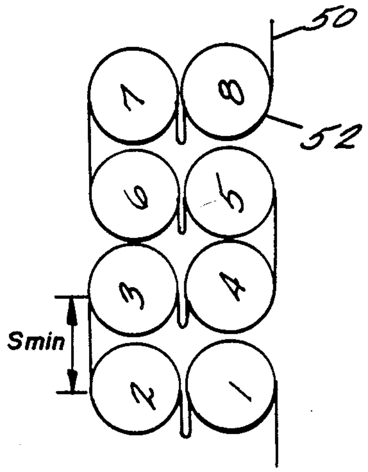
FIG. 6
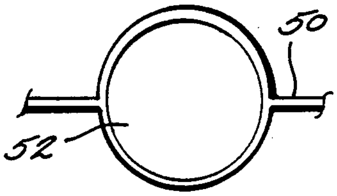
FIG. 7
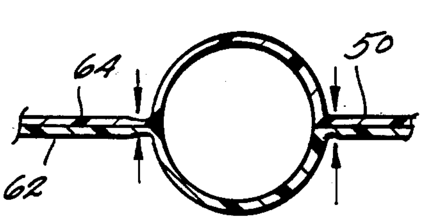
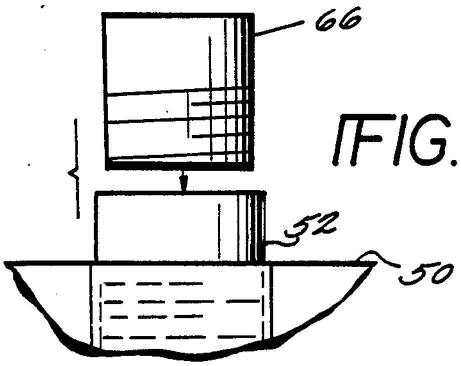
FIG. 9
FIG. 8
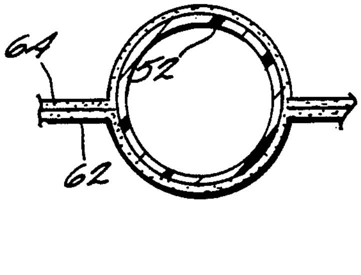

FIG. 10
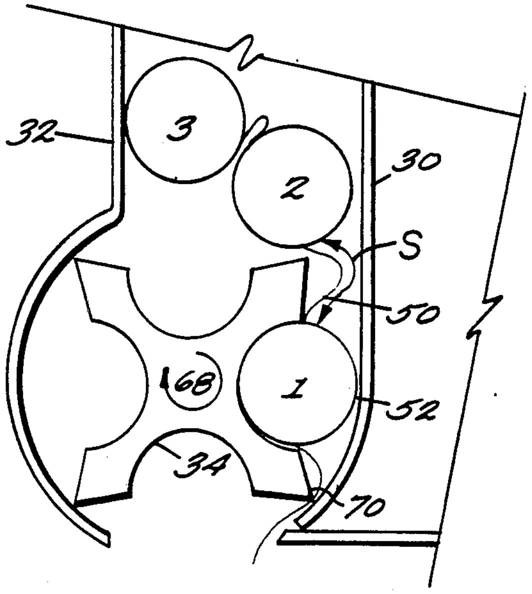
FIG. 11
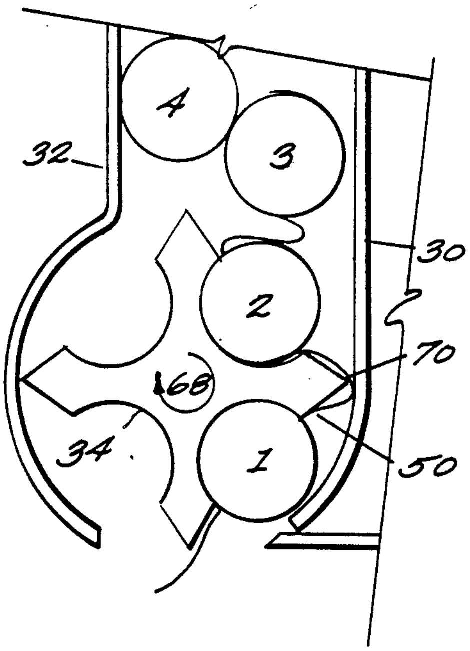
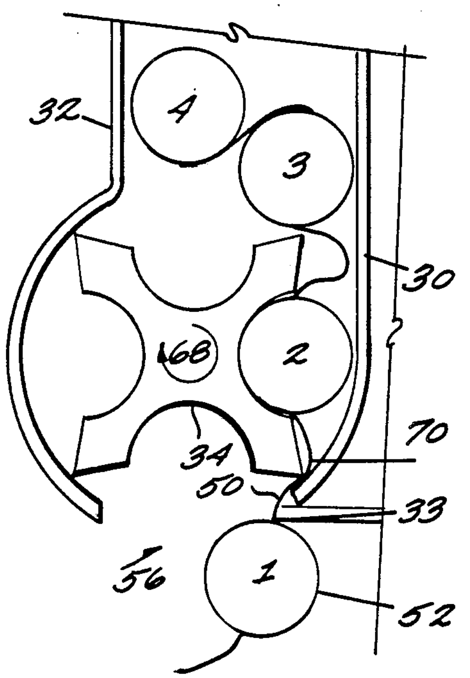
FIG. 12

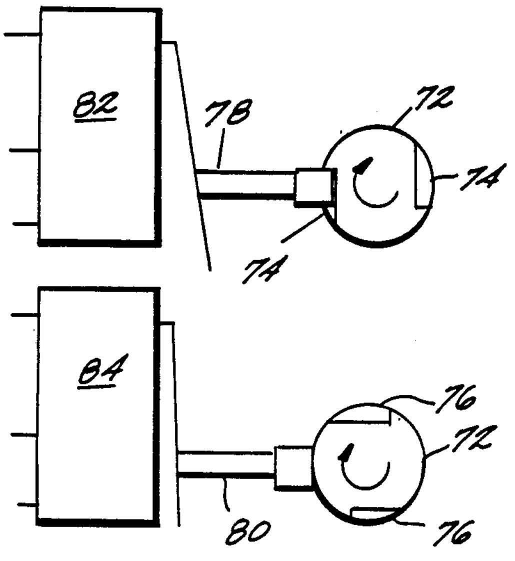
FIG. 15
FIG. 16
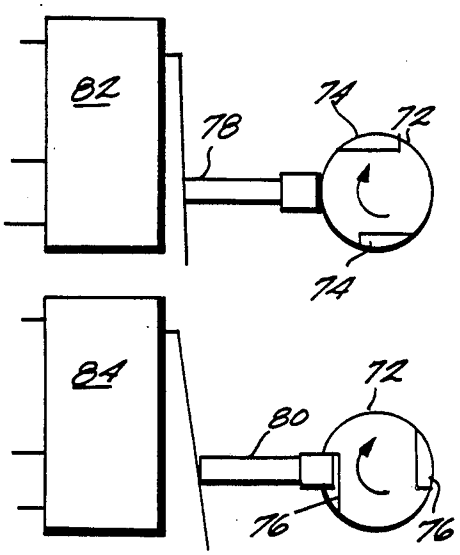
FIG. 13
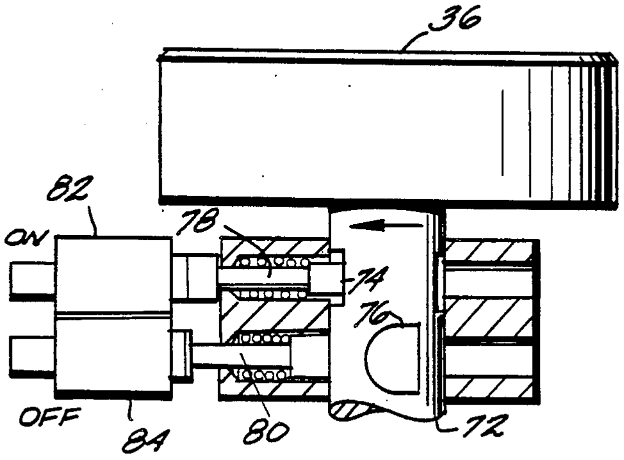
FIG. 14
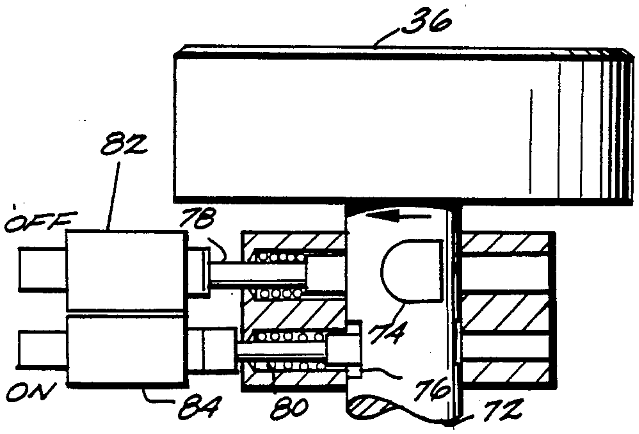

(SEE APPENDIX I FOR DETAILED LISTINGS)

CONTROLLED DISPENSING DEVICE

BACKGROUND OF THE INVENTION

1. Field Of The Invention

This invention relates generally to the art of controlled dispensing and compliance monitoring. It has particular application to the art of unsupervised drug dispensing to a patient although the principles of the invention apply to controllable dispensers of any types of material. The presently preferred embodiment of the invention provides a controlled medication dispenser. The dispenser can be preprogrammed by a drug therapist using a base unit (specially programmed computer) to which the dispenser is temporarily coupled, to permit a patient access to drugs stored in a portable field unit only in accordance with predetermined criteria, such as for example at particular times. A digital display on the dispenser specifies the next dosing time and will instruct the patient on proper make-up doses in the event of missed doses. The portable field unit records actual times of medication dispensing and can easily be debriefed by the base unit (computer) which then prepares a medication compliance report for the drug therapist.

2. Background Of The Invention

"Controlled dispensing" refers to the concept of permitting a user to dispense some item according to a predetermined schedule or set of rules, rather than permitting unrestrained access. A significant application of the art of controlled dispensing relates to drug dispensing.

"Compliance monitoring" refers to the concept of recording a user's actual dispensing activity compared to a previously prescribed regimen. A significant application to the art of compliance monitoring also relates to drug therapy.

As drug research and therapy become more and more sophisticated, drug researchers and therapists have an increasing need to administer complex drug regimens to patients; to restrict access to medications in some instances; and to evaluate the patients' compliance with those drug regimens.

The most accurate way of administering a drug regimen and measuring compliance of a patient or test subject is direct supervision of each dose of medication. The manpower required for this type of drug administration is extraordinary and usually requires hospitalization. The alternative of prescribing a drug regimen and leaving it completely to the patient to follow and report back usually results in poor compliance and inaccurate reports.

Controlled drug dispensers and compliance monitoring equipment provide a middle ground between direct supervision and no supervision so that relatively dangerous drugs can be administered without direct supervision and clinical drug studies can be carried out with relatively high reliability.

As the U.S. Department of Commerce National Technical Information Service Publication PB-278 973 entitled "Possible Designs of Medication Monitors", prepared at the National Jewish Hospital and Research Center, Denver, Colo., for the American Lung Association (April 1978) points out, the genesis of the medication compliance monitor goes back to May 1962. This early concept was for a medication monitor utilizing radioactive material and photographic film to determine when patients removed medication from a medication dispenser.

Since then there have been several publications on different devices utilizing the same principle, as well as field trials. Since the original publication, the interest in the field of patient compliance with drug regimens grew enormously.

"The Unrealized Potential of The Medication Compliance Monitor" was discussed by Thomas S. Moulding, M.D., at the National Jewish Hospital in a February, 1979 commentary appearing in Volume 25, November 2, of Clinical Pharmacology and Therapeutics. That commentary provides some insight to the historical development of the art of medication compliance monitoring. This Moulding commentary discusses an early version of a radiographic-type compliance monitor. As medication compliance monitoring further developed, various arrangements appeared in the literature and marketplace. Moulding describes a radiographic compliance monitor capable of showing dosing patterns. Each container holds a full daily dose of medication. However there is not provided any alerting features to help the patient to remember to take dosages. Processing and interpreting the compliance record are awkward. Potential hazards are associated with the use of a radioactive source. No control mechanisms are used—Access is not controlled nor is the number of dosages taken at one time.

Moulding anticipates the use of strip packaging and microprocessors for improving compliance monitors' design but no practical details are given on how to accomplish these design improvements. It does not appreciate the utility of a device capable of delivering multiple medications in complex regimen. The commentary does not teach how to build a reliable and tamper-proof dispensing mechanism; a successful strategy for field, interface, and base unit electronics and software is not given.

Lederle Laboratories (American Cyanamid Company) developed a digital module for the cap of a medicine bottle for reminding the patient when he last took his medication. This "reminder" cap was intended to help people to take medication at the proper time. However, such an arrangement has certain fundamental inadequacies: The clock does not indicate when the next dosage is due. The patient must still remember the proper dosage schedule. There is no alarm to get the patient's attention when the next dosage is due. The cap has no memory to show the therapist when dosages were taken. There is no control over when the bottle cap is opened or the number of dosages taken after the cap is removed. Also, multiple caps are needed for multiple drug therapies; and the patient is not guided as to how much of each drug is to be taken.

A "Med Tymer" medicine bottle cap was developed by Boston Medical Research, Inc. It includes preprogrammed light and sound alarms that announce when the next dosage is due. 1/day to 4/day schedules are available. However, it also has several functional limitations. Programs are in firmware and are not adjustable. Thus, there is no flexibility of dosing times for a given daily frequency. The cap has a limited lifespan (12 months) and is not reusable or reprogrammable. It is not approved for liquid medications. It has no memory for later reporting of compliance. There is no control over when the cap is opened or the number of dosages taken after the cap is removed. Multiple caps are needed for multiple drug therapies; and the patient is not guided as to how much to take of each medication.

In an article entitled "Medication Monitor for Opthamology" by Yee et al appearing at page 774 of the American Journal of Opthamology, there is described a medication monitor wherein dosing times are recorded in memory for later reporting of compliance. Its functional limits are as follows. There are no alerting features such as an alarm, or clock displays, etc. The electronics provide only a limited memory, i.e. there is no microprocessor to provide alarm and control functions and the limited memory results in limited dosing record resolution. It is only possible to achieve one hour resolution of dosage taken times; and multiple doses within any given hour cannot be recognized. There is no control over when the cap is opened or the number of dosages taken after the cap is removed. Multiple units are needed for multiple drug therapies; and the patient is not guided as to how much to take of each medication.

A sample of the patent literature in this art includes:

U.S. Pat. No. 3,369,697, Glucksman et al, Feb. 20, 1968

U.S. Pat. No. 3,968,900, Stanbuk, July 13, 1976

U.S. Pat. No. 4,223,801, Carlson, Sept. 23, 1980

U.S. Pat. No. 4,293,845, Villa-Real, Oct. 6, 1981

SUMMARY OF THE INVENTION

The present invention provides a controllable dispenser having significantly improved operational features over known dispensers.

The dispenser's operation is based upon a packaging concept that places containers along a flexible strip in a predetermined order. The containers may be attached to the strip in various ways. For example, the containers may be integral to the strip material itself, or they could be placed in pockets or sleeves formed in the strip material. Strip materials are typically plastic films that have been heat sealed to form the container holding pockets or adhesive backed fiber tapes sandwiched around non-sticking sleeves, although many other combinations of materials could provide the same effect. More rigid materials could be used for strip construction, but much more efficient container storage is possible if the strip material is flexible enough to allow the containers to be positioned such that neighboring containers are touching one another. Strip flexibility is also beneficial in insuring smooth movement of the strip around turns in the storage volume. Strip materials should not be so weak that tensile forces occurring during the dispensing operation stretch the strip and alter important container spacing intervals.

Container attachment points are spaced at intervals along the strip that correspond to engagement location spacings on the dispensing mechanism. These strip and dispensing mechanism spacings permit a rack and pinion type of dispensing operation. Although almost any spacing interval may be chosen, minimal spacing limitations will arise for given container packing arrangements. For hexagonal closest packing arrangements (as shown in FIG. 4), the minimal spacing between containers is approximately one-third the container circumference. Using the nomenclature of FIG. 3, $S_{min} > c/3$. Parallel packing arrangements (as shown in FIG. 5) require a spacing length of at least one container diameter, $S_{min} \geqq d$.

Various container shapes and sizes may be accommodated by the dispenser's structural arrangement. Depending upon storage volume design and the shapes of parts of the dispensing mechanism, containers having square, semicircular, or other cross-sections may be acceptable. However, circular cylinders are particularly useful containers, having a shape that packs efficiently for storage, moves freely through the storage volume passageways without jamming, and is reliably engaged by the dispensing mechanism. Containers may be made of any rigid or semi-rigid material. Although more flexible container walls can aid the containers in passage through the storage volume and the dispensing mechanism, too flexible materials might prevent the container from maintaining the approximate shape required for proper engagement by the dispensing mechanism.

Varying container volumes are accommodated by merely changing the length of the container. Since the container cross-section remains the same, a dispensing device design is then possible that accommodates various container volumes by merely changing the height of the storage volume and ejector mechanism. No changes to the design of the dispensing mechanisms are necessary.

The packaging system of this invention offers several advantages over previously known arrangements. The dispenser is useful for dispensing various kinds of materials, but it is particularly useful for medication dispensing. A wide variety of containers having various diameter to length ratios may be used. By using a container that is leakproof and has a relatively wide opening, a single dispensing device may be used in several different applications. For example, the leakproof 5 cc vials used in the medication dispenser/monitor/controller implementation of this design will accommodate almost any medication presentation, including: liquids, suspensions, salves, tablets, capsules, devices, and even multiple compatible substances within a single vial. Further flexibility is provided in that other container volumes can be accomodated by merely changing the length of a container with a given cross section. Only the height of the storage base and ejector pinion need then be changed. Thus, the design and size of the device's dispensing module (containing the electronics and dispensing mechanisms) and the spacing intervals of the flexible strip do not change. One dispensing module may be used with several storage bases and ejector pinions to provide a wide range of container capacities and optimized (minimal volume) package sizes.

Another significant feature relates to individual packaging. The proper amount of the substance to be dispensed is placed in individual containers instead of allowing the user access to a bulk supply and relying upon him or her to dispense the proper amount. The amount of the substance to be dispensed is precisely metered into the individual containers by the pharmacist/therapist and can be double checked before the device is handed to the user. The same metering precision and reliability over many dispensing operations is not likely to occur when the user must do the measuring or a mechanical device must repeatedly measure and dispense from a bulk supply.

Using individual containers helps prevent contamination and cleaning problems and thereby enhances the economics of such a reusable system. The dispensing device can be used for dispensing one type of substance and, upon completion of the first dispensing program, be immediately reloaded with vials containing a different substance with very little chance of cross-contamination and no substantial cleaning requirements. Bulk or even compartmentalized storage volumes would need extensive cleaning before reuse.

Complete control over dispensing sequencing is provided. The capability of varying the amount and types of substances within each container and organizing these varying contents into a predetermined sequence is a primary feature of the invention. Using the medication dispenser/monitor/controller example, the device could be loaded with vials containing various combinations of drugs in the proper sequence such that a patient on multiple regimens will receive the proper selection of medications according to the prescribed schedules, and without the patient having to remember any dosing details.

The sequencing feature may also be used to deliver increasing or decreasing amounts of one or more substances over the dispensing period. Thus, a physician using the medication dispenser/monitor/controller to administer medications can taper dosage levels and thereby deliver more effective therapeutic levels while simultaneously minimizing side effects in a manner not possible using level doses.

The dispenser according to the invention is tolerant of any positional orientation. Unlike gravity feed devices, the dispensing device according to the present invention will operate properly in any orientation. The container strip maintains container sequencing and proper spacing regardless of position. Some storage volume characteristics, described later, also help prevent undesirable container movement and thereby contribute to the device's orientation tolerance.

The packaging of containers along a flexible strip forms a flexible rack-like device that, in combination with the pinion-like dispensing mechanism described below, permits the construction of a very compact and reliable dispensing device.

The primary dispensing mechanism includes an ejector element mounted for rotation about its longitudinal axis and having container conforming depressions positioned around its periphery. The ejector acts as a pinion gear that drives a flexible rack, the container strip. When the ejector is rotated, one container is moved from a ready position and out of the dispenser while, simultaneously, the next container to be dispensed is engaged by a mating ejector depression and moved into the ready position.

Thus, the pinion, the ejector element having depressions that form gear-like teeth, is fixed, and the rack, a flexible strip with attached containers acting as the mating gear teeth, is moved out of the device by pinion rotation. This design offers many advantages:

The first of these advantages is reliability. Using the containers as the 'teeth' on the rack provides inherently more reliable pinion engagement than a conventional flexible strip with rows of small holes used to engage pins on the pinion (as in camera film for instance). Accurate engagement location spacing is essential to jam free operation in both cases. However, the container as sprocket design has only one critical spacing per dispensing operation, whereas for a multiple hole rack, several accurate hole to hole intervals are needed for the same single dispensing operation. Strip manufacture is also simplified by using the containers as sprockets. Punching the multitude of precisely positioned small holes is not required.

The mechanism operates simply. A ¼ turn of the ejector pinion is all that is required to accomplish a dispensing operation. The container is then outside the device where it can be slid out of its sleeve for use and the empty strip is torn off across the opening edge.

As discussed above, the same dispensing mechanisms may be used to dispense various volume containers merely by changing the length of the ejector pinion to correspond with the associated container length. Like the container strip, the dispensing mechanism may be operated from any position.

Completed dispensing operations are signalled to a microprocessor by means of lever switches activated by spring loaded actuators riding cams on the shaft used to drive the ejector pinion. The mechanism is designed to activate the signalling switches when the user has completed the ¼ turn drive shaft rotation. False signals are prevented by using two switches that are alternately, mechanically activated by cams 90° apart and by alternately arming the switches electrically by means of microprocessor output ports. Thus, as soon as a particular switch is activated mechanically, it is deactivated electrically immediately after the signal is received so that further minor motion of the ejector driveshaft is not improperly interpreted as another completed dispensing operation. Simultaneously, the other switch is electrically armed so that it will signal the microprocessor upon the next ¼ turn rotation and ensuing mechanical activation.

The flexible rack and pinion mechanism described above is the basis for a superior dispensing system having the advantages discussed above. However, in situations requiring the utmost reliability and control, such as the medication dispenser/monitor/controller application, further mechanical and electromechanical features can greatly enhance reliability. The features listed below may be used separately or in various combinations as required to insure reliable operation in a particular dispensing situation.

The first group of features relates to the housing. The dispensing device components may be housed in two sections. The lower section, the storage base provides a storage volume for the container strip and retains the ejector pinion. The upper section, the dispensing module 46, houses the electronics and all the dispensing mechanisms other than the ejector pinion 34. Both housings may be of one piece, fastenerless construction. The two housing parts are held together by a cabinet lock mounted in the dispensing module, and having a key operated cam that engages slotted extensions of a partition 30 in the storage base. This construction provides several beneficial features.

The tongue and groove mating of the upper and lower housings allows a simple one point locking design having a tamper-resistant joint. Since the user is not given the key to the cabinet lock, there is no easy access to the contents of the dispensing device other than through proper manipulation of the ejector mechanism. Both the storage base and dispensing module are free of external fasteners so that tampering is discouraged and difficult to hide if attempted. The opening in the storage base where containers are ejected is protected against intrusion by the design of the ejector pinion. The sprockets of the ejector pinion are such that they form a close fitting barrier with the storage base partition and thereby prevent viewing of and access to the next container to be dispensed.

There are no unsealed openings in the top of the device through which spilled fluids could reach the electronics and mechanisms. The tongue and groove method of joining top and bottom housings further protects against spills. Since all the electronics and all the dispensing mechanisms except the ejector pinion are mounted in the top housing, any leaking containers are not likely to contaminate those elevated regions. Further protection against leakage contamination can be easily attained by sealing a cover plate over the bottom of the dispensing module, thereby protecting all mechanisms and electronics with one simple cover. A coating provided over the electronics can provide additional protection.

Smooth, jamproof, container strip movement is a feature of the storage base design. As shown in FIG. 4, the storage base outer wall and inner partition form a generally U-shaped storage volume in which containers are packed both inside and outside the partition. This design provides exceptionally efficient (compact) container storage while simultaneously providing passageways through which the container strip can move smoothly without jamming.

By keeping all passageways a little less than two container diameters "d" (See FIG. 3) in width, containers cannot get past one another and out of sequence. Thus, impact forces cannot rearrange container sequencing and cause containers later in the sequence to engage the ejector pinion ahead of earlier containers and jam the mechanism. Because a minimum passageway width of 1.87 diameters is needed to allow double row, closest packing as is desired in some areas, the passageway widths in those regions are typically kept between 1.87 and slightly less than two (2) diameters.

The U-shaped design allows for smooth container strip movement since there are only two partition turns, at a maximum, for the containers to negotiate. The radii of the turns are large enough, compared to the inter-container spacing, so that most contact with the partition is by the containers and not the spacing intervals. Because the containers only have line contact with the partition wall, very little frictional force is generated and the containers move smoothly around the turns. Tighter radii would allow more strip contact with the partition wall and produce larger drag forces that might bind strip movement. Circular storage volumes, having capacities as shown, are not preferred because they have housing proportions that are hard to hold in one hand. Similarly, even though longer, rectangular designs can have fewer turns, the extended housing length can make portable units awkward to carry.

The two part housing design is also beneficial to the user who may want the capability of dispensing several different capacity containers with a minimum equipment investment. Since all electronics and mechanisms other than the ejector pinion are contained in the top half dispensing module, container capacity can be changed merely by using a container of the appropriate length to give the volume desired, and by using a storage base and ejector pinion of corresponding length. No change in dispensing module size or design is required. Thus, one dispensing module can be used with several different height storage bases, ejector pinions and containers to produce a broad capability dispensing system.

There are several mechanisms associated with control of ejector pinion motion that help insure reliable operation.

A pin 92 located in the storage base (See FIG. 22), under a groove in the ejector pinion, prevents further ejector rotation until the dispensed container is removed. This pin prevents inadvertent, or intentional, attempted insertion of containers back into the unit which could jam the ejector mechanism.

The two alternately acting ejector switch actuators described above have a second function. The depressions in the drive shaft that engage the spring loaded actuators are shaped so that the drive shaft cannot be turned in the reverse direction once an actuator has seated. Thus, the drive shaft can be turned backwards at most something less than one-quarter turn and not at all once the fully dispensed position is reached. By preventing reverse ejector rotation, containers are prevented from being intentionally or inadvertently pushed back into the storage volume and thereby possibly jamming the dispensing mechanism, or disengaging the ejector pinion.

Pins are arranged in the top of the ejector pinion such that they extend into the dispensing module. A notched locking wheel 86 is positioned in the top housing so that its circumference will prevent ejector pinion rotation unless the notch is so aligned as to allow the adjacent ejector pinion pin to rotate forward. The notch is so designed that as the ejector pinion rotates forward a pin engages the notch well and forces the locking wheel to rotate before disengaging the notch. Once the locking wheel is turned, the notch is no longer in a position such that the next ejector pinion pin can move forward, and the ejector pinion is thereby locked.

Thus, ejector pinion locking occurs automatically and mechanically each time a container is dispensed. This auto-lock feature prevents the operator from inadvertently dispensing too many containers by rotating the ejector pinion more than 90 degrees. Being mechanical and automatic, the mechanism requires no computer logic or power to perform this function. This locking design also permits a simple, but effective, computer controlled unlocking feature that can be used to better insure operator conformance to a predetermined dispensing schedule.

Where restricted access to the containers is not important, a simple mechanical linkage can allow the operator to manually reset the locking wheel so that the notch is aligned to permit another dispensing operation. In other situations, where precise control over the dispensing operation is desired, a solenoid 212 controlled by the dispensing device's microprocessor can be easily put in control of the locking wheel. When an electrical pulse is supplied to the solenoid, it rotates the locking wheel 86 in the reverse direction (approximately 45° in this example) so that the notch 90 is moved into the unlocked position.

Although a linear acting solenoid with linkages can be used to reverse rotate the locking wheel into its unlocked position, no linkage is necessary if a rotary acting solenoid is used and a simpler, more reliable design results. The choice of a rotary solenoid over a linear solenoid also greatly increases the impact resistance of the dispensing mechanism. Linear acceleration/deceleration forces (due to impacts, for instance) in the direction of the longitudinal axis of the plunger of a linear solenoid could cause the locking mechanism to lock or unlock when not intended. Since linear forces produce balanced and opposed forces when acting on a rotational mass, impact forces do not tend to cause inadvertent armature motion when a rotary solenoid and locking disc are used.

Further means of insuring that lock/unlock positions of the locking wheel are retained can be provided through the use of latching forces. Latching mechanisms increase the force required to move the locking wheel out of either one of its bistable positions. One form of the latching mechanism utilizes three magnets: one on the locking wheel, and two others mounted such that they are adjacent the locking wheel magnet and providing attractive (latching) forces when the wheel is in its lock and unlock positions. Although there are many other possible latching designs (such as spring loaded rockers), the described magnetic system uses just three simple parts that can be easily adjusted to provide the optimum latching forces. By adjusting the magnets' residual field strengths during magnetization, the resultant latching forces may be made just sufficient to prevent accidental motion of the locking wheel with no excess force that would require the use of a larger and higher power consuming solenoid. Since a rotary solenoid greatly reduces the latching forces required because of its inherent stability under linear forces, the torque requirements of the design are minimal.

A lever switch ("status" switch) adjacent a cam on the locking wheel is used to signal to the microprocessor the status of the locking/unlocking mechanism. This provides a check to see that the locking wheel has been able to respond properly to commands from the microprocessor. If, for instance, the user has prevented locking wheel reset by applying restraining forces through attempted drive shaft rotation during the solenoid pulse, this switch will alert the microprocessor to the need for sending additional pulses to the solenoid until the, unlocking operation has been successfully completed.

The dispensing device described above can certainly perform all its functions, with all the stated benefits, from a fixed location using externally supplied power. However, the structure has been particularly optimized for portable operation using self contained batteries. Portability is especially beneficial to the medication dispenser/monitor/controller application where small size and battery operation are essential.

Several features contribute to efficient utilization of space within the unit:

a. Hexagonal, closest packing—much of the storage volume is configured for double row, closest packed storage which results in maximum container densities. The flexibility of the container strip allows the containers to be pushed next to one another to accomplish closest packing.

b. Optimum partition design—the U-shaped partition folds the cohtainer strip into a compact area while providing large radius turns that help insure smooth strip movement. Virtually the entire area inside and outside the partition may be filled with containers. Single row designs, such as one using a spiral partition in a round enclosure, require more extensive partitions that waste space and have more turns that increase the undesired drag forces on the strip as it is advanced. On the other hand, use of too few partitions risks the possibility that containers will not advance in the proper order and thereby jam the dispensing mechanism.

The U-shaped design also affords the most easily grasped and carried device proportions. Round devices having comparable capacities have diameters that are too large to comfortably grasp without a handle. More rectangular designs of similar capacity have a length dimension that becomes more awkward to accommodate during transport and storage.

c. Minimum wall thickness—The outer wall and partition thicknesses have been minimized to save volume and weight. Using extensions of the storage base partition, instead of a base mounted post, to engage the upper housing cabinet lock maximizes the space available for container storage.

d. Housing adaptability—The placement of all electronics and dispensing mechanisms in the top portion of the device allows the height of the separate storage base to be adjusted to exactly fit the height of the containers.

e. VLSI circuits—Very large scale integrated circuits are used, each of which perform the function of several circuits in just one package, thereby saving large circuit board areas and reducing unit weight.

f. Plastic construction—Almost all housing and support structures, as well as several of the dispensing mechanisms, may be suitably constructed of plastic materials, thereby lessening the weight that must be carried.

g. Software features—By implementing in software several functions normally implemented in hardware, valuable space and weight are saved. The usual UART (Universal Asynchronous Receiver/Transmitter) and parallel interface hardware elements have been implemented in software. Serial communications are used to simplify the hardware necessary for communications with the Base Unit. The level shifting circuitry needed by the communications link has been moved out of the dispensing device and into the Interface Unit to save more dispensing device space.

So that the dispensing device could be used in applications such as the medication dispenser/monitor/controller where the battery power supply must provide up to 60 days or more of continuous operation, many power saving features have been implemented.

a. CMOS circuitry—All integrated circuits are of Complementary Metal Oxide Silicon construction for lowest possible current draw.

b. 'WAIT' mode—The use of a microprocessor having a low power standby operating mode and software that places the MPU in that power saving mode for more than 98% of its operating period is the major power saving feature.

c. Piezoalarm—The reminder alarm function is implemented with a piezoelectric element that uses only a few milliamperes of current. Further power savings result by only pulsing the alarm for a fraction of every minute.

d. LCD—A liquid crystal display is used as the visual dispensing reminder because it uses only microamperes of current.

e. Mechanical auto-lock—The auto-lock feature requires no electrical power, the motive force being supplied by the dispenser operator while advancing the ejector pinion drive shaft.

f. Manual ejector drive—Although the ejector pinion could be motor driven to ease the dispensing operation for the fixed location user where external power is readily available, the manual drive design permits portable operation where the large amount of power required for an electric drive is not available.

g. Rotary solenoid—As described above, a rotary solenoid requires less latching forces and therefore less starting torque (power) than a linear solenoid design. Rotary solenoids also provide superior starting torque for a given current and size. The unlock mechanism is designed so that the unlock solenoid need merely rotate a lightweight locking wheel. No linkage forces have to be overcome that would require the use of a bulkier, higher current draw solenoid. Further, the solenoid driving software routine sends only a 50 msec pulse of power to the solenoid, limiting power used to the minimum needed to accomplish reliable unlock operation. Only pulses of power need be sent to the unlock solenoid since the mechanism is latched once it reaches the unlock position and no further power is needed to maintain the proper position.

h. VLSI circuitry—The use of highly integrated circuits reduces power consumption compared to discrete devices performing the same functions.

BRIEF DESCRIPTION OF THE DRAWINGS

FIG. 3 is a schematic representation of containers on a strip showing dimensions and spacings;

FIG. 4 is a top view of the storage base portion of the Field Unit showing containers to be dispensed stored therein;

FIG. 5 is a schematic representation of an alternative container storage arrangement;

FIG. 6 is a schematic representation of an integral strip and storage container;

FIG. 7 shows a strip arrangement including two portions heat sealed to one another;

FIG. 8 shows a two portion strip 50 with a container held between the two strip portions;

FIG. 9 shows a container with a separate plug cap;

FIGS. 10–12 are schematic diagrams showing a dispensing operation;

FIGS. 13 and 14 are side views of a portion of the dispenser module showing how a dispensing operation is signalled;

FIGS. 15 and 16 are schematic views further illustrating how a dispensing operation is signalled;

Figure 29:
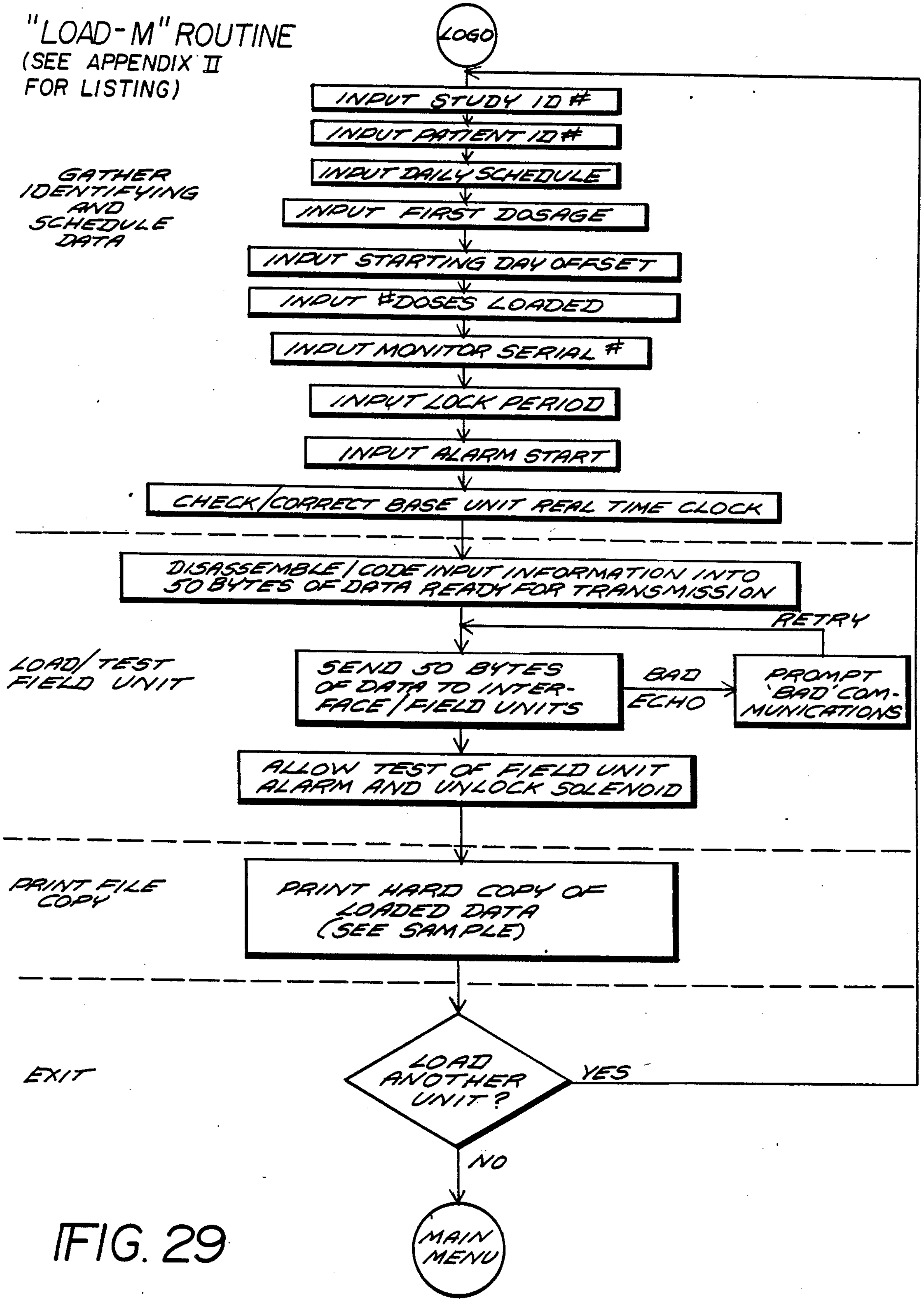
FIG. 29 is a flow chart of the base unit loading routine software for loading a field unit.
Figure 30:
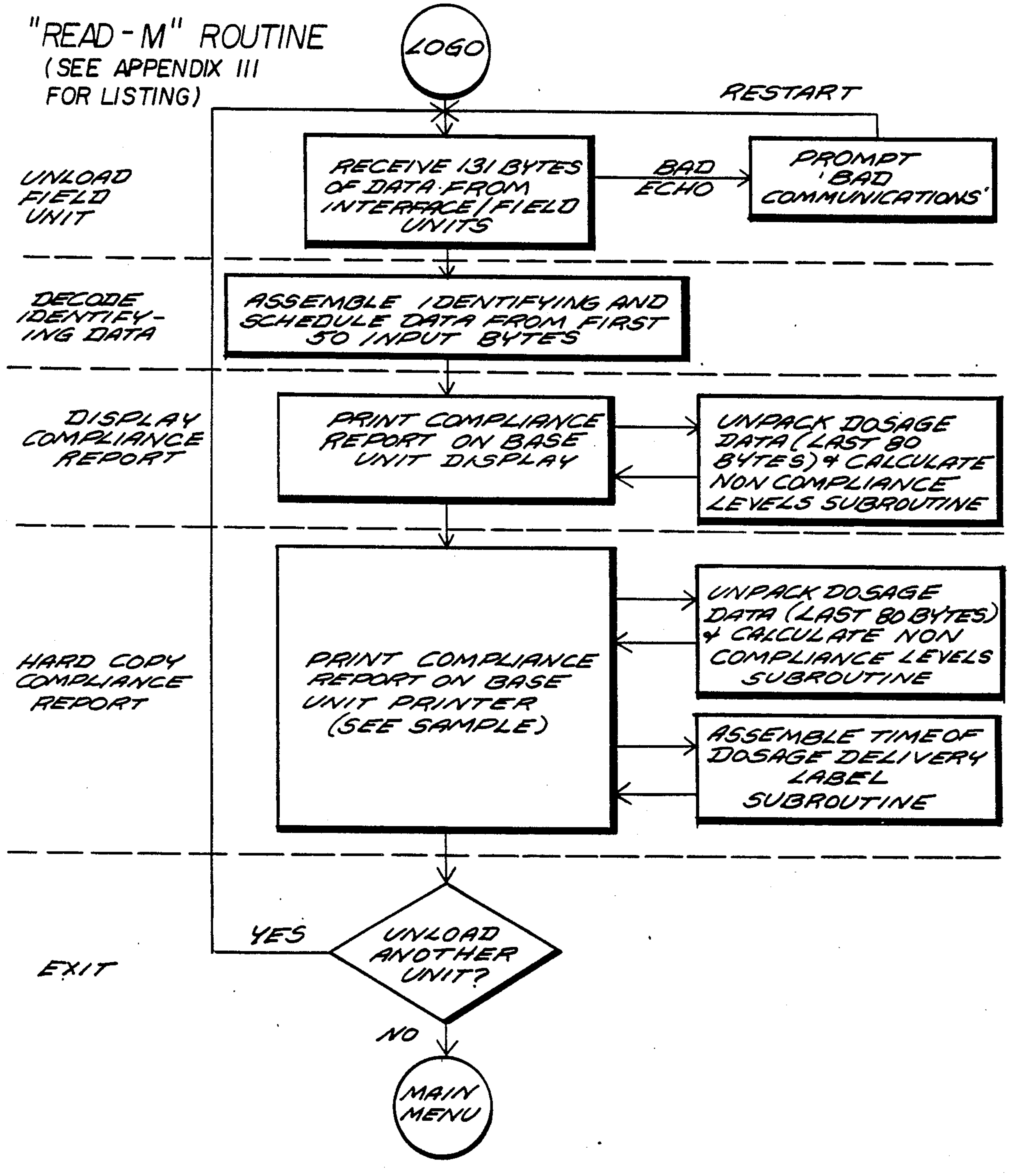
FIG. 30 is a flow chart of the base unit unloading routine software for debriefing a field unit after it has dispensed some or all of its containers.

Appendix I is a detailed listing of the software controlling the field unit;

Appendix II is a detailed program listing of the loading routine shown in flow chart form in FIG. 29; and Appendix III is a detailed program listing of the debriefing routine shown in flow chart form in FIG. 30.

DETAILED DESCRIPTION OF THE PREFERRED EMBODIMENT

System Overview

Figure 1:
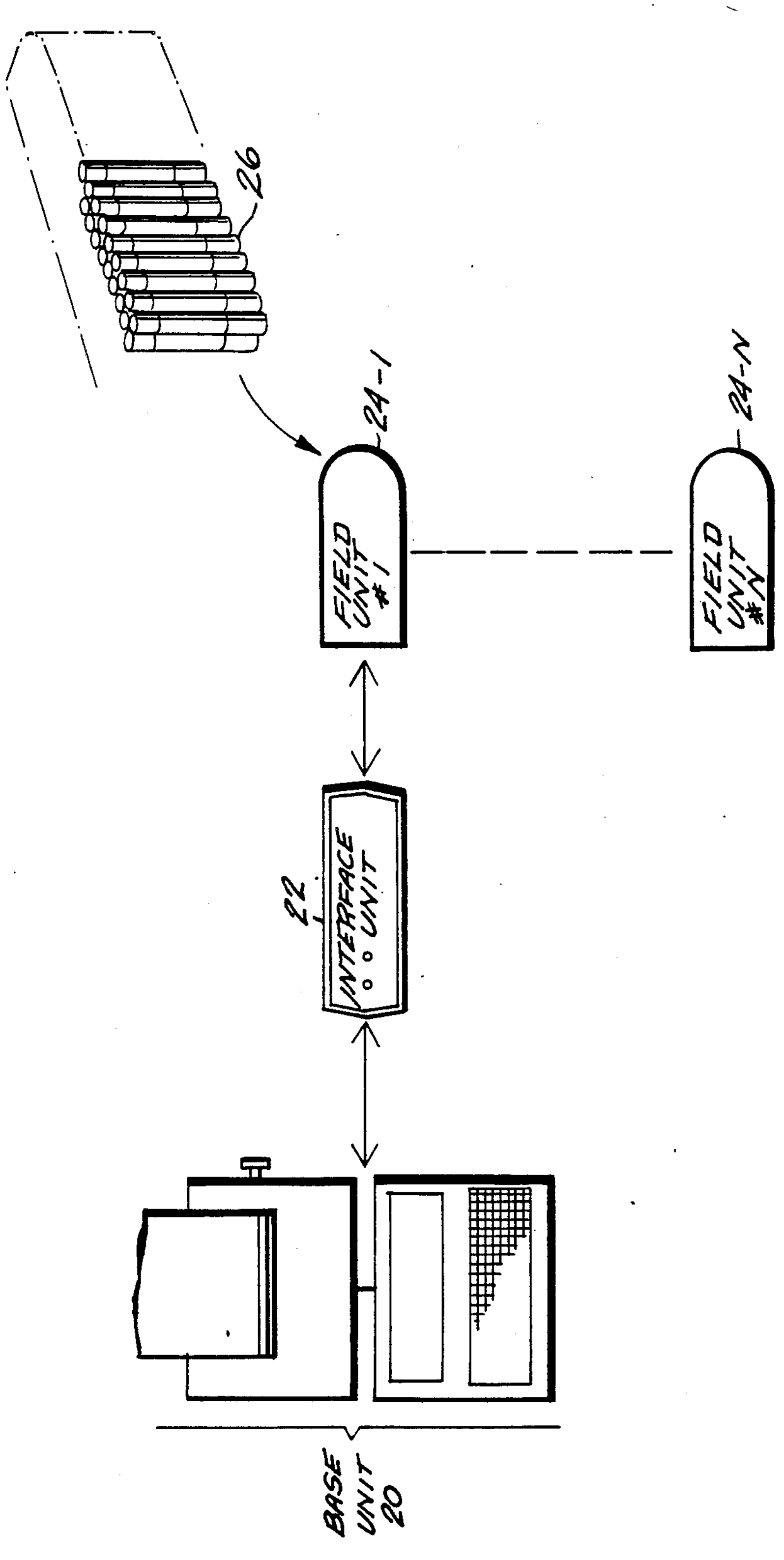
FIG. 1 is a block diagram of the medication dispenser and compliance monitor system according to the present invention.

Referring first to FIG. 1, there is shown a block diagram of the overall system concept of the present invention. The system includes a single base unit 20, a single interface unit 22 and a plurality of field units 24-1 . . . 24-N. A drug therapist or researcher can program many field units 24 (one at a time), give them to different patients or subjects and later collect and debrief them and prepare compliance reports.

To prepare a field unit 24 for distribution to a patient or test subject, a medication package, such as package 26, is first loaded into field unit 24. The field unit is then electrically connected with interface unit 22 and a programmed drug regimen, defined by the therapist by interacting with base unit 20, is loaded via interface 22 into the field unit. The drug therapist defines the drug regimen by using the "LOAD" software (set forth in Appendix II) with base unit 20 to configure the field unit 24.

The loaded field unit 24 is given to the patient, who dispenses medication in accordance with the schedule loaded into it using the "LOAD-M" software. The dispensing operation is governed by the software stored in field unit 24 and listed in Appendix I. This field unit software provides dosing time prompts, controls the dispensing meachanism, and stores the actual times and dates of dispensing.

After the drug regimen is completed, field unit 24 is returned to the therapist where it is again connected to base unit 20 via interface 22. The field unit is then debriefed according to the software listed in Appendix III and the base unit prepares a report to the therapist as to exact times of dispensing and any departures from the desired schedule.

Field Unit Mechanics

Referring to FIGS. 2–24 there are shown the mechanical details of a field unit 24.

Figure 2:
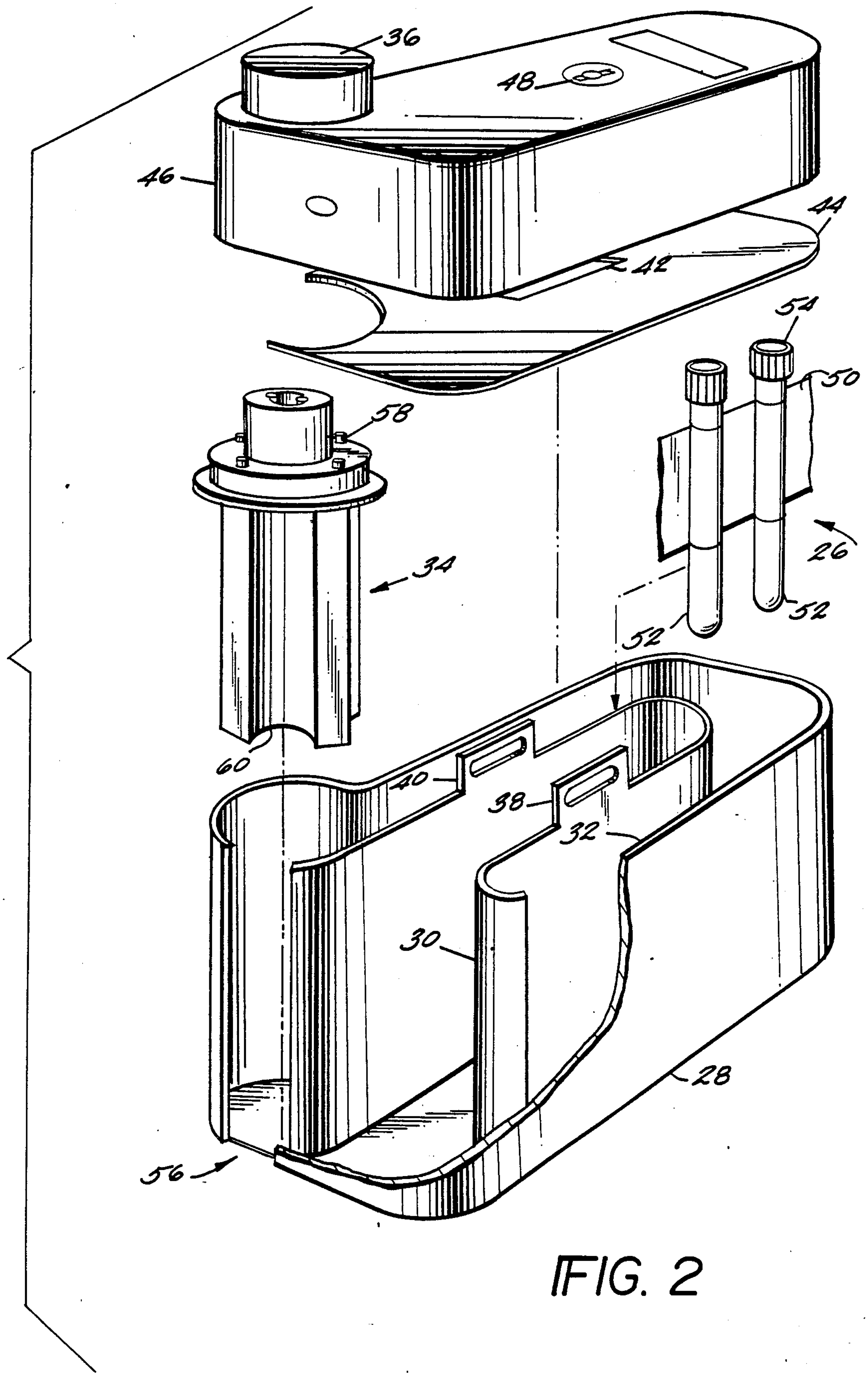
FIG. 2 is an exploded, partially cutaway view of a field unit 24.

Referring first to FIG. 2, there is shown an exploded view of field unit 24. Field unit 24 includes a storage base 28 constituting a portion of the housing of the field unit. Inside of storage base 28, there is fitted a storage base inner partition 30 which, together with an outer wall 32 of the storage base defines a passage way within which a dispensing package 26 can be stored and from which individual containers can be dispensed. The dispensing action is carried out by the rotation of an ejector pinion 34 which is manually rotated by the user by manipulation of a knob 36, during times when the field unit is "unlocked" in accordance with a predetermined dispensing schedule stored in it. The unlocking mechanism operates under microprocessor control as will be described later in further detail.

Inner partition 30 includes two slotted extensions 38 and 40 which pass through a hole 42 in a plate 44 and ultimately engage with a cam lock (not shown in FIG. 2) in a dispensing module portion 46 of Field Unit 24. Dispensing module portion 46 includes various mechanical elements, electronic subsystem, display, alarm, etc. A slot 48 on the upper surface of dispensing module portion 46 accommodates a key for a cam lock.

Dispensing package 26 includes a strip 50 holding a plurality of individual containers 52, each having its own cap 54. Package 26 is fitted into the passageway defined by outer wall 32 and inner partition 30 of storage base 28 according to a predetermined sequence.

Each time a container 52 is to be dispensed, ejector pinion 34 is rotated so as to engage a single container 52 and push it through an opening 56 in outer wall 32 of storage base 28. Ejector pinion 34 is rotated by the user by means of rotating drive shaft Knob 36.

Ejector pinion 34 includes four locking pins 58 which cooperate with an unlocking arrangement for controlling when ejector pinion 34 can be rotated in accordance with the predetermined schedule. Ejector pinion 34 includes four concave portions 60 for accommodating the shape of individual containers 52 so that a container fits within concave portion 60 and is conveyed by rotation of the ejector pinion.

Referring now to FIG. 3, there is shown a schematic representation of a portion of a medication package 26 including strip 50 and two (2) containers 52. Each container has a circumference "c" and a diameter "d". There is a space "s" separating two adjacent containers 52.

Referring now to FIG. 4, there is shown a top view of storage base 28 of field unit 24 with the dispensing module portion 46 removed. This figure shows a plurality of containers 52 packed within the passage way defined by inner partition 30 and outer wall 32. The arrangement of containers 52 shown in this Figure where the passageway is widest represents what is known as "hexagonal closest packaging" which allows the maximum number of containers 52 to be stored within the passage way volume. The minimum inter-container strip spacing required for closest packing is shown as the length Smin. The numbers shown inside each of containers 52 represent the sequence of dispensing of the individual containers. First, container #1 is dispensed, then container #2 is dispensed, etc. Each dispensing operation corresponds to a ¼ turn of ejector pinion 34. As individual containers 52 are dispensed, strip 50 is pulled and the undispensed containers advance through the passage way as necessary toward ejector pinion 34.

Referring now to FIG. 5, there is shown an alternative, but not preferred, packaging arrangement of containers 52 known as "parallel row packaging". The numbers inside each of containers 52 represent the sequence of dispensing of the containers. The minimum inter-container strip spacing required for parallel row packing is shown as the length Smin.

Containers 52 can either be formed integrally with strip 50 as shown in FIG. 6 or the containers can be fitted within spaces formed in strip 50 to accommodate the containers. As shown in FIG. 7, strip 50 can be formed from two separate and distinct strips of material 62 and 64 which can be sealed adjacent to container areas. The individual containers 52 can then be inserted into the space defined by the two strips of material.

Referring to FIG. 8, there is shown such an arrangement including strips of material 62 and 64 with a container 52 inserted therein.

Referring now to FIG. 9, there is shown a more detailed view of a portion of medication package 26. Each container 52 can be fitted with its own plug cap 66.

Referring now to FIGS. 10, 11 and 12, there are shown top views of the portion of storage base 28 including ejector pinion 34. These figures illustrate the dispensing sequence for containers 52. As in the preceeding figures, the numbers shown in the centers of respective containers 52 indicate the dispensing sequence of containers 52. As shown in FIG. 10, the first container is engaged in a concave portion of ejector pinion 34. This first container 52 is positioned along strip 50 in accordance with the details shown in FIG. 3 with a spacing s between containers #1 and #2, the d1stance between concave portions of ejector pinion 34 also being equal to said length S. Ejector pinion 34 rotates in the direction shown by arrow 68. FIG. 10 shows the position of containers #1, #2 and #3 just before ejector pinion 34 is rotated its quarter turn to dispense container #1. In FIG. 11, ejector pinion 34 has been rotated ⅛th turn from its starting position and container #2 is already engaged in the next concave portion of ejector pinion 34. FIG. 12 shows ejector pinion 34 rotated a full quarter turn from its position shown in FIG. 10 and with container #1 dispensed through opening 56 of storage base 28. For the sake of drawing convenience, in FIG. 11, strip 50 is shown with some "slack" around FIG. 70 of ejector pinion 34. In reality, there would be little slack since the spacing S between containers is carefully selected so that there will be no slack. As shown in FIGS. 10–12, ejector pinion 34 conforms to the space defined by outer wall 32 and inner partition 30 so that there is very little clearance between the tips 70 of ejector pinion 34 and the wall and partition portions of storage base 28. This protects the containers from being tampered with or removed before ejector pinion 34 is unlocked for dispensing. After a container 52 is dispensed, as shown in FIG. 12, the container 52 may be removed from strip 50 and the protruding portion of the strip 50 can be torn off at the edge 33 of wall 32 and discarded.

The operation of field unit 24 is under the control of a microprocessor. The microprocessor periodically unlocks a locking mechanism so that the user can manually dispense the next container in sequence. However, the operation is considerably more sophisticated than merely unlocking at predetermined intervals of time. It can unlock based on a predetermined formula including predetermined intervals and also as a function of when actual dispensing has taken place. Therefore, it is important that the microprocessor know exactly when the user has dispensed a container.

Referring now to FIGS. 13–16, there are shown drawings of portions of the field unit 24 for annunciating that a dispensing operation has been completed and for preventing reverse rotation of ejector pinion 34.

Referring first to FIG. 13, ejector pinion 34 is driven by a drive shaft 72 having cams 74 and 76 (Cam 74 is not fully visible in FIG. 13). Drive shaft 72 is rigidly coupled to knob 36 which is rotated by the user to cause a dispensing operation. Cams 74 and 76 engage spring loaded switch actuators 78 and 80 which in turn operate ejector switches 82 and 84. Cams 74 and 76 each include two cam portions spaced 180° apart around drive shaft 72. They are oriented around shaft 72 so that closest portions of cams 74 and 76 are spaced 90° from one another around periphery of drive shaft 72 so that they will cause a closure of switches 82 and 84 at 90° intervals of the rotation of drive shaft 72. FIG. 13 shows a position of drive shaft 72 whereat actuator 78 is engaged with cam 74 thereby turning switch 82 "on". As shown in FIG. 13, at the time switch 82 is "on", actuator 80 is not engaged with cam 76 because cam 76 is out of position of drive shaft 72 so that it cannot be engaged. Therefore, actuator 80 is not engaged with cam 76 and switch 84 is therefore "off".

FIG. 14 shows the same components as shown in FIG. 13, but later in time, after drive shaft 72 has been rotated 90 degrees, so that cam 76 is engaged by actuator 80. As shown in FIG. 14, when actuator 80 is engaged in cam 76, switch 84 turns "on". Cam 74 is then out of position so that actuator 78 cannot engage it. Therefore, switch 82 is "off".

Referring now to FIGS. 15 and 16, this process of signalling a complete dispensing operation is further illustrated.

Referring now to FIG. 15, actuator 78 is shown engaged with cam 74, thereby causing switch 82 to be "on". This corresponds to the position shown in FIG. 13. At the same time, actuator 80 is not engaged with cam 76 and therefore switch 84 is "off".

FIG. 16 shows the same components as shown in FIG. 15, but ¼ rotation of drive shaft 72 later. Actuator 78 is not engaged with cam 74, but actuator 80 is engaged with cam 76. Therefore, switch 82 is off and switch 84 is "on". The "on" and "off" status of ejector switches 82 and 84 signal to the microprocessor when a dispensing operation is complete. This corresponds to completion of a ¼ turn of drive shaft 72 rotation.

In addition, the shape of the cam depressions on drive shaft 72 are such that they prevent reverse shaft rotation when an actuator 78 or 80 is seated in its corresponding cam. The seat1ng act1on is abrupt and concurrent only with a complete 90° drive shaft rotation to avoid ambiguous signalling. The microprocessor is programmed to electrically deactivate a switch 82 or 84 immediately after it has been mechanically activated. By using two switches that are alternately enabled and activated by a completed dispensing operation, erroneous multiple signals that could occur if only one switch were used are avoided.

Figure 17:
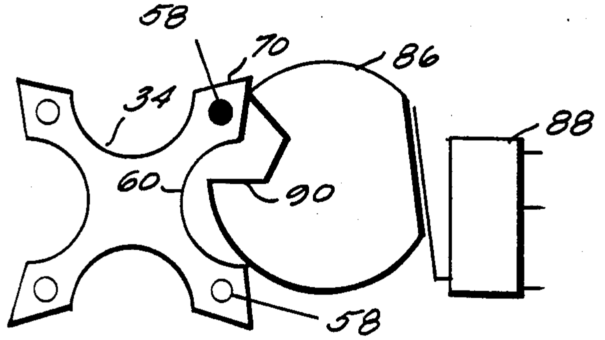
FIGS. 17–19 are schematic illustrations demonstrating the automatic locking mechanism.
Figure 18:
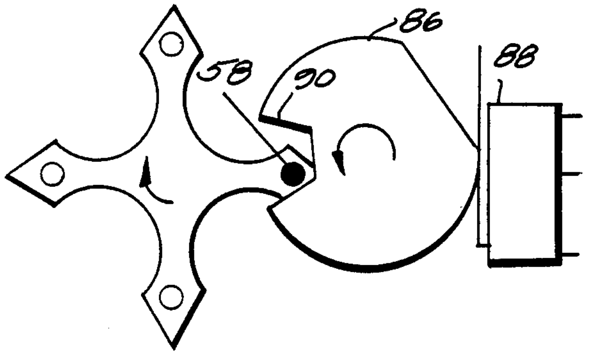
Figure 19:
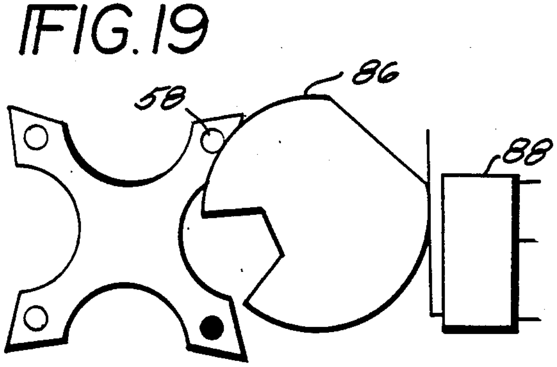

The unlocking mechanism will be discussed with reference to FIGS. 17, 18 and 19. Ejector pinion 34 interacts with a locking wheel 86 which controls a locking wheel switch 88 for signalling the microprocessor as to the "locked" or "unlocked" status of field unit 24. As shown in FIG. 17, locking wheel 86 includes a notched portion 90. The locking wheel 86 is positioned such that notched portion 90 can interact with locking pins 58 of ejector 34. Viewed from above, the locking wheel 86 is above that portion of ejector 34 including tips 70, as shown in FIGS. 18 and 19. Locking wheel 86 is rotated by interaction with locking pins 58 between those positions shown in FIGS. 17 and 19. A rotary solenoid 212, not shown in this Figure, can reset the locking wheel 86 from its locked position in FIG. 19 to its unlocked position in FIG. 17. As shown in FIG. 18, a locking pin 58 of ejector pinion 34 engages notch 90 in locking wheel 86 and rotates the locking wheel 86 towards the "locked" position. Thus, rotating ejector pinion 34 during a dispensing operation, causes locking wheel 86 to change positions. Engagement of the next locking pin 58 with locking wheel 86, as shown in FIG. 19, prevents further ejector pinion rotation. This automatically locks the dispensing device upon completion of a dispensing operation. Thus, FIG. 19 illustrates a "locked position, resulting from the counter-clockwise rotation of locking wheel 86 as a result of clockwise rotation of ejector pinion 34. When it is time to unlock the dispensing device, the microprocessor actuates the solenoid to rotate locking wheel 86 backwards, i.e., clockwise, into the unlocked position, shown in FIG. 17, thereby allowing the user to carry out the next dispensing operation.

Figure 20:
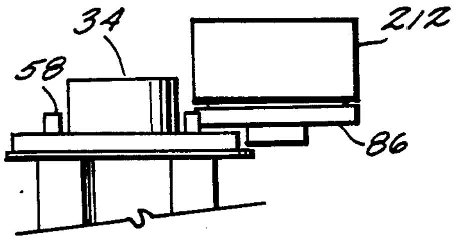
FIG. 20 is a side view showing the operation of the locking wheel by the rotary solenoid.

Referring now to FIG. 20, there is shown a view of locking wheel 86 coupled so as to be operated by a solenoid 212. A pulse from the microprocessor to solenoid 212 causes locking wheel 86 to rotate from the position shown in FIG. 19 to the position shown in FIG. 17.

Figure 21:
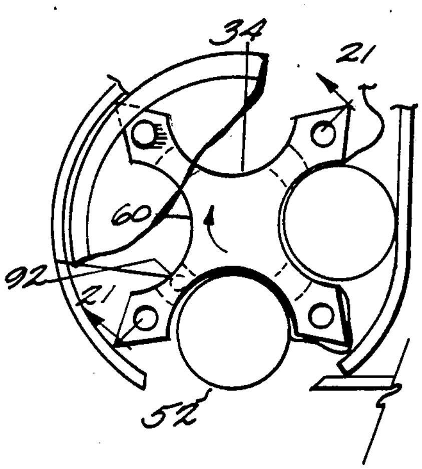
FIG. 21 is a top view of ejector pinion 34 showing the position of the container stop pin.
Figure 22:
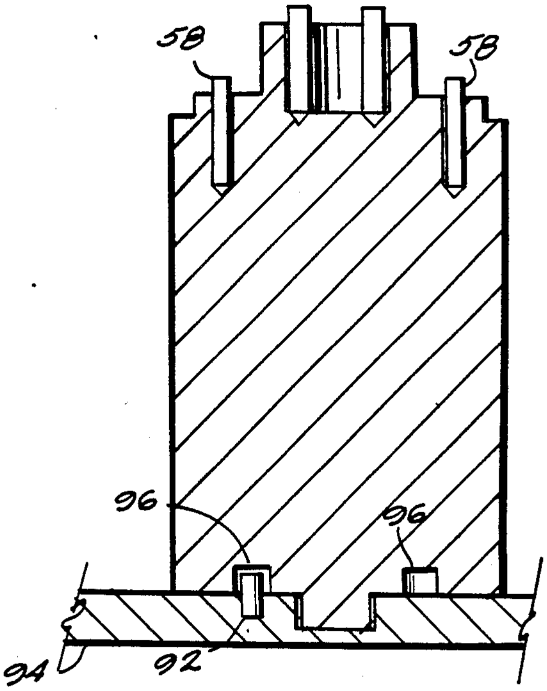
FIG. 22 is a cross sectional side view showing the position of the container stop pin.

Referring now to FIGS. 21 and 22, the container stop operation will be explained. Container stop pin 92 is mounted in a bottom plate 94 of field unit 24. Ejector pinion 34 includes notches 96 for clearing the stop pin during ejector pinion 34 rotation. In effect, stop pin 92 prevents further ejector pinion 34 rotation until the dispensed container 52 (shown in FIG. 21) is removed. Thus, pin 92 prevents inadvertent or intentional attempted insertion of containers back into the unit which could jam the dispensing mechanism.

Figure 23:
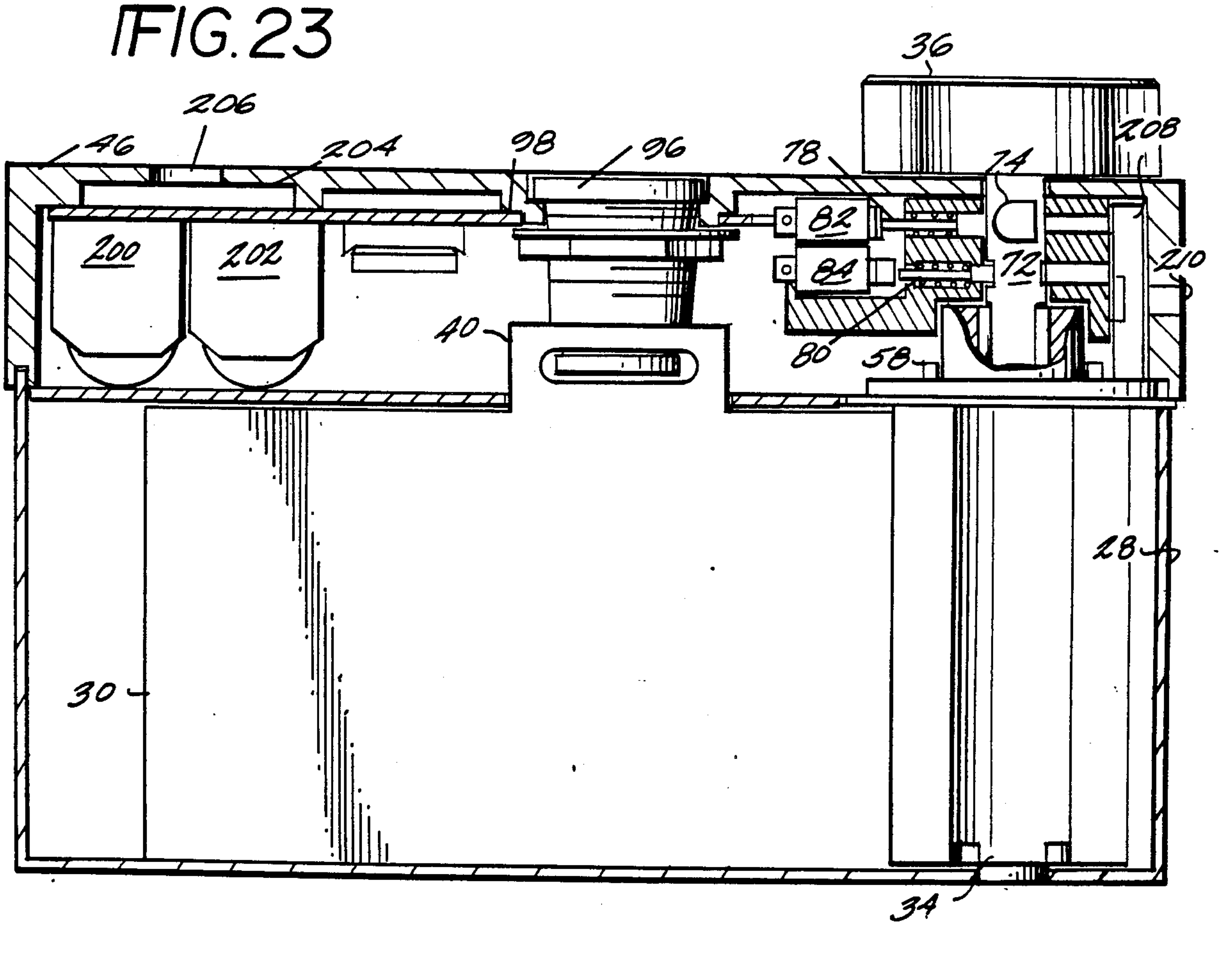
FIG. 23 is a cross section view of the assembled Field Unit.

Referring now to FIG. 23, there is shown a cross sectional view of field unit 24 in an assembled condition showing both dispensing module portion 46 and storage base 28. Slotted extension 40 of partition 30 is engaged by a cam lock 96 for securing dispensing module 46 and storage base 28 in an assembled condition. The electronic subsystem including the microprocessor is formed on a circuit board 98 within dispensing module portion 46. The electronic subsystem is powered by a battery 200. A second battery 202 provides power for operating the solenoid. Circuit board 98 has mounted thereon a liquid crystal display 204 for displaying information to the user through a window 206 in the upper surface of dispenser module portion 46. Knob 36 for effecting a dispensing operation is shown in the upper right corner of this figure. Dispensing module portion 46 also includes piezo electric alarm 208 for sounding an audible alarm through an opening 210 to alert the user that it is time to dispense a dose of medication.

Figure 24:
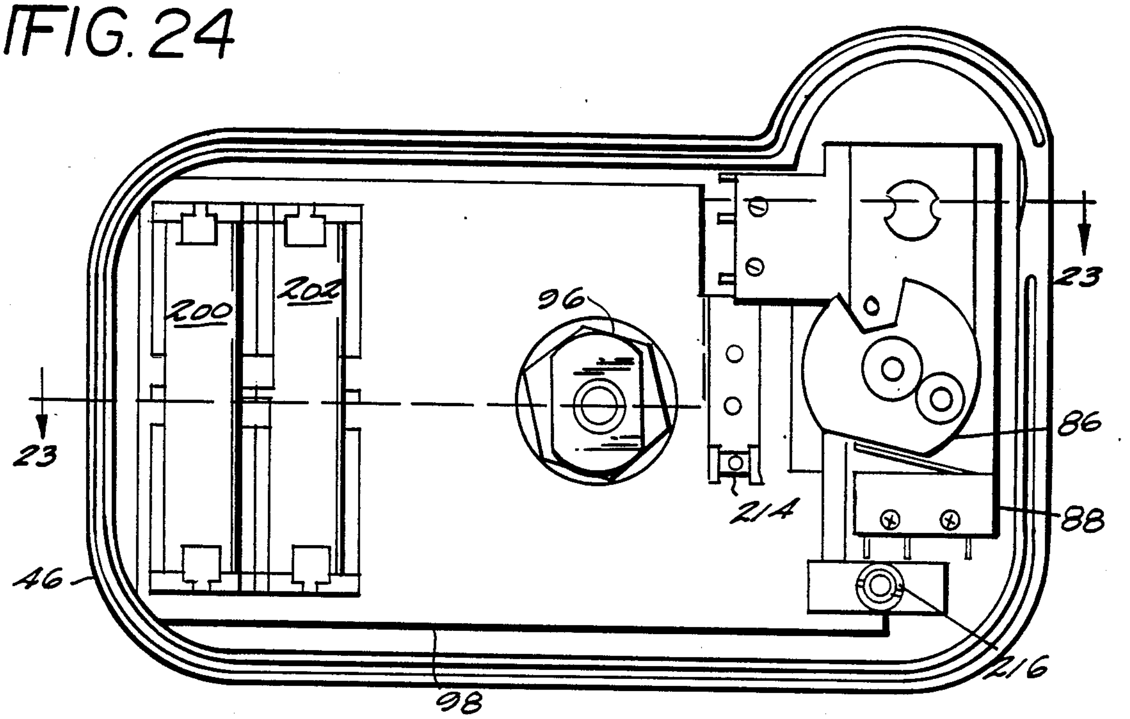
FIG. 24 is a view looking up at the dispensing module portion of the field unit.

Referring now to FIG. 24, there is shown a view looking up into the dispenser module portion 46 of field unit 24. Ejector pinion 34 is not shown in this figure. Three conductor connector 216 provides interconnection to interface unit 22. Push button switch 214 allows the user to reset the microprocessor 100 to signal a base unit 20 request.

Field Unit 24 Electronic Subsystem

Figure 25:
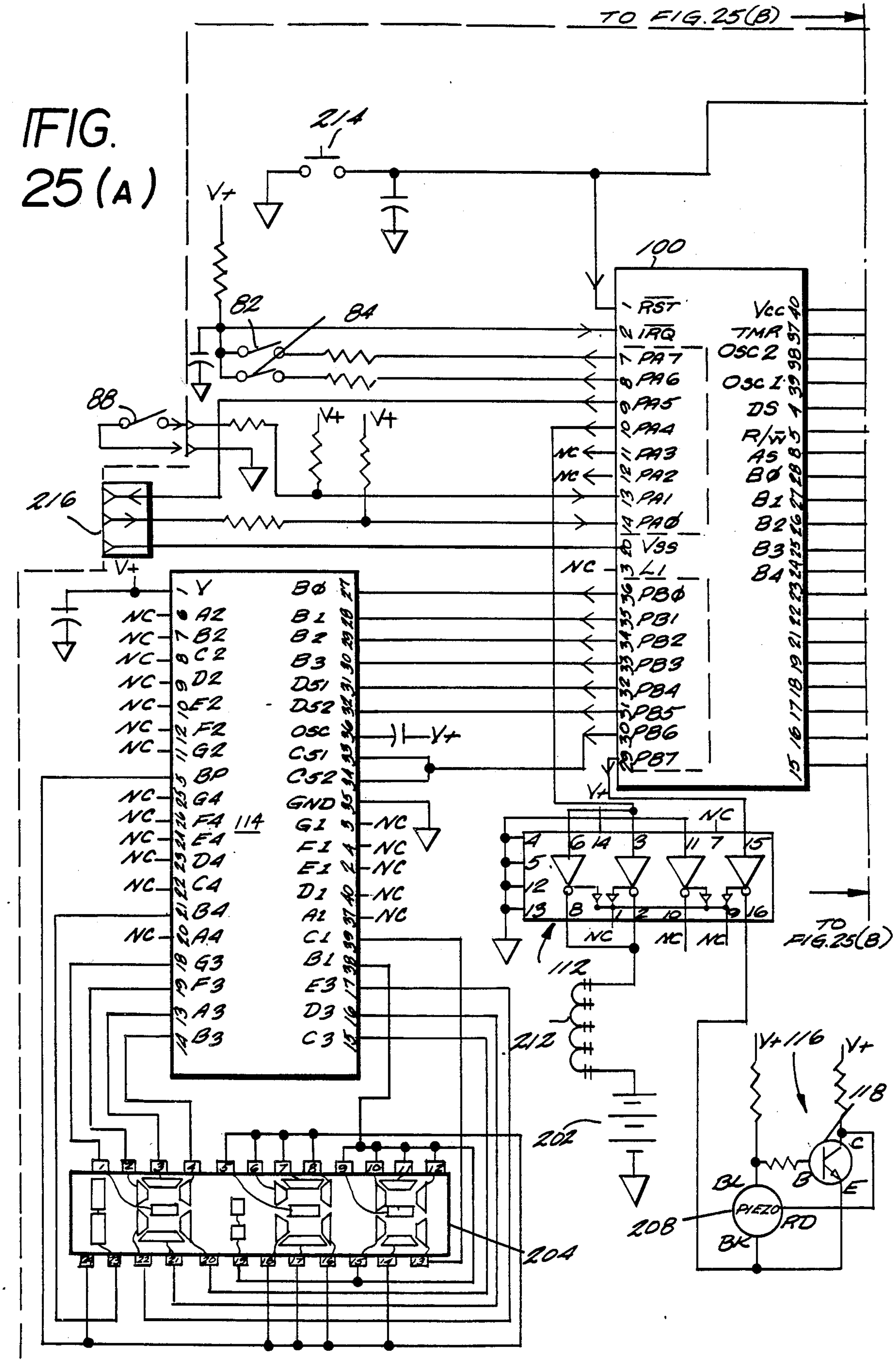
FIGS. 25 A and B are a schematic diagram of the electronic subsystem of the field unit.
Figure 25B:
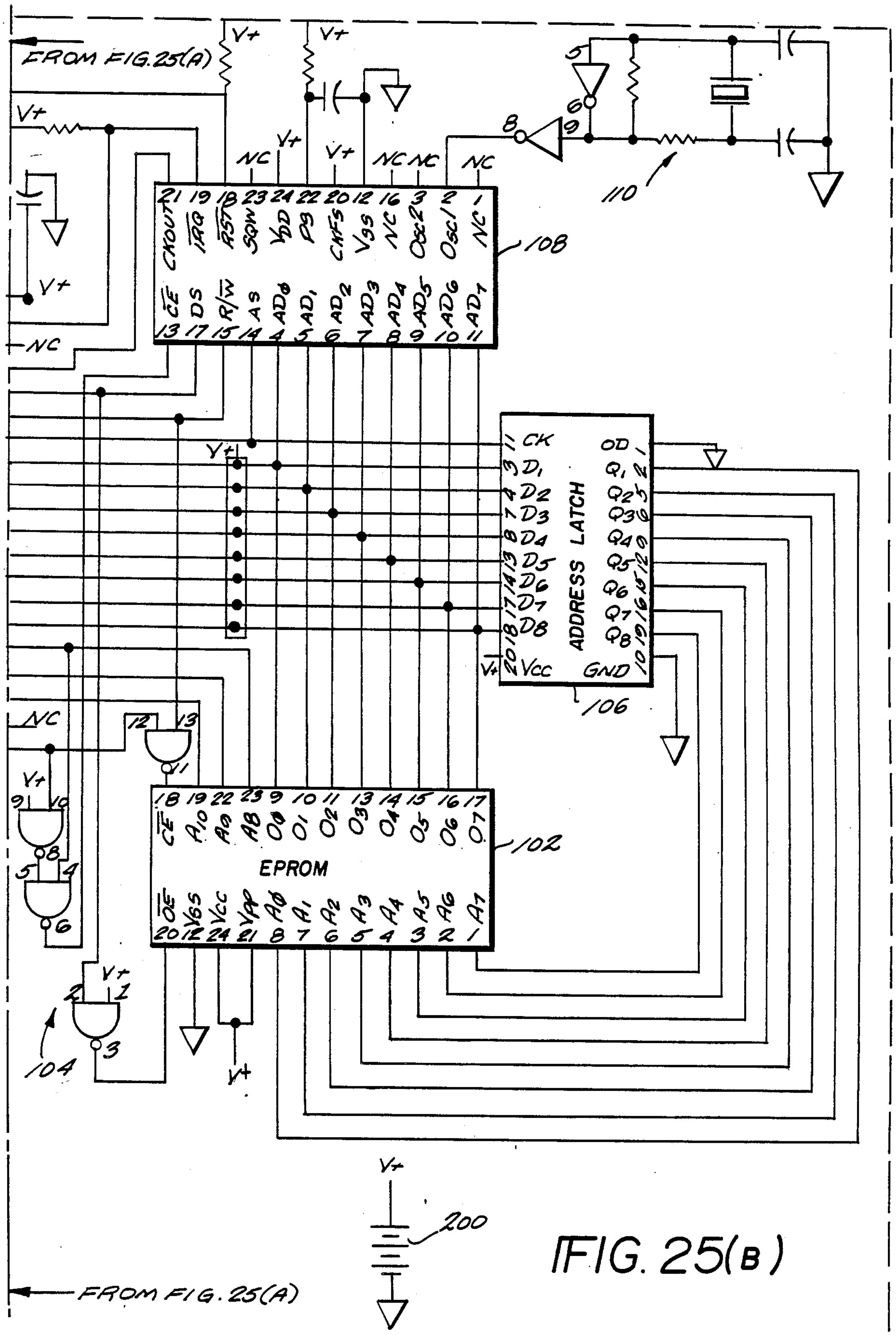

Referring now to FIGS. 25(A) and 25(B), there is shown a schematic diagram of the electronic subsystem hardware of a field unit 24. The functions of electronic subsystem are as follows:

1. It provides RAM (random access memory) for approximately 131 bytes (or more) of information. Fifty of these bytes correspond to 50 alphanumeric characters that define dosing schedule and identifying data. The remaining 81 bytes of memory are used to store one byte which holds the dosage taken count and 80 bytes that contain the date and time data when up to forty dosages have been taken. The size of the RAM required is a function of the number of dosages that can be delivered and the amount of identifying data desired.
2. It provides information as to the real or related time of day and date. This information is made accessible to the microprocessor for the purposes of recording dosing times and for schedule checking.
3. It provides signalling element(s) to indicate to the microprocessor when a dosage has been dispensed.
4. A signalling element is provided to indicate that the ejector locking mechanism is in its locked position.
5. A communications path is provided for sending data to and receiving data from interface unit 22 and base unit 20.

6. A clock display with its associated driver circuitry is provided to display the next dosing time (including AM/PM and proper day indicators).
7. An ejector unlock mechanism and associated driver circuitry is provided such that access to dosages is under field unit electronics control.
8. An audible alarm with its associated circuitry is provided such that the monitor user can be alerted to an impending dosing time.
9. Programmable logic and control circuitry are provided for integrating the above eight functions into an effective unit.

Figure 26:
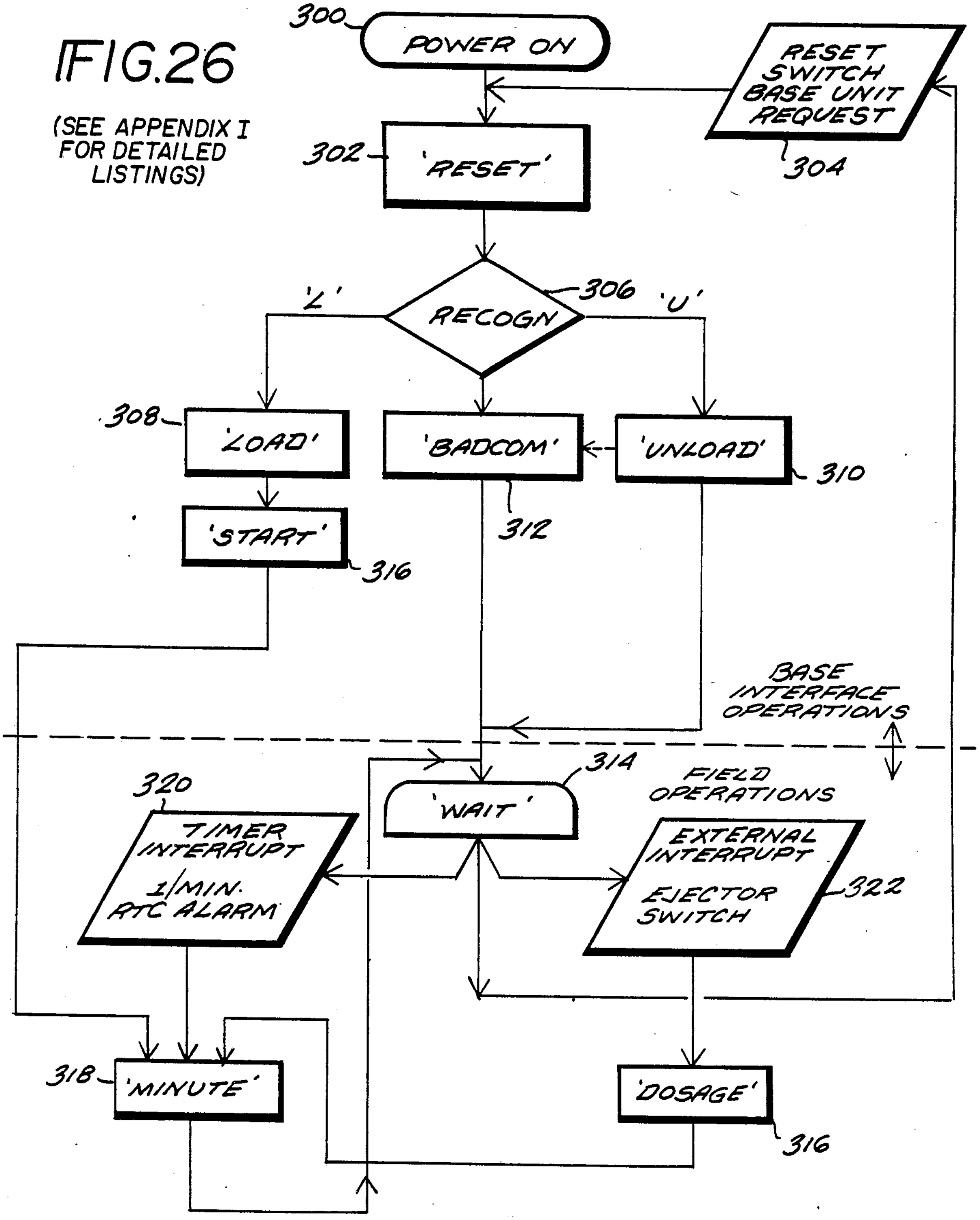
FIG. 26 is a flow chart of the software controlling the operations of the field unit.

These functions are carried out by the electronic subsystem which is microprocessor-based and under the control of software flow charted in FIG. 26 and listed in Appendix I. The electronic subsystem features low power consumption such that it can operate from a single small battery for a period of time that will accommodate the longest possible dosing schedule that could be programmed into the unit. Solenoid 212 is powered by a separate solenoid battery 202 so that voltage swings due to solenoid operation will not affect electronic subsystems. Battery operation affords maximum portability and allows more convenient refrigeration, if required. The electronic subsystem has high noise immunity so that operation is not affected by spurious inputs, ambiguous data and address bus signal levels, or supply voltage fluctuations.

The electronics subsystem provides the above-listed functions and features in the following manner.

The programmable logic and control circuitry along with 112 bytes of RAM (random access memory) are provided by a Motorola MC146805E2 microprocessor unit 100, a NMC27C16EPROM102, a 74C00 address decode unit 104, and a 74HC373 Address Latch 106. The microcomputer supports the minimum volume requirement by including on one chip 112 bytes of user RAM, timer circuitry, 16 input/output lines, and the means to simulate a UART (universal asynchronous receiver/transmitter) communications interface to the interface/base units. Of the 112 bytes of user RAM available, one byte contains the dosage taken count, 80 bytes are used to store up to 40 sets of delivered dosage date and time data, and the remaining 31 bytes are used for intermediate results and stack space. Up to 2048 bytes of program storage is provided by the UVEPROM (ultraviolet erased, electrically programmable, read-only memory). The 74COO quad NAND gate decode unit and the 74HC373 latch allow the microprocessor to properly access the EPROM.

The timekeeping function is provided by the Motorola MC146818 real time clock plus RAM 108 and a 32.768 kHz crystal oscillator circuit 110. The real time clock retransmits the 32.768 kHz signal it receives from the crystal oscillator to supply the clock input the microcomputer requires. Crystal oscillator accuracy is approximately +/−0.005% which amounts to an error of about 3 minutes in forty days, the maximum usage period as presently designed. Although the real time clock resolves time to the second, our present system only uses one minute resolution as this is more than sufficient precision for the immediate application. Another function of the real time clock is to, by means of its programmable alarm circuitry, supply a once-per-minute interrupt signal to the microcomputer's timer input where a once-per-minute timer interrupt is generated. System integration is supported by the 50 bytes of user RAM included in the real time clock. These 50 bytes of memory are used to store the identifying and dosing schedule data sent to the field unit during the monitor loading operation.

Microswitches 82, 84, operated by activators 78 and 80, respectively, riding on ejector drive shaft cams 74 and 76, provide the signalling means to indicate the delivery of the next dosage. The ejector drive shaft cams 74 and 76 and the microswitches' 82 and 84 orientation are such that the microswitches are alternately operated as dosages are sequentially delivered. By alternatively enabling the two microswitches 82, 84 electrically by means of output lines PA7 and PA6, a reliable indication of dosage delivery without danger of spurious, multiple signals is accomplished.

A locked ejector condition is signalled to the microcomputer by means of microswitch 88 activated by the ejector locking wheel and connected to input line, PAl.

Communications to the field unit are brought in on input line PA0, and data leaves the microcomputer through output line PA5 on its way to the interface and base units. Communication protocols are provided by UART programs in the EPROM. Baud rate generation is derived from the microcomputer clock frequency. Serial, rather than parallel, formats are used to simplify the communications interface and to permit the widest possible application to a variety of possible base units. The data format presently preferred is 110 baud rate, 8 bit word length, no parity bit, 1 stop bit, and XON/XOFF status disabled.

Liquid crystal display 204 with an ICM7211AM display driver 114 is used to provide next dosing time information to the user. Six output lines, PB0–PB5, are used to update the driver and display after a dosage has been delivered.

Rotary solenoid 212 is used to release (unlock) the ejector locking mechanism under microcomputer control. A separate 4.2 volt battery 202 is used to energize the solenoid circuit since the large current draw causes voltage spikes that would interfere with proper microcomputer operation if a common battery were used. ULN2069 quad Darlington switches 112 provide a high current buffer for the microprocessor control line PB6.

The audible alarm function comprises a piezoelectric element 208 and driver circuitry 116. The driver circuit 116, including a transistor 118 and three resistors, serves to drive the piezoelectric element into oscillation, thereby producing an alarm.

Low power consumption is attained by using

1. All CMOS (complementary metal oxide silicon) circuitry.
2. A relatively slow clock rate (32.768 kHz).
3. Liquid crystal type clock display.
4. Piezoelectric type alarm element.

Consequently, a TR133 4.2 volt mercury battery 200 can power the entire circuit, exclusive of the solenoid, under worst case conditions, and for the maximum period of forty days and still retain a large reserve charge.

High noise immunity is attained by using:

1. All CMOS circuity with its wide noise margins and wide supply voltage limits.
2. Use of a separate battery for solenoid power.
3. Serial communications with error checking routines.

Minimum volume is attained by using:

1. Microcomputer on a chip. The MC146805E2 contains a microprocessor, 112 bytes of user RAM, timer, and 16 I/0 lines, and can be programmed to perform the functions of an UART.

2. Multifunction real time clock. The MC146818 includes 50 bytes of RAM and an alarm interrupt.

Further integration and volume reduction is certainly possible through presently, or soon to be, available VLSI (very large scale integration) components that combine the microcomputer and real time clock functions, or the microcomputer and ROM functions, or even the microcomputer, ROM, and display driver functions. The ultimate in integration is also possible by means of customized CMOS gate arrays that could conceivably contain all the integrated circuit packages presently shown in our present design.

Field Unit Software

Referring now to FIG. 26 there is shown a flowchart of the software associated with the FIG. 25 hardware. A detailed program listing is set forth in Appendix I.

Program execution begins either after a power on reset (Step 300) (i.e. installation of a battery) or upon a hardware reset (Step 304) (i.e. pushing a reset switch 214) (see FIG. 25A) A power on reset is not meaningful except that it insures an orderly configuration of the microprocessor inputs and outputs immediately without the need of further operator action. After a power on reset, the program halts at a safe point (no outputs activated) and waits for the proper beginning of operation.

Normal program execution begins when the reset switch is pushed by the operator to signify a base unit request (see Step 304). This request may be either to load the field unit with data prior to use by the patient or it may be to have the field unit unload the data collected during the term of the patient's use of the Monitor. In either case the first action taken is to configure the microprocessor's input and output ports for proper operation. This routine is named "Reset" (Step 302).

Next, in the "Recogn" (recognition) routine (Step 306), the field unit first sends an ASCII "R" ("ready") to the base unit to indicate that communications may start and then waits to receive an ASCII character from the base unit in order to identify what function is being requested. If the received character is a "L", then the program jumps to the "Load" routine (Step 308). If the character is an "U", then the program jumps to the "Unload" routine (Step 310). If the character received is neither a "L" nor an "U", then a problem has occurred during communications and the program goes to the "Badcom" ("bad communication") section (Step 312).

The "Badcom" routine sends a "?⇄ to the base unit to alert it to the communications problem and then the program jumps to "Wait" (Step 314) where it waits for another push of the reset button to restart the program.

When the field unit recognizes a base unit request to "Load", it proceeds to receive, echo, and store 50 bytes (characters and numbers) of data sent by the base unit. This data includes patient and study identifying information and the dosing parameters data. The information is received as ASCII coded characters that are echoed to the base unit to insure accurate data transfer and then stored in the real time clock user RAM area for later use. The "Load" routine also allows the operator to verify the proper operation of the field unit's alarm and unlock functions before placing the unit into service.

After loading is complete the program enters the "Start" routine (Step 316). Here the real time clock is set to the actual time and is configured to provide a once-a-minute timer interrupt to the microprocessor. Registers in the microprocessor are initialized, the liquid crystal clock display 204 is set to show the first scheduled dosing time and finally, the real time clock is started running. The program then goes to the "Minute" section (Step 318) where the field unit begins user related operations.

In the "Minute" routine, which is reached once per minute via a timer interrupt, the microprocessor first reads the real time clock and stores the present hours and minutes to compare against the events schedule. The following checks are made and appropriate action taken:

1. Is it midnight? If so, increment day counter.
2. Should the piezoalarm be activated? If so, sound alarm 4 times.
3. If the ejector should be unlocked and is not, a pulse is sent to the solenoid to reset the locking wheel.

After completing these tests, the program exists to the "Wait" routine.

For all but a few seconds each minute the program is idling in the "Wait" routine. While in this routine, the microprocessor is in its "Wait" operating mode which disables all functions except the ability to respond to interrupts and resets. This results in very low power consumption which allows the field unit to operate on a small battery for a period of at least 40 days. While in this state, the microprocessor performs no task and simply waits for one of three events to occur.

Once every minute the real time clock will initiate a microprocessor timer interrupt (Step 320) that causes the program to exit "Wait" and go to "Minute" where the alarm and unlock checks will be made as described above. Upon completion of the "Minute" functions, the program returns to "Wait" and awaits the next interrupt.

The delivery of a dosage and the accompanying activation of an ejector switch 82 or 84 (Step 322) will also cause the program to exit "Wait" by means of activating the microcomputer's external interrupt line. In this case the program jumps to "Dosage" (Step 316) where:

1. The dosage counter is incremented.
2. Date and time of dosage delivery data is stored in the microprocessor's user RAM.
3. The program jumps to "Minute" where the events schedule is checked.

After these tasks are completed the program once again returns to "Wait" to await the next interrupt or reset.

The third method of exiting "Wait" is the activation of the reset switch, signalling a base unit request. The servicing of a "Load" request was described above. An "Unload" request is now described.

At the end of the dosing period the field unit is returned to the doctor by the patient. The base unit program for field unit interrogation will request the operator to push the reset switch. The field unit program exits the "Wait" routine, passes through "Reset" to the "Recogn" section where the unload request is recognized, and then jumps to the "Unload" routine. This part of the program sends the original 50 bytes of identifying and dosing schedule data stored in the real time clock RAM back to the Base Unit. The 81 bytes of dosing data stored in the microprocessor's RAM are then sent to the base unit. The field unit checks for an accurate echo from the base unit after each data byte is sent. After data transmission is complete the field unit program goes back to "Wait". If any echo shows that a data transfer error has occurred, the "Unload" program is aborted and a jump is made to "Badcom" where an error flag is transmitted as described earlier.

Interface Unit

Figure 27:
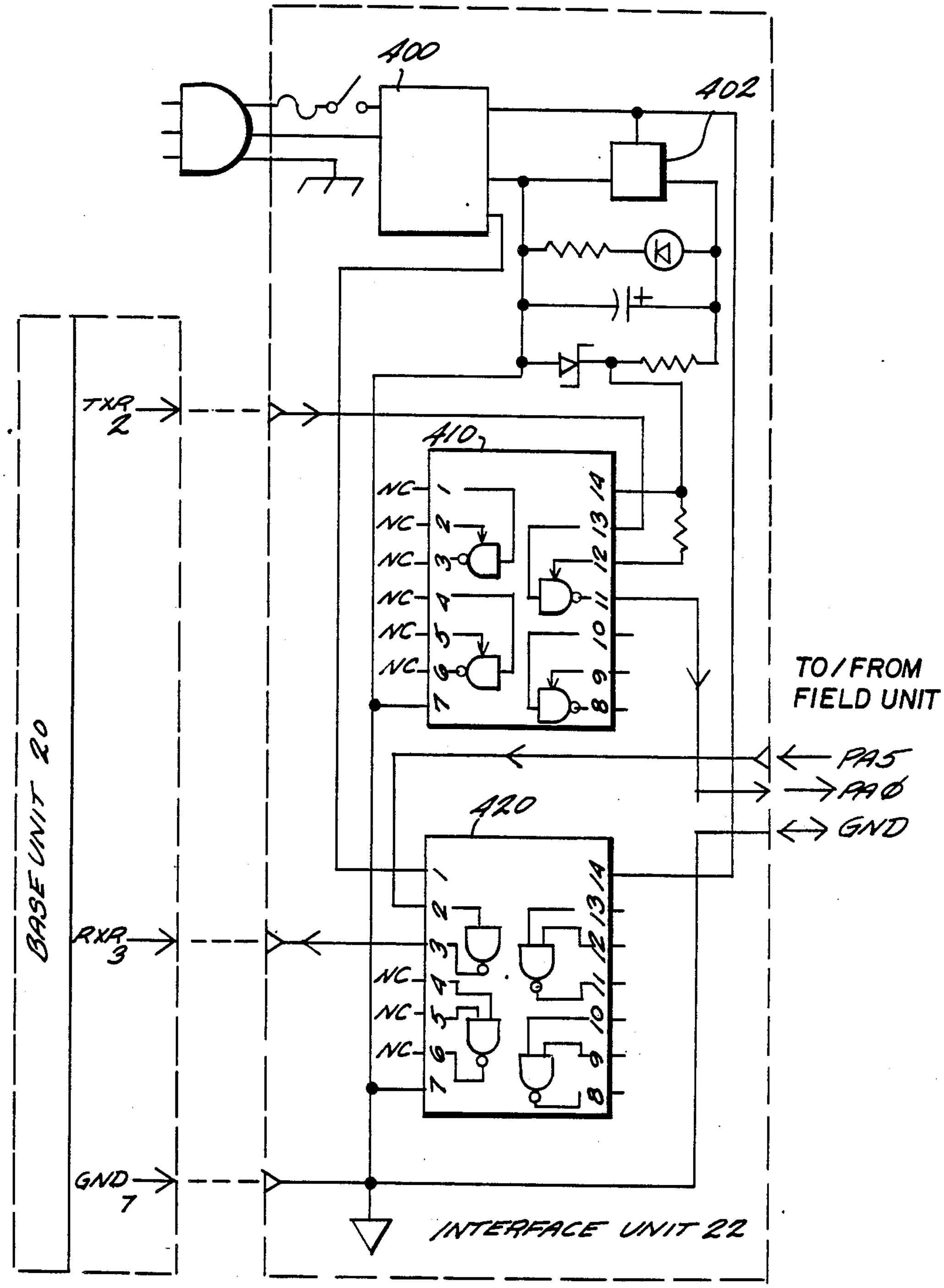
FIG. 27 is a schematic diagram of the interface unit 22.

Referring now to FIG. 27 there is shown a schematic diagram of interface unit 22 and the communication lines of base unit 20.

The purpose of the interface unit 22 is to provide signal level shifting such that the field unit can send and receive serial communications to and from any base unit 20 having an RS-232-C standard serial communications port. By means of this interface unit 22 the compliance monitor system then has the flexibility of using almost any computer with the proper software for its base unit 20 since the use of RS-232-C serial ports is so prevalent.

Under the EIA (Electronics Industries Association) RS-232-C standard, binary state 1 (one) signals are transmitted as a voltage between −5 and −15 volts. Binary state 0 (zero) signals are transmitted as a voltage between +5 and +15 volts. In the field unit the binary state 1 is at +4.2 volts and the binary state zero is at 0 volts ("ground"). Thus, the interface unit must be capable of converting the field unit's +4.2 volt transmissions into −5 to −15 volt signals, and must convert 0 volt levels into +5 to +15 volt signals for proper reception by the base unit RS-232-C port. Conversely, the −5 to −15 volt signals from the base unit port must be changed to approximately +4.2 volts, and +5 to +15 volt signals must be changed to 0 volts (ground) for use by the field unit. The base unit presently preferred (Radio Shack Model 100) outputs +/−5 volts on its RS-232-C transmission lines.

Interface unit 22 includes the following primary elements to provide the functions described above: a multi-voltage power supply including a power supply element 400, preferably a CALEX 22-120, a regulator 402, preferably a 7805, a RS-232-C line receiver 410, a RS-232-C line driver 420, and connectors and cables to interconnect the base 20, interface 22, and field units 24. The power supply converts 120 volts AC input power into +12, −12, and +4.3 volts DC outputs for use by the line driver and receiver circuits. One fourth of a MC1488 Quad Line Driver takes 0 and +4.2 volts DC signals from the field unit's transmitting port (MC146805E2, pin 9, PA5) and converts them to +12 and −12 volts DC signals, respectively, for transmission to the base unit's receiving line (RXR, pin 3). One fourth of a MC1489 quad line receiver takes +5 and −5 volts DC signals from the base unit's transmitting line (TXR, pin 2), and converts them to 0 and +4.3 volts DC signals, respectively, for transmission to the field unit's receiving port (MC146805E2, pin 14, PA0).

The RS-232-C interface standard provides for up to 25 lines for control and data, but this system only requires use of three: line 2, TXR; line 3, RXR; and line 7, GND. Similarly, only three lines are needed between the interface unit and field unit.

The interface unit 22 circuitry does not necessarily need to be housed in a separate cabinet. These electronics could be contained in the field unit except for the disadvantages associated with the increased volume required for the electronics and the additional batteries needed to meet RS-232-C line voltage requirements. The interface electronics could also be contained in the base unit housing, especially since the required voltages are often already available. However, we presently separately house the interface electronics so that other base units may be used without hardware modifications.

Base Unit Hardware

Figure 28:
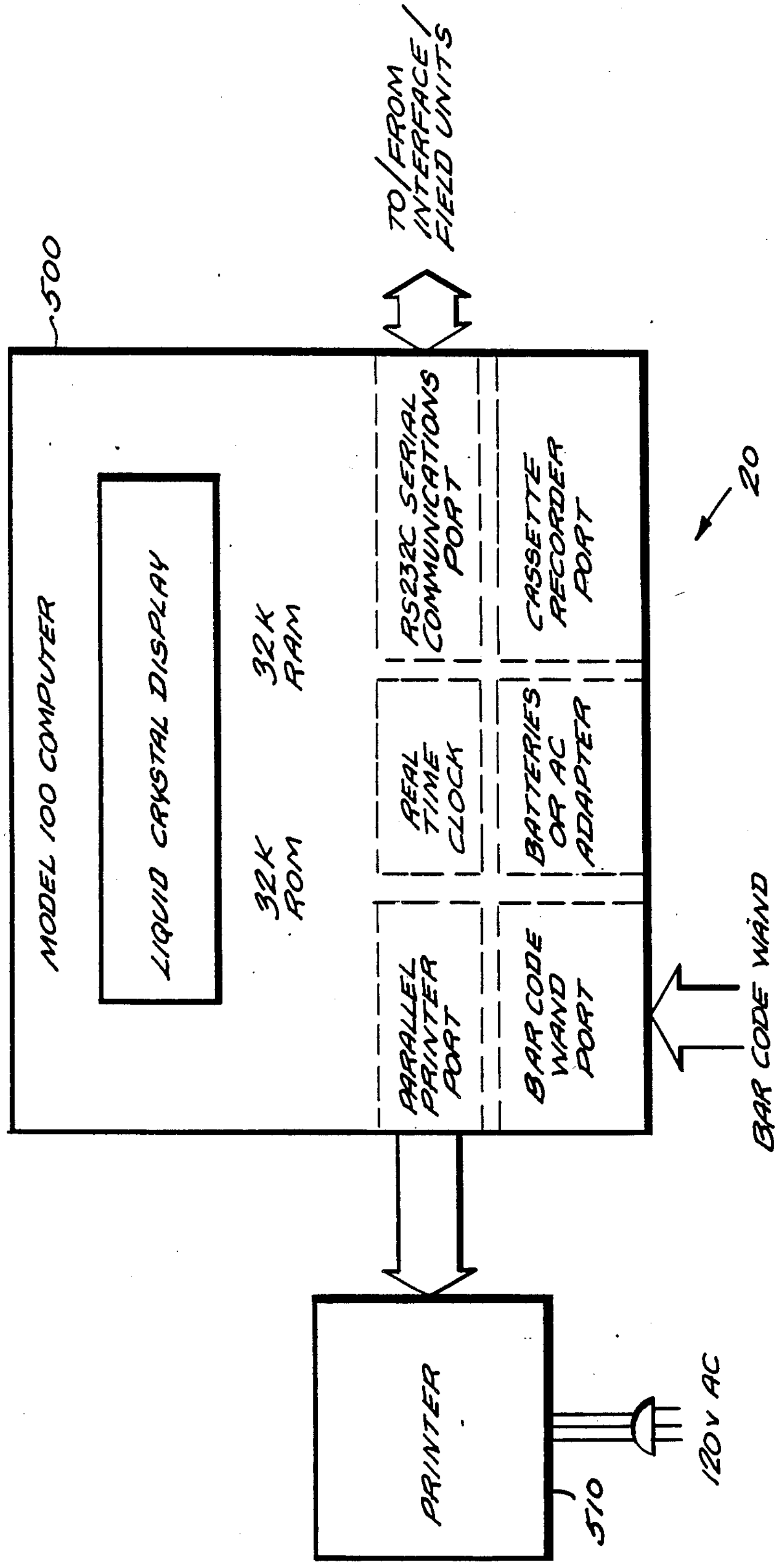
FIG. 28 is a block diagram of base unit 20.

Referring now to FIG. 28 there is shown a block diagram of base unit 20.

Base unit 20 provides the compliance monitor system user with a means of programming field units with the instructions necessary to control drug delivery and a means by which to retrieve data stored in the field unit at the end of the dosing program. Base unit 20 further provides a means for processing the recovered data and generating analytical reports detailing all system operations.

Base unit 20 is a computer system advantageously combining the following attributes:

1. ROM/RAM memory size sufficient to contain the LOAD-M and READ-M programs with their associated workspaces (approximately 12,500 bytes when written in BASIC) plus its own operating systems.
2. RS-232-C Serial communications interface —for loading data to and unloading data from the interface/ field units.
3. Interface to a hard copy device—usually a parallel printer port.
4 Display—internal or external; CRT, LCD, etc.—for prompting user.
5. Keyboard or other data entry device.
6. Hard copy unit—usually a dot matrix printer capable of printing both text and graphics.

Other features of the base unit include:

1. A high level programming language (BASIC, FORTRAN, etc.) interpreter for ease of software development and revision.
2. BASIC interpreter in ROM—eliminates the need for loading the system from, disk or tape before each operating session.
3. Sockets for application program ROMs—eliminates the need for loading the application programs from disk or tape before each operating session; ROM does not require continuous battery backup; software is better protected from pirating.
4. Additional ROM/RAM memory space beyond the minimal requirement such that application programs for statistical analyses, protocol screening, etc. can reside in, and be run from, this one computer.
5. An on-board real time clock so that the operator need not repeatedly enter time and date information during field unit load and read operations.
6. A high level of system component integration —for minimum space requirement, portability, battery operation, and lower cost.

The preferred embodiment uses a Radio Shack Model 100 portable computer 500 and an Epson RX-80 dot matrix graphics printer 510 to meet the above requirements. The Model 100 integrates all of the required functions, except that of the printer, plus several others into one very compact and inexpensive unit. It contains 32K bytes of ROM where the BASIC interpreter resides. 32K bytes of RAM are available, part of which may hold the LOAD-M and READ-M application programs. This RAM is backed-up by a NICAD battery which retains the programs in memory indefinitely when the AC adapter is used or for several days when the unit is operated from batteries. Future versions of the base unit will have the application programs stored in a second 32K byte ROM for which there is a socket in the bottom of the computer. The programs could then never be lost due to loss of battery charge. Further, when programs are in ROM, they are stored in machine language or tokenized BASIC, thus affording better software security.

The Model 100's input/output ports include a parallel printer port for sending output to the dot matrix printer and a RS-232-C serial communications port for communicating with the interface/field units and, perhaps, with other computers. The serial port operates at several user-selectable baud rates including the relatively slow 110 baud rate. This rate is still fast enough to provide a convenient data transfer rate while slow enough to allow the use of a battery conserving, slower clock frequency in the field unit.

Other I/0 ports available, but not presently used, are a bar code wand input, a cassette recorder interface, and a telephone modem. A bar code wand could be used with future models to take inventories required for drug control. The cassette recorder port provides a means for reloading the application programs into memory if memory backup power is ever lost. The modem might be used to allow future field and base units to communicate remotely over phone lines.

The Model 100 has an on-board real time clock so that time and date information need be inputted or updated only infrequently.

The display function is provided by an internal 40 character by 8 line liquid crystal dot graphics display. Prompts and data may be presented in any combination of text and graphics.

The typewriter style keyboard includes cursor control and function keys for easy data entry and program selection.

The Epson RX-80 dot matrix graphics printer has both text and graphics print modes and uses $8\frac{1}{2}\times 11''$ continuous forms. Data and instructions from the Model 100 are handled by a standard Centronics compatible, 8-bit parallel interface.

Of course, many other computer and peripheral combinations could provide the required base unit functions. The Model 100 and RX-80 units were chosen because they offered the best combination of features and low cost then available. Another method of reducing system cost would be to provide software packages for several common computer systems that meet base unit requirements. The customer then would be able to make use of already existing computer hardware.

Base Unit Load Software

Referring now to FIG. 29 there is shown a flowchart of the base unit "LOAD-M" software for storing a medication schedule into a field unit 24. A detailed program listing is set forth in Appendix II.

The LOAD-M program is selected by moving the main menu cursor over LOAD-M and pressing the "Enter" key. The program starts automatically and prompts the user through all loading operations. Even the most inexperienced operator should be capable of reliable data entry after only minimal training. Proper format checks and escape sequences prevent and correct most erroneous inputs.

LOAD-M is selected after field unit 24 has been loaded with dosages and before being given to the patient. The program collects the study and patient identifying data and the dosage schedule and control data through keyboard responses to instructions prompted on the liquid crystal display. This data is loaded into the field unit by way of the interface unit. Finally, a hard copy report of the loaded data is printed.

More specifically, operation is as follows:

1. MMS Logo, Copyright Notice, and "Monitor Loading Routine" Displayed.
2. Data Entry—Identifying and schedule data are entered.
   a. Study ID#—1 to 6 alphanumeric characters. If more than six characters are entered, only the first six are used. Other formats could be used.
   b. Patient ID#—1 to 6 alphanumeric characters. If more than six characters are entered, only the first six are used. Other formats could be used.
   c. Daily dosing schedule—1 to 4 "on the hour" dosing times. Each selected time must be no earlier than the previous dosing time. Selection is made by moving the cursor over the desired hour and pressing "Enter". Once four times are entered, the program automatically jumps to the next operation. An "entry complete" input is required when less than 4 dosing times are entered.
   d. First Dosage Time—The selected dosage schedule is displayed on the LCD screen and the starting dosage is chosen by moving the cursor over the desired time and pressing "Enter".
   e. Starting Day Offset—If dosage taking is not to begin before the end of the current day, the number of days before dosages are to be taken should be entered. This feature allows the monitor system operator to load field units in advance, whenever convenient.
   f. Number of Doses Loaded—Knowing the number of doses loaded allows field unit 24 to stop alarm and display functions after the last dose is delivered.
   g. Monitor Serial #—1 to 6 alphanumeric characters. If more than six characters are entered, only the first six are used. An "L" in the first position indicates that the field unit being loaded has the computer controlled unlock feature and that the unlock period must be inputted. Other formats could be used.
   g. Unlock Period—The operator chooses one of four unlock periods (2 min., 30 min., 59 min., or "Always") by moving the cursor over the proper label and pressing "Enter". In operation, the field unit will unlock the ejector mechanism before the scheduled dosing time by the amount of time specified by the unlock period. Other periods could be used.
   h. Alarm Start—The operator chooses one of four alarm start periods (2 min., 15 min., 30 min., or "None") by moving the cursor over the proper label and pressing "Enter". In operation, the field unit will start sounding the reminder alarm four times every minute when the actual time is within the alarm start period before the scheduled dosing time. Other periods could be used.
   i. Time/Date Check—The computer will display the time and date as given by its own real time clock. If either time or date is in error, the operator may easily correct them at this time by entering the correct values using the formats shown.

Note: Data formats other than those shown above (i.e. longer or shorter serial numbers; fewer, more, or different unlock and alarm start periods; different dosage scheduling options; etc.) can be used as long as the field unit has sufficient RAM capacity and is programmed to interpret a different set of schedule parameters.

3. Field Unit Loading/Testing - Entered data is moved into field unit.
   a. First, LOAD-M disassembles and converts the entered string values into 50 bytes of data suitable for transmission to and use by the field unit.
   b. The operator is then prompted to connect the interface unit (which is connected to the base unit at the RS-232-C port) to the field unit. When the field unit's reset switch is pushed the base unit and field unit begin communications. The entire loading operation is automatic and needs no operator intervention. The LOAD-M program signals to the field unit that a load operation is beginning, waits for a "Ready" reply, and then sends the 50 bytes of data in a sequence expected by the field unit. After each byte is sent, the base unit checks that the field unit has echoed the proper data indicating good data transmission. If a bad echo is received, the data transfer is aborted and restarted.
   c. After loading is complete, the operator is prompted to check alarm and unlock features of the field unit if so desired. By pressing "B" the alarm should sound. By pressing "U" the unlock solenoid should activate.
   d. When loading and testing are complete, LOAD-M prompts the operator to turn off and disconnect the interface unit, and ready the printer.
4. Print Permanent Record of the Loading Operation.
   a. The program proceeds to automatically print a one page record of the loading operation (see sample in Appendix II). All inputted data is repeated and the time and date of loading is recorded. This record then serves to document the loading phase of the monitoring program for use in the patient's, program, and physician's files.
5. Program Exit.
   a. The operator is asked whether there is another field unit to be loaded. If so, the program jumps to the beginning (just after the logo and copyright notice) to restart. If there are no more field units to load, LOAD-M is exited and program control returns to the Model 100 main menu where another program may be selected if desired.

Note: The LOAD-M operations require only approximately two minutes to complete (per field unit).

Base Unit Read Software

Referring now to FIG. 30 there is shown a flowchart of the base unit "READ-M" software for debriefing a field unit 24 and preparing a compliance report. A detailed program listing and a sample compliance report are set forth in Appendix III.

The READ-M program is selected by moving the main menu cursor over READ-M and pressing the "Enter" key. The program starts automatically and prompts the user through all unloading operations. Even the most inexperienced operator should be capable of debriefing field units after only minimal training.

READ-M is selected after the patient returns the field unit at the end of the dosing program. The program unloads from the field unit, by way of the interface unit, the dosage delivery data as well as the previously loaded identification and schedule control data. The data is analyzed, presented on the LCD, and printed on a one or two page report. The format of the LCD and hard copy reports is such that the level of compliance is evident at a glance.

More specifically, operation is as follows:

1. MMS Logo, Copyright Notice, and "Monitor Debriefing Routine" are displayed.
2. Unload Field Unit—Stored data is moved into base unit.
   a. Operator is prompted to connect the interface unit (which is connected to the base unit at the RS-232-C port) to the field unit, turn on the interface unit, and press the field unit's reset switch.
   b. After the reset switch is pressed, the base unit and field unit begin communications through the interface unit. The entire unloading operation is automatic and needs no operator intervention. The READ-M program awaits a "Ready" signal from the field unit, then signals that an unload operation is beginning. Having established communications, the field unit sends 131 bytes of data to the base unit. The first 50 bytes are the same data originally stored during the load operation. The 51 st byte sent contains the count of dosages taken. The final 80 bytes, arranged as 40 pairs, are compressed representations of the dosage delivery time and date data. If all 40 dosages were not taken, data pairs beyond the dosages taken point contain meaningless data. After each data byte is received by the base unit, it is echoed to the field unit to verify proper data transfer. If the field unit receives a bad echo, it sends an ASCII "?" to the base unit which causes the READ-M program to restart the unload operation.
3. Assemble Identifying and Schedule Data.
   a. The first 50 bytes received are assembled into the proper string and numeric variables that represent the schedule and identifying data originally loaded into the field unit by the LOAD-M program.
4. Display Compliance Report.
   a. The READ-M program next unpacks the dosage delivery data and presents an analysis of the compliance levels along with the identifying and schedule data on the liquid crystal display. Compliance is shown by plotting the dosage number against the actual dosing time error. The five error levels used are:

More than 2 hours early
      Less than 2 hours early
      Within plus or minus one hour
      Less than 2 hours late
      More than 2 hours late An asterisk is plotted at the appropriate error level for each of the dosages taken.
5. Print Hard Copy of the Compliance Report.
   a. The compliance report described in 4 is output to the printer. However, instead of plotting an asterisk, the actual dosing time in hours and minutes is plotted at the appropriate error level for each of the dosages taken. Additionally, if the actual dosing time is not on the proper day, the number of days early or late is printed after the dosing time. The hard copy report will require one or two pages depending upon the number of dosages taken. This record then serves to document the debriefing phase of the monitoring program for use in the patient's, program, and physician's files.

Note: Other methods of presenting the compliance analysis (e.g. using four hour error bands, statistical analyses, etc.) are equally valid. The READ-M program quickly shows compliance levels "at-a-glance" and assumes that more detailed analyses can be made in other programs.

6. Program Exit.
   a. The operator is asked whether there is another field unit to be unloaded. If so, the program jumps to the beginning (just after the logo and copyright notice) to restart. If there are no other field units to unload, READ-M is exited and program control returns to the Model 100 main menu where another program may be selected if desired.

Note: The READ-M operations require only approximately two minutes to complete (per field unit).

Further Enhancements

Additional base unit software can be provided for patient screening per the drug therapy protocol during the loading operation in medication efficacy studies.

Additional base unit software can be provided to do statistical analyses of the compliance data for one or more patients.

By means of a keyboard or card reader one field unit could keep track of dosage delivery to several patients by requiring the entry of access and identifying codes.

A modem contained within, or attached to, the field unit would allow remote uploading of data to the base unit from the field unit and downloading of new instructions to the field unit from the base unit.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

CONTROLLED DISPENSING DEVICE

FIELD UNIT PROGRAM LISTING

Appendix I

```
                         MONITOR5.TXT
                            REV. 07
                         08.22.84.LEP

CLOCKS: 32.768 kHz  (F1)  INTO 146818 FROM CRYSTAL OSCILLATOR
        32.768 kHz  (F2)  (F1/1)  INTO 146805E2 FROM 146818
        6553.6 Hz   (F3)  (F2/5)  BUS FREQUENCY

          BUS CYCLE PERIOD = .000152588 SEC.  (1/F3)

          FOR 110 BAUD:
             # TOTAL CYCLES / BIT PERIOD = 60 = 59.57818 = 6553.6/110
                                              (.7% ERROR)

PORT ASSIGNMENTS: PORT A: 0000
                  DDRA  : 0004     00 UPON RESET
                                   FC UPON INITIALIZATION

                    BIT 0 = IN(0)   = RS-232C INTO MONITOR (FROM LINE 2,TXR)
                                      MARK(-12v)=1(+4.3v)   SPACE(+12v)=0(GND)
                                      SET MODEL 100 FOR 28N1D
                        1 = IN(0)   = SPROCKET LOCK STATUS SWITCH
                                      HIGH = LOCKED    LOW = UNLOCKED
                        2 = OUT(1)  = DEBUG USE ONLY (GREEN LED - 'MINUTE')
                        3 = OUT(1)  = DEBUG USE ONLY (RED LED-'WAIT'&'DOSAGE'
                        4 = OUT(1)  = SOLENOID - UNLOCK
                        5 = OUT(1)  = RS-232C OUT OF MONITOR (TO LINE 3, RXR)
                                      1(+4.3v)=MARK(-12v)   0(GND)=SPACE(+12v)
                                      SET MODEL 100 FOR 28N1D
                        6 = OUT(1)  = MICROSWITCH #2 - DRUG DELIVERED
                        7 = OUT(1)  = MICROSWITCH #1 - DRUG DELIVERED


                  PORT B: 0001
                  DDRB  : 0005     00 UPON RESET
                                   FF UPON INITIALIZATION

                    BIT 0 = OUT(1)  = LCD DATA, B0
                        1 = OUT(1)  = LCD DATA, B1
                        2 = OUT(1)  = LCD DATA, B2
                        3 = OUT(1)  = LCD DATA, B3
                        4 = OUT(1)  = LCD DIGIT SELECT, DS1
                        5 = OUT(1)  = LCD DIGIT SELECT, DS2
                        6 = OUT(1)  = LCD CHIP SELECTS
                        7 = OUT(1)  = PIEZO ALARM
```

```
146818 REGISTERS: REGISTER A($010A) - 00101010 = 2A = 32.768 kHz CRYSTAL
                                                 15.625 mSec PI
                                                 64 Hz SQW (NOT USED)

                      BIT 0 - 3 RATE SELECT (0000 = 15.625 mSec PI,
                                                    64 Hz SQW)
                          4 - 6 DIVIDER BITS (010 = 32.768 kHz CRYSTAL)
                          7     UPDATE IN PROGRESS FLAG (READ ONLY)


                  REGISTER B($010B) - 00100110 = 26 = RUN, PIE DISABLED,
                                              AIE ENABLED, UIE DISABLED,
                                              SQWE DISABLED, BINARY,24,
                                              NO DSE
                         SET BIT 7(HOLD)($A6) DURING TIME INITIALIZE

                      BIT 0 - DAYLIGHT SAVINGS ENABLE (0=DISABLE)
                          1 - 24/12 HOUR FORMAT (1=24)
                          2 - DATA MODE (1=BINARY)
                          3 - SQW ENABLE (0=DISABLE)
                          4 - UPDATE ENDED INTERRUPT ENABLE (0=DISABLE)
                          5 - ALARM INTERRUPT ENABLE (1=ENABLE)
                          6 - PERIODIC INTERRUPT ENABLE (0=DISABLE)
                          7 - SET (1=HOLD 0=RUN)


                  REGISTER C(010C) - READ ONLY (CLEARED BY A READ)
                       BIT 6 - PERIODIC INTERRUPT FLAG
                           5 - ALARM INTERRUPT FLAG


                  REGISTER D(010D) - READ ONLY (NOT USED)


     146818 RAM: 0100  SECONDS
                 0101  SECONDS ALARM
                 0102  MINUTES
                 0103  MINUTES ALARM
                 0104  HOURS
                 0105  HOURS ALARM
                 0106  DAY OF WEEK
                 0107  DATE OF MONTH
                 0108  MONTH
                 0109  YEAR
                 010A  REGISTER A
                 010B  REGISTER B
                 010C  REGISTER C
                 010D  REGISTER D
                 --------------
                       (USER RAM) (ALL DATA IS ASCII)
                       (NUMERIC VALUES ARE REPRESENTED BY ASCII EQUIVALENT)
                 010E  D$(0)  SI$ LEFT ]
                 010F  D$(1)  SI$      ]
                 0110  D$(2)  SI$      ]
                 0111  D$(3)  SI$      } STUDY ID#
                 0112  D$(4)  SI$      ]
                 0113  D$(5)  SI$ RIGHT]
                 0114  D$(6)  PI$ LEFT ]
                 0115  D$(7)  PI$      ]
                 0116  D$(8)  PI$      ]
                 0117  D$(9)  PI$      } PATIENT ID#
                 0118  D$(10) PI$      ]
                 0119  D$(11) PI$ RIGHT]
                 011A  D$(12) SN, # OF DOSAGES/DAY, 1-4
                 011B  D$(13) SC(0) SCHEDULED DOSING HOUR (TARGET HOUR) (0-23)
                 011C  D$(14) SC(1)
                 011D  D$(15) SC(2)
                 011E  D$(16) SC(3)
                 011F  D$(17) D1, FIRST DOSAGE POINTER, 0-3
                 0120  D$(18) SN$ LEFT ]
                 0121  D$(19) SN$      ]
                 0122  D$(20) SN$      ]
                 0123  D$(21) SN$      } MONITOR SERIAL#
                 0124  D$(22) SN$      ]
```

```
0125  D$(23)  SN$ RIGHT]
0126  D$(24)  UP, UNLOCK PERIOD (58,30,01, OR 61)
0127  D$(25)  AP, ALARM PERIOD (58,45,30, OR 61)
0128  D$(26)  DA$ LEFT ]
0129  D$(27)  DA$      ]
012A  D$(28)  DA$      ]
012B  D$(29)  DA$      ]
012C  D$(30)  DA$      } LOADING DATE
012D  D$(31)  DA$      ]
012E  D$(32)  DA$      ]
012F  D$(33)  DA$ RIGHT]
0130  D$(34)  TM$ LEFT ]
0131  D$(35)  TM$      ]
0132  D$(36)  TM$      ]
0133  D$(37)  TM$      ]
0134  D$(38)  TM$      } LOADING TIME
0135  D$(39)  TM$      ]
0136  D$(40)  TM$      ]
0137  D$(41)  TM$ RIGHT]
0138  D$(42)  STARTING MINUTES (26 GOES TO 27 IN LOAD-M)
0139  D$(43)  STARTING HOURS
013A  D$(44)  SD, STARTING DAY OFFSET
013B  D$(45)  TD, TOTAL # OF DOSAGES, 1 - 40 (26-27 IN LOAD-M)
013C  D$(46)  0 (NOT USED)
013D  D$(47)  0 (NOT USED)
013E  D$(48)  0 (NOT USED)
013F  D$(49)  0 (NOT USED)

146805 RAM MAP:  0000  PORT A   PORT A DATA REGISTER

0001  PORT B   PORT B DATA REGISTER

0002           EXTERNAL MEMORY SPACE
0003           EXTERNAL MEMORY SPACE

0004  DDRA     PORT A DATA DIRECTION REGISTER

0005  DDRB     PORT B DATA DIRECTION REGISTER

0006           EXTERNAL MEMORY SPACE
0007           EXTERNAL MEMORY SPACE

0008  TIDATA   TIMER DATA REGISTER

0009  TCR      TIMER CONTROL REGISTER
                 TCR7 - INTERRUPT REQUEST (CLEARED BY RESET)
                 TCR6 - INTERRUPT MASK (1=MASKED)
                 TCR5 - EXTERNAL CLOCK SOURCE (1=EXTERNAL)
                 TCR4 - EXTERNAL TIMER PIN ENABLED (1=ENABLE)
                 TCR3 - PRESCALER RESET TO 0 WITH A 1
                 TCR2 - TCR0 - DIVIDE BY FACTOR (000= /1)

-------------------------------------------------

0010  ATEMP    TEMPORARY STORAGE OF A
               TEMP. STORAGE OF DAY OF WEEK DATA FROM RTC READ

0011  CHAR     CHARACTER BYTE FOR SEND C
               RECEIVED CHARACTER ASSEMBLY BYTE IN REC C
               @HOUR2 - 1

0012  COUNT    BIT COUNTER FOR SEND C & REC C

0013  XTEMP    TEMPORARY STORAGE OF X

0014  @HOUR    TARGET HOUR (0-23)

0015  NEXTHR   NEXT HOUR POINTER, 0-3

0016  DAYCNT   ACTUAL DAY COUNTER (# RTC DAY OF WEEK CHANGES)

0017  @DAY     TARGET DAY COUNTER (# OF NEXTHR WRAP-AROUNDS)

0018  HOURS    ACTUAL HOURS DATA REGISTER - FROM RTC READ
```

```
0019   MINUTS   ACTUAL MINUTES DATA REGISTER - FROM RTC READ

001A   DAYWEK   DAY OF WEEK REFERENCE

001B   ЭHOUR2   UPCOMING TARGET HOUR

001C   DOSTKN   D$(50), # OF DOSES DELIVERED

001D-006D       D$(51)-D$(131), TIME AND DAY STORAGE (80 BYTES)

006E-007F       STACK (17 BYTES)
```

```
146805 ROM MAP:

     MAIN ROUTINES:
         1800   RESET    UPON MONITOR RESET BY PUSHBUTTON SWITCH OR POWER UP

         1820   RECOGN   'READY', LOAD OR UNLOAD, 'ERROR'

         1840   LOAD     READS DATA FROM BASE UNIT INTO MONITOR

         18A0   START    INITIALIZES AND STARTS RTC

         1900   UNLOAD   SENDS DATA FROM MONITOR TO BASE UNIT

         1A00   WAIT     POWER DOWN & WAIT FOR INTERRUPT OR RESET

         1B00   MINUTE   TIMER (RTC ALARM) INTERRUPT SERVICE ROUTINE (1/MIN)

         1D00   DOSAGE   EXTERNAL INTERRUPT (DOSAGE DELIVERED) ROUTINE

     SUBROUTINES:
         1E00   SEND C   SERIAL OUTPUT TO INTERFACE UNIT
                            CHARACTER MUST BE IN REG A BEFORE ENTERING ROUTINE
                            REG A IS ALTERED
                            CHARACTER IS IN 0010 ('ATEMP') AT END
                            110 BAUD, START, 8 DATA, NO PARITY, 1 STOP
                            SET MODEL 100 FOR 28N1D

         1E30   DELAY    30 CYCLE DELAY FOR SERIAL COMMUNICATIONS ROUTINES
                            CALLED BY 'SEND C' AND 'REC C'
                            X IS ALTERED IF 'DELAY' NOT USED IN REC C OR SEND C

         1E40   REC C    SERIAL INPUT FROM INTERFACE UNIT
                            RECEIVED CHARACTER GOES INTO REG A
                            REG A IS ALTERED
                            110 BAUD, START, 8 DATA, NO PARITY, 1 STOP
                            SET MODEL 100 FOR 28N1D

         1E80   BADCOM   BAD COMMUNICATION - SENDS '?' AND WAITS

         1E90   UNLOCK   UNLOCK SOLENOID ON FOR 50 mSec (IF LOCKED)

         1EA2   BELL     PIEZO ALARM ON FOR 100 mSec/ OFF FOR 500 mSec

         1EC0   ADVTGT   TARGET REGISTERS & LCD UPDATE TO NEXT DOSING HOUR

         1F20   LCDOUT   LOAD A DISPLAY DIGIT

         1F30   RTCRED   READ RTC HOURS, MINUTES, & DAY OF WEEK

         1F50   PACK     PACK/STORE HR, MIN & RAM DAY DATA INTO 2 BYTES
                           OF 146805 USER RAM

         1F80   DASH     PUT DASH IN HOUR DISPLAY

     INTERRUPT VECTORS:
         1FF6-1FF7  TIMER INTERRUPT FROM WAIT - 1B00 ('MINUTE')
         1FF8-1FF9  TIMER INTERRUPT           - 1B00 ('MINUTE')
         1FFA-1FFB  EXTERNAL INTERRUPT        - 1D00 ('DOSAGE')
         1FFC-1FFD  SWI                       - 1B00 ('MINUTE')
         1FFE-1FFF  RESET                     - 1800 ('RESET')
```

```
--------------------------------------------------------------------------------
MAIN ROUTINES:
--------------------------------------------------------------------------------
                        (RESET SWITCH)
                        (146805 PORT SET-UP)
1000 1800    RESET      A6FC    LDA    #$FC     INITIALIZE 146805E2
1002 1802               B704    STA    0004        PORT A DDR SET, PA0 & PA1 INPUTS

1004 1804               A6FF    LDA    #$FF
1006 1806               B705    STA    0005        PORT B DDR SET, ALL OUTPUTS

1008 1808               A6E3    LDA    #$E3
100A 180A               B700    STA    0000        PORT A OUTPUTS INACTIVE

100C 180C               A640    LDA    #$40
100E 180E               B701    STA    0001        PORT B OUTPUTS TURNED OFF

1010 1810               CC1820  JMP    RECOGN
                        [19]
             NOTE: 146818 DOES NOT NEED TO BE INITIALIZED AT THIS POINT
                   ALTHOUGH NOT KEEPING CORRECT TIME, IT IS PROVIDING
                     PROPER F2 (32.768 kHz) SIGNAL INTO 146805 FOR
                     ACCURATE 110 BAUD TIMING
                   UPON RESET: PIE,AIE,UIE,SQWE ARE CLEARED
                               IRQF,PF,AF,UF ARE CLEARED
--------------------------------------------------------------------------------

                        (LOAD/UNLOAD RECOGNITION)
1020 1820    RECOGN     A652    LDA    #$52
1022 1822               CD1E00  JSR    SEND C   SENDS 'R'($52) FOR 'READY'

1025 1825               CD1E40  JSR    REC C    WAITING TO RECEIVE 'L' OR 'U'
1028 1828               A155    CMP    #$55     CHECK FOR 'U' (UNLOAD)
102A 182A               2603    BNE    RECOG1
102C 182C               CC1900  JMP    UNLOAD

102F 182F    RECOG1     A14C    CMP    #&4C     CHECK FOR 'L' (LOAD)
1031 1831               2603    BNE    RECOG2
1033 1833               CC1840  JMP    LOAD

1036 1836    RECOG2     CC1E80  JMP    BADCOM   TO 'BAD COMMUNICATION' IF NOT 'U', 'L'
                        [25]
--------------------------------------------------------------------------------
                        (LOAD DATA FROM BASE UNIT)
1040 1840    LOAD       A64C    LDA    #$4C
1042 1842               CD1E00  JSR    SEND C   SEND 'L' (LOAD ECHO)

1045 1845    LOAD1      CD1E40  JSR    REC C    WAITING TO RECEIVE 'C'(CONTINUE)
1048 1848               A143    CMP    #$43     CHECK FOR 'C'
104A 184A               26F9    BNE    LOAD1    LOOP UNTIL 'C'

104C 184C               A652    LDA    #$52
104E 184E               CD1E00  JSR    SEND C   SEND 'R' (READY)
           ------------------------------------------------------------

                        (RECEIVE/STORE/ECHO LOOP)
1051 1851               5F      CLR    X
1052 1852    LOAD2      CD1E40  JSR    REC C    WAITING FOR DATA
1055 1855               D7010E  STA    X,010E   WRITE DATA INTO RTC RAM STARTING
                                                    AT 010E
1058 1858               4F      CLR    A
1059 1859               D6010E  LDA    X,010E   RELOAD A FROM RTC FOR ECHO
105C 185C               CD1E00  JSR    SEND C   ECHO
105F 185F               5C      INC    X        INCREMENT RTC MEMORY POINTER
1060 1860               A332    CPX    #$32     CHECK FOR END OF FILE (50 ITEMS)
1062 1862               26EE    BNE    LOAD2    LOOP FOR NEXT DATA
           ------------------------------------------------------------

                        (BELL TEST - SOLENOID TEST)
1064 1864    LOAD4      CD1E40  JSR    REC C    WAITING FOR 'C' OR 'B' OR 'U'
1067 1867               A143    CMP    #$43     CHECK FOR 'C'(COMPLETE)
1069 1869               2712    BEQ    LOAD3
```

```
106B 186B          A142   CMP   #$42     CHECK FOR 'B' (BELL)
106D 186D          2605   BNE   LOAD5
106F 186F          CD1EA2 JSR   BELL     RING BELL
1072 1872          20F0   BRA   LOAD4

1074 1874  LOAD5   A155   CMP   #$55     CHECK FOR 'U' (UNLOCK)
1076 1876          26EC   BNE   LOAD4
1078 1878          CD1E90 JSR   UNLOCK   PULSE UNLOCK SOLENOID
107B 187B          20E7   BRA   LOAD4
            -----------------------------------------------------------

107D 187D  LOAD3   A646   LDA   #$46
107F 187F          CD1E00 JSR   SEND C   SEND 'F' TO ACKNOWLEDGE FINISH
1082 1882          CC18A0 JMP   START
                   [69]
-----------------------------------------------------------------------
                   (INITIALIZE 146818 RTC)
10A0 18A0  START   A6A6   LDA   #$A6
10A2 18A2          C7010B STA   010B     RTC PUT ON HOLD DURING TIME SET
10A5 18A5          4F     CLR   A
10A6 18A6          C70100 STA   0100     SECONDS SET TO 00
10A9 18A9          A63B   LDA   #59
10AB 18AB          C70101 STA   0101     SECONDS ALARM SET FOR 59
10AE 18AE          A6FF   LDA   #$FF     DONT CARE CODE
10B0 18B0          C70103 STA   0103     MINUTES ALARM SET
10B3 18B3          C70105 STA   0105     HOURS ALARM SET
10B6 18B6          A62A   LDA   #$2A     SET RTC REGISTER A
10B8 18B8          C7010A STA   010A     32.768 kHz,15.625 mSec PI,64 Hz SQW
10BB 18BB          C60138 LDA   0138     READ STARTING MINUTES
10BE 18BE          C70102 STA   0102     STARTING MINUTES MOVED INTO 0102
10C1 18C1          C60139 LDA   0139     READ STARTING HOURS
10C4 18C4          C70104 STA   0104     STARTING HOURS MOVED INTO 0104
10C7 18C7          A607   LDA   #7
10C9 18C9          C70106 STA   0106     DAY OF WEEK SET TO 7
            -----------------------------------------------------------
                   (INITIALIZE 146805 RAM REGISTERS)
10CC 18CC          B71A   STA   DAYWEK   DAY OF WEEK REFERENCE SET TO 7
10CE 18CE          C6011F LDA   011F     D1
10D1 18D1          B715   STA   NEXTHR   FIRST DOSAGE POINTER INTO NEXTHR
10D3 18D3          3F16   CLR   DAYCNT
10D5 18D5          3C16   INC   DAYCNT   ACTUAL DAY COUNTER SET TO 1
10D7 18D7          C6013A LDA   013A
10DA 18DA          B717   STA   @DAY
10DC 18DC          3C17   INC   @DAY     LOAD TARGET DAY WITH OFFSET + 1
10DE 18DE          3F1C   CLR   DOSTKN   CLEAR DOSES TAKEN COUNTER

10E0 18E0          1F00   BCLR7 PA7      ENABLE MICROSWITCH #1
            -----------------------------------------------------------
                   (INITIALIZE @HOUR & @HOUR2 & SET CLOCK)
10E2 18E2          CD1ECD JSR   ADVTG1   SET 1st DOSE TIME INTO DISPLAY
            -----------------------------------------------------------
                   (CLEAR DOSAGE MEMORY)
10E5 18E5          5F     CLR   ACCX
10E6 18E6  START1  6F1D   CLR   001D,X   CLEAR 80 BYTES STARTING @ 001D
10E8 18E8          5C     INC   ACCX       PREVENTS ACCIDENTAL $1A (26) IN
10E9 18E9          A350   CPX   #80          UNUSED BYTES
10EB 18EB          26F9   BNE   START1
            -----------------------------------------------------------
                   (146805 TIMER SETUP)
10ED 18ED          A630   LDA   $30      SET UP TIMER CONTROL REGISTER
10EF 18EF          B709   STA   TCR          TCR7 - INTERRUPT REQUEST CLEARED
                                             TCR6 - INTERRUPT MASK CLEARED
                                             TCR5 - EXTERNAL CLOCK SOURCE
                                             TCR4 - EXTERNAL TIMER PIN ENAB.
                                             TCR3 - PRESCALER NOT RESET TO 0
                                             TCR2 - TCRO DIVIDE BY 1
            -----------------------------------------------------------
                   (LET RTC RUN)
10F1 18F1          C6010C LDA   010C     READING REGISTER C CLEARS ALARM FLAG
10F4 18F4          A626   LDA   #$26     SET RTC REGISTER B
10F6 18FE          C7010B STA   010B     RUN, AIE ON, PIE, UIE, SQWE OFF
                                         BINARY, 24, NO DSE
            -----------------------------------------------------------
```

```
10F9 18F9            CC1B00 JMP   MINUTE   GO TO 'MINUTE' TO SET BELL & UNLOCK
                     -----
                     [ ]
----------------------------------------------------------------------------
                     (UNLOAD DATA TO BASE UNIT)
                     (HANDSHAKE COMMUNICATIONS)
1100 1900  UNLOAD    A655   LDA   $55
1102 1902            CD1E00 JSR   SEND C   SEND 'U' (UNLOAD ECHO)

1105 1905  ULOAD1    CD1E40 JSR   REC C    WAITING TO RECEIVE 'C'(CONTINUE)
1108 1908            A143   CMP   43       CHECK FOR 'C'
110A 190A            26F9   BNE   ULOAD1   LOOP UNTIL 'C'
        ------------------------------------------------------------

                     (146818 USER RAM UNLOAD/ECHO CHECK LOOP)
110C 190C            5F     CLR   X

110D 190D  ULOAD2    D6010E LDA   010E,X   MOVE CHARACTER FROM RTC RAM INTO A
1110 1910            AD12   BSR   ULOAD6
1112 1912            5C     INC   X        INCREMENT DATA COUNTER
1113 1913            A332   CPX   50
1115 1915            26F6   BNE   ULOAD2   REPEAT LOOP UNTIL 50 BYTES
        ------------------------------------------------------------

                     (146805 UNLOAD/ECHO CHECK LOOP)
1117 1917            5F     CLR   X

1118 1918  ULOAD4    E61C   LDA   001C,X   LOAD DOSAGE DELIVERY DATA
111A 191A            AD08   BSR   ULOAD6   SEND DATA & CHECK ECHO
111C 191C            5C     INC   X        INCREMENT DATA COUNTER
111D 191D            A351   CMP   #81      TEST FOR 81 BYTES SENT
111F 191F            26F7   BNE   ULOAD4   REPEAT LOOP UNTIL 81 BYTES

1121 1921            CC1A00 JMP   WAIT     WAIT FOR INTERRUPT OR RESET
                                               EXTERNAL INTERRUPTS ENABLED
                                               POWER DOWN

        ------------------------------------------------------------

                     (SEND DATA/CHECK ECHO SUBROUTINE)
1124 1924  ULOAD6    CD1E00 JSR   SEND C
1127 1927            CD1E40 JSR   REC C    WAITING FOR ECHO
112A 192A            B110   CMP   0010,A   CHECK FOR PROPER ECHO
112C 192C            2703   BEQ   ULOAD3
112E 192E            CC1E80 JMP   BADCOM   BAD ECHO, GO TO 'BAD COMMUNICATION'

1131 1931  ULOAD3    81     RTS
                     -----
                     [50]

----------------------------------------------------------------------------

                     (POWER DOWN MODE - WAITING FOR INTERRUPTS)
1200 1A00  WAIT      8F     WAIT           WAIT FOR INTERRUPT OR RESET
                                             EXTERNAL INTERRUPTS ENABLED
                                             POWER DOWN

                     [1]
----------------------------------------------------------------------------
           TIMER INTERRUPT
           (RTC ALARM - 1/MIN)
           (INTERRUPT MASK BIT SET AUTOMATICALLY UPON INTERRUPT)

                     (ALLOW ONLY EXTERNAL INTERRUPTS)
1300 1B00  MINUTE    1C09   BSET6 TCR6     (5) MASK TIMER INTERRUPTS
1302 1B02            9D     NOP            ( )
1303 1B03            9C     RSP            ( ) DON'T USE UP STACK
1304 1B04            9A     CLI            (2) ALLOW EXTERNAL INTERRUPTS
                                           ----
                                           (12) 1.8 mSec
        ------------------------------------------------------------
```

```
                        (TIMER INTERRUPT INDICATOR - FOR DEBUG ONLY)
1305 1B05   MINUT1  1400   BSET2 PA2      TURN ON GREEN LED - TIMER INT. INDIC.
         -------------------------------------------------------------

                    (UPDATE HOURS, MINUTES AND DAY)
1307 1B07           CD1F30 JSR   RTCRED  ACTUAL HOURS IN 0018 ('HOURS')
                                         ACTUAL MINUTES IN 0019 ('MINUTS')
                                         DAY OF WEEK IN 0010 ('ATEMP')

130A 1B0A           B610   LDA   ATEMP   CURRENT DAY OF WEEK
130C 1B0C           B11A   CMP   DAYWEK  HAS DAY OF WEEK CHANGED?
130E 1B0E           2704   BEQ   BELLOK
1310 1B10           B71A   STA   DAYWEK  UPDATE DAY OF WEEK REFERENCE
1312 1B12           3C16   INC   DAYCNT  UPDATE ACTUAL DAYS COUNT
         -------------------------------------------------------------

                    (ACTUAL VS TARGET TIME TESTS)
1314 1B14   BELLOK  B617   LDA   @DAY
1316 1B16           4C     INC   ACCA
1317 1B17           B116   CMP   DAYCNT  IS TD+1 < AD ?
1319 1B19           2406   BHS   MINUT2
                    (AD > TD + 1)
131B 1B1B           CD13C0 JSR   ADVTGT  VERY LATE - ADVANCE TARGET
131E 1B1E           CC1B14 JMP   BELLOK  RESTART

1321 1B21   MINUT2  2620   BNE   MINUT3
                    (AD = TD + 1)
1323 1B23           B618   LDA   HOURS
1325 1B25           AB18   ADD   #24
1327 1B27           B111   CMP   0011    IS HOURS + 24 >= @HOUR2 - 1
1329 1B29           2506   BLO   MINUT4
132B 1B2B           CD1EC0 JSR   ADVTGT  VERY LATE - ADVANCE TARGET
132E 1B2E           CC1B14 JMP   BELLOK  RESTART
1331 1B31   MINUT4  CD1E90 JSR   UNLOCK  LATE ALL - UNLOCK IF LOCKED & RING BEL
1334 1B34   MINT11  CD1EA2 JSR   BELL    RING BELL FOUR TIMES
1337 1B37           CD1EA2 JSR   BELL
133A 1B3A           CD1EA2 JSR   BELL
133D 1B3D           CD1EA2 JSR   BELL
1340 1B40           CC1B95 JMP   MINT15  EXIT
1343 1B43   MINUT3  B616   LDA   DAYCNT
1345 1B45           B117   CMP   @DAY
1347 1B47           252F   BLO   MINUT5
                    (ACTUAL DAY = TARGET DAY)
1349 1B49           B618   LDA   HOURS
134B 1B4B           B111   CMP   0011    IS HOURS < @HOUR2 - 1 ?
134D 1B4D           2506   BLO   MINUT6
134F 1B4F           CD1EC0 JSR   ADVTGT  VERY LATE - ADVANCE TARGET
1352 1B52           CC1B14 JMP   BELLOK  RESTART
1355 1B55   MINUT6  B114   CMP   @HOUR
1357 1B57           2503   BLO   MINUT7
1359 1B59           CC1B31 JMP   MINUT4  LATE - UNLOCK & RING BELL
135C 1B5C   MINUT7  4C     INC   ACCA
135D 1B5D           B114   CMP   @HOUR   DOES HOURS = @HOUR - 1 ?
135F 1B5F           2611   BNE   MINUT8
                    (WITHIN 1 HOUR)
1361 1B61   MINT14  B619   LDA   MINUTS
1363 1B63           C10126 CMP   0126    CHECK UNLOCK PERIOD
1366 1B66           2505   BLO   MINUT9
1368 1B68           CD1E90 JSR   UNLOCK  UNLOCK IF NECESSARY  (AM >= UP)
136B 1B6B           B619   LDA   MINUTS
136D 1B6D   MINUT9  C10127 CMP   0127    CHECK ALARM PERIOD
1370 1B70           2403   BHS   MINT10
1372 1B72   MINUT8  CC1B95 JMP   MINT15  EARLY - EXIT
1375 1B75   MINT10  CC1B34 JMP   MINT11  RING BELL & EXIT  (AM >= AP)
         -------------------------------------------------------------

1378 1B78   MINUT5  4C     INC   ACCA    DAYCNT + 1
1379 1B79           B117   CMP   @DAY    DOES AD = TD - 1 ?
137B 1B7B           2613   BNE   MINT12
                    (AD = TD -1)
137D 1B7D           3D14   TST   @HOUR
137F 1B7F           2609   BNE   MINT13
                    (@HOUR = 0)
```

```
1381 1B81             B618   LDA    HOURS
1383 1B83             A117   CMP    #23
1385 1B85             2603   BNE    MINT13
                      (AH = 23)
1387 1B87             CC1B61 JMP    MINT14  GO TO WITHIN 1 HOUR TESTS
138A 1B8A   MINT13    B618   LDA    HOURS
138C 1B8C             B114   CMP    @HOUR
138E 1B8E             2208   BHI    MINT16  <24 HOURS EARLY - EXIT

1390 1B90   MINT12    CD1F80 JSR    DASH    >24 HOURS EARLY - DISPLAY DASH
1393 1B93             2003   BRA    MINT16  EXIT WITHOUT DISTURBING DASH
          ------------------------------------------------------------
1395 1B95   MINT15    CD1EEB JSR    CLKADV  UPDATE CLOCK TO CLEAR OBSOLETE DASH
1398 1B98   MINT16    C6010C LDA    010C    READ RTC REG C TO CLEAR ALARM FLAG

139B 1B9B             A601   LDA    #$01
139D 1B9D             B708   STA    TIDATA  LOAD TIMER WITH ONE COUNT
139F 1B9F             1F09   BCLR7 TCR7     CLEAR TIMER INTERRUPT REQUEST
13A1 1BA1             1D09   BCLR6 TCR6     ALLOW TIMER INTERRUPTS
          ------------------------------------------------------------
13A3 1BA3             1500   BCLR2 PA2      TURN OFF GREEN LED - TIMER INT. INDIC.
          ------------------------------------------------------------

13A5 1BA5             CC1A00 JMP    WAIT    BACK TO 'WAIT'
                      -----
                      [    ]
--------------------------------------11--------------------------------------
                      EXTERNAL INTERRUPT
                      (DOSAGE TAKEN - ACTIVE MICROSWITCH ACTUATION)
                      (INTERRUPT MASK BIT SET AUTOMATICALLY UPON INTERRUPT)

                      (EXTERNAL INTERRUPT INDICATOR - FOR DEBUG ONLY)
1500 1D00   DOSAGE    1600   BSET3 PA3      (5) LIGHT RED LED - EXT. INT. INDIC.

          ------------------------------------------------------------

                      (INTERCHANGE INTERRUPT SWITCH ACTIVATION)
1502 1D02             B600   LDA    PORTA   (3)
1504 1D04             A8C0   EOR    #$C0    (2) 1100 0000
1506 1D06             B700   STA    PORTA   (4) PA7 & PA6 STATES CHANGED

          ------------------------------------------------------------

                      (READ/PACK/STORE DATA)
1508 1D08             CD1F30 JSR    RTCRED  (6) GET CURRENT HOUR, MINUTE,DAY DATA
150B 1D0B             3C1C   INC    DOSTKN  (5) INCREMENT DOSES TAKEN COUNTER
150D 1D0D             CD1F50 JSR    PACK    (6) PACK/STORE DAY & TIME DATA

          ------------------------------------------------------------

                      (CHECK FOR UNIT EMPTY)
1510 1D10             B61C   LDA    DOSTKN  ( )
1512 1D12             C1013B CMP    013B    ( ) TEST AGAINST TOTAL # OF DOSAGES, T
1515 1D15             2508   BLO    DOSAG1  ( )

1517 1D17             CD1F80 JSR    DASH    DISPLAY DASH
151A 1D1A             1E00   BSET7 PA7      MICROSWITCHES DEACTIVATED - NO EXT.INT
151C 1D1C             1C00   BSET6 PA6
151E 1D1E             8E     STOP           WAIT FOR RESET - POWER DOWN

          ------------------------------------------------------------

                      (ADVANCE TARGET REGISTERS & UPDATE DISPLAY)
151F 1D1F   DOSAG1    CD1EC0 JSR    ADVTGT  ( ) ADVANCE TARGETS

          ------------------------------------------------------------

1522 1D22             1700   BCLR3 PA3      ( ) RED LED OFF

          ------------------------------------------------------------

                      (EXIT TO MINUTE FOR BELL AND UNLOCK CHECK & THEN WAIT)
1524 1D24             CC1B00 JMP    MINUTE
                      ----
                      [  ]
```

```
------------------------------------------------------------------------------
     SUBROUTINES:
------------------------------------------------------------------------------

                           (SERIAL OUTPUT CHARACTER MUST BE IN A)
                           (USES REG A, REG X, 0010, 0011, 0012)
                           (ALTERS A, RESTORES X, CHARACTER IN 0010)
1600 1E00    SEND C    BF13    STX    XTEMP    (4) STORE X FOR LATER RESTORATION
1602 1E02              B710    STA    ATEMP    (4)
1604 1E04              B711    STA    CHAR     (4) STORE CHARACTER IN 0010 FOR ECHO
                                                   CHECK & IN 0011 FOR SENDING
1606 1E06              A609    LDA    #9       (2) OUTPUT 9 BITS (8 + START)
1608 1E08              B712    STA    COUNT    (4) BIT COUNTER IN 0012
160A 1E0A              2008    BRA    SENDC3   (3) BRANCH TO OUTPUT A 0 (START BIT)
                                               ----
                                               (21)
          ------------------------------------------------------------

160C 1E0C    SENDC2    3611    ROR    CHAR     (5) MOVE NEXT BIT INTO CARRY
160E 1E0E    SENDC1    2404    BCC    SENDC3   (3) TEST FOR SET OR CLEAR BIT
1610 1E10              1A00    BSET5  PA5          OUTPUT A 1
1612 1E12              2004    BRA    SENDC4       BRANCH TO DELAY

1614 1E14    SENDC3    1B00    BCLR5  PA5      (5) OUTPUT A 0
1616 1E16              2000    BRA    SENDC4   (3) EQUALIZE TIMING

1618 1E18    SENDC4    CD1E30  JSR    DELAY    (6) TO TIMING DELAY FOR 110 BAUD
161B 1E1B              3A12    DEC    COUNT    (5) DECREMENT BIT COUNTER
161D 1E1D              26ED    BNE    SENDC2   (3) TEST IF ANOTHER BIT TO SEND
                                               ----
                                               (60) CYCLES BETWEEN BITS
          ------------------------------------------------------------

161F 1E1F    STOPBT    9D      NOP             (2) 8 CYCLE DELAY
1620 1E20              9D      NOP             (2)
1621 1E21              9D      NOP             (2)
1622 1E22              9D      NOP             (2)
1623 1E23              1A00    BSET5  PA5      (5) SEND STOP BIT
1625 1E25              CD1E30  JSR    DELAY    (6) DELAY FOR THE STOP BIT
          ------------------------------------------------------------

1628 1E28              BE13    LDX    0013     (3) RESTORE X
162A 1E2A              81      RTS             (6) RETURN
                       [43]                        ASSUMES 8 CYCLES TO REENTER SEND C
                                                   (129 CYCLES BETWEEN CHARACTERS)
------------------------------------------------------------------------------

                       30 CYCLE (4.58 mSec) DELAY FOR SEND/RECEIVE SUBROUTINES
                       (ALTERS X UNLESS USED BY SEND C OR REC C)
1630 1E30    DELAY     AE03    LDX    #$03     (2) COUNTER SET TO 3
          ------------------------------------------------------------

1632 1E32    DELAY1    5A      DECX   X        (3) DECREMENT LOOP COUNTER
1633 1E33              26FD    BNE    DELAY1   (3) LOOP
          ------------------------------------------------------------
1635 1E35              9D      NOP             (2) EQUALIZATION
1636 1E36              9D      NOP             (2) EQUALIZATION
          ------------------------------------------------------------
1637 1E37              81      RTS             (6) RETURN TO SEND C OR REC C
                       [8]                     ----
                                               (30) 2+3*6+10 = 30
-------------------------------------13----------------------------------------

                       (SERIAL INPUT CHARACTER GOES INTO A)
                       (ALTERS A, RESTORES X)
1640 1E40    REC C     BF13    STX    XTEMP    STORE REG X FOR LATER RESTORATION
1642 1E42              A608    LDA    #8
1644 1E44              B712    STA    COUNT    NUMBER OF DATA BITS TO READ
1646 1E46    REC C1    0000FD  BRSET  REC C1   TESTS FOR HI TO LO START BIT
                                                   TRANSITION ON PA0
          ------------------------------------------------------------

1649 1E49    1/2DLY    AE04    LDX    #04      (2) DELAY 1/2 BIT TIME (30 CYCLES)
164B 1E4B    DLY1      5A      DECX   X        (3) DECREMENT COUNTER
```

```
164C 1E4C          26FD   BNE   DLY1     (3) LOOP
164E 1E4E          9D     NOP            (2) TIMING EQUALIZATION
164F 1E4F          9D     NOP            (2)    "        "
                                         ----
                                         (30)
     ---------------------------------------------------------

                   (NOW IN MIDDLE OF START BIT)
1650 1E50   FALSE  0000F3 BRSET REC C1   (5) FALSE START BIT TEST
1653 1E53          9D     NOP            (2) TIMING EQUALIZATION
1654 1E54          9D     NOP            (2)    "        "
1655 1E55          9D     NOP            (2)    "        "
1656 1E56          9D     NOP            (2)    "        "
1657 1E57          9D     NOP            (2)    "        "
1658 1E58          2000   BRA   REC C2   (3)    "        "
                                         ----
                                         (18)
     ---------------------------------------------------------

                   (MAIN RECEIVE ROUTINE)
165A 1E5A   REC C2 CD1E30 JSR   DELAY    (6) ONE BIT TIMING DELAY
165D 1E5D          9D     NOP            (2) 6 CYCLE EQUALIZATION
165E 1E5E          9D     NOP            (2)
165F 1E5F          9D     NOP            (2)
1660 1E60          010000 BRCLR REC C3   (5) TEST INPUT (PA0) AND SET C-BIT
1663 1E63   REC C3 3611   ROR   CHAR     (5) ASSEMBLE CHARACTER
1665 1E65          3A12   DEC   COUNT    (5) DECREMENT BIT COUNTER
1667 1E67          26F1   BNE   REC C2   (3) TEST FOR MORE BITS TO READ
                                        -----
                                         (60) CYCLES BETWEEN BITS
     ---------------------------------------------------------

1669 1E69          CD1E30 JSR   DELAY    WAIT OUT THE 9TH (STOP) BIT
     ---------------------------------------------------------
166C 1E6C          B611   LDA   CHAR     PUT ASSEMBLED BYTE INTO A

166E 1E6E          BE13   LDX   0013     RESTORE X
1670 1E70          81     RTS            RETURN
                   ----
                   [49]
---------------------------------------------------------------------

                   (BAD COMMUNICATION - SENDS ASCII 30 AND WAITS)
1680 1E80   BADCOM 9C     RSP            RESET STACK POINTER
1681 1E81          A61E   LDA   #$1E     ASCII 30
1683 1E83          CD1E00 JSR   SEND C   SEND ASCII 30 (BAD COMMUNICATION)
1686 1E86          CC1A00 JMP   WAIT     WAIT FOR RESTART
                   ----                  (RESET WILL RESET SP TO 7F)
                   [9]
-----------------------------------14--------------------------------
                   (UNLOCK SOLENOID ON FOR 50 mSec,
                   (ALTERS A, ALTERS X)

                   (TEST UNLOCK SWITCH)
1690 1E90   UNLOCK 020001 BRSET1UNLCK1   IS SPROCKET LOCKED ? (PA1 = 1)
1693 1E93          81     RTS            EXIT - ALREADY UNLOCKED

     ---------------------------------------------------------

1694 1E94   UNLCK1 1800   BSET4 PA4      TURN ON UNLOCK SOLENOID
     ---------------------------------------------------------

1696 1E96          A60B   LDA   #11      11*4.58=50 mSec ON DELAY
1698 1E98   UNLCK2 CD1E30 JSR   DELAY
169B 1E9B          4A     DEC   A
169C 1E9C          26FA   BNE   UNLCK2   LOOP
     ---------------------------------------------------------

169E 1E9E          1900   BCLR4 PA4      TURN OFF UNLOCK SOLENOID
     ---------------------------------------------------------

16A0 1EA0          81     RTS
                   ----
```

```
                    [17]
---------------------------------------------------------------------------

                    (PIEZO ALARM ON FOR 100 mSec / OFF FOR 500 mSec)
                    (ALTERS X, ALTERS A)

16A2 1EA2   BELL    1E01   BSET7 PB7     BELL ON
          ------------------------------------------------------------

16A4 1EA4           A610   LDA   #16     ON DELAY OF 6.4 * 16 = 100 mSec
16A6 1EA6   BELL01  CD1E30 JSR   DELAY
16A9 1EA9           4A     DEC   A
16AA 1EAA           26FA   BNE   BELL01
          ------------------------------------------------------------

16AC 1EAC           1F01   BCLR7 PB7     BELL OFF
          ------------------------------------------------------------

16AE 1EAE           A650   LDA   #80     500 mSec OFF DELAY
16B0 1EB0   BELL02  CD1E30 JSR   DELAY
16B3 1EB3           4A     DEC   A
16B4 1EB4           26FA   BNE   BELL02
          ------------------------------------------------------------

16B6 1EB6           81     RTS
                    ----
                    [21]
---------------------------------------------------------------------------
                    (INCREMENT 'NEXTHR', '@DAY' IF NECESSARY)
                    (UPDATE '@HOUR' & '@HOUR2' & DISPLAY)
16C0 1EC0   ADVTGT  3C15   INC   NEXTHR  INCREMENT NEXT HOUR POINTER
          ------------------------------------------------------------
16C2 1EC2           B615   LDA   NEXTHR
16C4 1EC4           C1011A CMP   011A    COMPARE AGAINST SN
16C7 1EC7           2504   BLO   ADVTG1
16C9 1EC9           3F15   CLR   NEXTHR  WRAP NEXT HOUR POINTER TO 0
16CB 1ECB           3C17   INC   @DAY    INCREMENT TARGET DAY COUNTER

16CD 1ECD   ADVTG1  BE15   LDX   NEXTHR
16CF 1ECF           D6011B LDA   011B,X
16D2 1ED2           B714   STA   @HOUR   UPDATE TARGET HOUR REGISTER
          ------------------------------------------------------------
                    (DETERMINE UPCOMING TARGET HOUR)
16D4 1ED4           5C     INC   ACCX
16D5 1ED5           C3011A CPX   011A    COMPARE AGAINST SN
16D8 1ED8           2507   BLO   ADVTG2
16DA 1EDA           C6011B LDA   011B    SC(0)
16DD 1EDD           AB18   ADD   #24     +24 IF NEXT DAY
16DF 1EDF           2003   BRA   ADVTG3
16E1 1EE1   ADVTG2  D6011B LDA   011B,X
16E4 1EE4   ADVTG3  B71B   STA   @HOUR2  UPDATE UPCOMING TARGET HOUR
16E6 1EE6           B61B   LDA   @HOUR2
16E8 1EE8           4A     DEC   ACCA
16E9 1EE9           B711   STA   0011    @HOUR2 - 1 INTO 'CHAR'
          ------------------------------------------------------------
                    (LCD UPDATE TO NEXT DOSING HOUR)
                    (AM/PM CHECK)
16EB 1EEB   CLKADV  B614   LDA   @HOUR
16ED 1EED           A10B   CMP   #11     TEST FOR AM OR PM
16EF 1EEF           2204   BHI   PM
16F1 1EF1           A630   LDA   #$30    AM
16F3 1EF3           2002   BRA   CLK1
16F5 1EF5   PM      A632   LDA   #$32    PM
16F7 1EF7   CLK1    CD1F25 JSR   LCDOUT  DIGIT 1 UPDATED
                    (CONVERT FROM 24 TO 12 HOUR)
16FA 1EFA           B614   LDA   @HOUR
16FC 1EFC           4D     TST   ACCA
16FD 1EFD           2604   BNE   CLK2
16FF 1EFF           AB0C   ADD   #12     0 CONVERTED TO 12
1701 1F01           2006   BRA   CLK3

1703 1F03   CLK2    A10C   CMP   #12
1705 1F05           2302   BLS   CLK3
```

```
1707 1F07            A00C   SUB   #12      13 - 23 CONVERTED TO 1 - 11
                     (HOUR SEPARATED INTO ONES AND TENS DIGITS)
1709 1F09   CLK3     A10A   CMP   #10
170B 1F0B            250D   BLO   CLK4
170D 1F0D            A00A   SUB   #10
170F 1F0F            AB10   ADD   #16      DS1=1 DS2=0
1711 1F11            CD1F25 JSR   LCDOUT   DIGIT 3 LOADED WITH 0,1, OR 2
1714 1F14            A601   LDA   #01
1716 1F16            CD1F25 JSR   LCDOUT   DIGIT 4 LOADED WITH 1
1719 1F19            81     RTS            EXIT
171A 1F1A   CLK4     AB10   ADD   #16
171C 1F1C            CD1F25 JSR   LCDOUT   DIGIT 3 LOADED WITH 0 - 9
171F 1F1F            A60F   LDA   #$0F
1721 1F21            CD1F25 JSR   LCDOUT   DIGIT 4 BLANKED
1724 1F24            81     RTS            EXIT
                     [  ]           -16-

                     (LOAD DISPLAY DIGIT)
1725 1F25   LCDOUT   B701   STA   PORT B   DIGIT & DS1,DS2 DATA TO 7211

1727 1F27            1D01   BCLR6 PB6      CHIP SELECTS GO LOW (LATCH INPUT)
1729 1F29            1C01   BSET6 PB6      CHIP SELECTS GO HI (LATCH OUTPUT)

172B 1F2B            81     RTS
                     ----
                     [  ]
-------------------------------------------------------------------------------
                     (READ RTC HOURS & MINUTES)
1730 1F30   RTCRED   C6010C LDA   010C     (4) READING RTC REG C CLEARS PF BIT
1733 1F33   RTCRD1   C6010C LDA   010C     (4) (4) (4) LOAD REG C FOR TESTING
1736 1F36            A440   AND   #$40     (2) (2) (2) LOOKING FOR BIT 6 (PF) HIG
1738 1F38            27F9   BEQ   RTCRD1   (3) (3) (3) LOOP IF PF NOT SET

173A 1F3A            C60104 LDA   0104     (4) (4) LOAD CURRENT HOURS
173D 1F3D            B718   STA   HOURS    (4) (4) STORE (000H HHHH) IN 'HOURS'
173F 1E3F            C60102 LDA   0102     (4) (4) LOAD CURRENT MINUTES
1742 1F42            B719   STA   MINUTS   (4)     STORE (00MM MMMM) IN 'MINUTS'
1744 1F44            C60106 LDA   0106     (4)     LOAD DAY OF WEEK
1747 1F47            B710   STA   ATEMP            STORE IN 'ATEMP'

1749 1F49            81     RTS            (6)
                     ----              -------------
                     [  ]                  (   )+( ) =      mSec
                                           MINIMUM VALID ACCESS TIME REQUIRED
                                           7.5 mSec (1/2 PI) IS AVAILABLE
         ------------------------------------------------------------

                     (PACK DATA INTO TWO BYTES & STORE)
1750 1F50   PACK     3419   LSR   MINUTS   (5) DIVIDES MINUTES BY 2 (000M MMMM)
1752 1F52            BE1C   LDX   DOSCNT   (3) LOAD X WITH MEMORY POINTER
1754 1F54            58     LSL   X        (3) MULTIPLY MEMORY POINTER X2

1755 1F55            B616   LDA   DAYCNT   (3) (00DD DDDD)
1757 1F57            48     LSL   A        (3)
1758 1F58            48     LSL   A        (3) (DDDD DD00)
1759 1F59            A4E0   AND   #$E0     (2) (DDD0 0000) DAYS HI
175B 1F5B            BB19   ADD   MINUTS   (3) (DDDM MMMM) DAYS HI + MINUTES
175D 1F5D            A11A   CMP   #26      (2) CHECK FOR BREAK CODE
175F 1F5F            2602   BNE   PACK1    (3) OK
1761 1F61            A61F   LDA   #31      (2) CHANGE 26 TO 31
1763 1F63   PACK1    E71C   STA   001C,X   (6) PACKED DATA STORED IN 146805 RAM

1765 1F65            B616   LDA   DAYCNT   (3) (00DD DDDD)
1767 1F67            48     LSL   A        (3)
1768 1F68            48     LSL   A        (3)
1769 1F69            48     LSL   A        (3)
176A 1F6A            48     LSL   A        (3)
176B 1F6B            48     LSL   A        (3) (DDD0 0000) DAYS LO
176C 1F6C            BB18   ADD   HOURS    (3) (DDDH HHHH) DAYS LO + HOURS
176E 1F6E            A11A   CMP   #26      (2) CHECK FOR BREAK CODE
1770 1F70            2602   BNE   PACK2    (3) OK
1772 1F72            A61F   LDA   #31      (2) CHANGE 26 TO 31
1774 1F74   PACK2    E71B   STA   001B,X   (6) PACKED DATA STORED IN 146805 RAM
```

```
------------------------------------------------------------
1776 1F76            81      RTS            (6)
                     ----                  -----
                     [  ]                  (    ) =      mSec
-----------------------------------17---------------------------------------
                     (PUT DASH IN HOUR DISPLAY)
1780 1F80   DASH     A60F    LDA    #$0F
1782 1F82            CD1F25 JSR     LCDOUT  DIGIT 4 BLANKED

1785 1F85            A61A    LDA    #$1A
1787 1F87            CD1F25 JSR     LCDOUT  DIGIT 3 LOADED WITH A DASH

178A 1F8A            A630    LDA    #$30
178C 1F8C            CD1F25 JSR     LCDOUT  DIGIT 1 LOADED WITH AN A

178F 1F8F            81      RTS
                     ----
                     [  ]
----------------------------------------------------------------------------
----------------------------------------------------------------------------
      IDENTIFYING ASCII

17E0 1FE0            4D                 M
17E1 1FE1            4D                 M
17E2 1FE2            53                 S
17E3 1FE3            40                 @
17E4 1FE4            30                 0
17E5 1FE5            38                 8
17E6 1FE6            2F                 /
17E7 1FE7            32                 2
17E8 1FE8            32                 2
17E9 1FE9            2F                 /
17EA 1FEA            38                 8
17EB 1FEB            34                 4
----------------------------------------------------------------------------
      INTERRUPT VECTORS:
----------------------------------------------------------------------------

17F6 1FF6            1B00               TIMER INTERRUPT FROM WAIT - 1B00
                                        ('MINUTE')

17F8 1FF8            1B00               TIMER INTERRUPT - 1B00 ('MINUTE')

17FA 1FFA            1D00               EXTERNAL INTERRUPT - 1D00 ('DOSAGE')

17FC 1FFC            1B00               SWI - 1B00 ('MINUTE')

17FE 1FFE            1800               RESET - 1800 ('RESET')
                     ----
                     [10]

----------------------------------------------------------------------------
----------------------------------------------------------------------------
```

CONTROLLED DISPENSING DEVICE

"LOAD-M" PROGRAM LISTING

Appendix II

```
10 REM            LOAD      LOAD-M
20 REM            10/1  84  10/18/84
30 REM            REV-04    REV C
40 CLEAR
50 MAXFILES=2
90 ON ERROR GOTO 430
95 REM --------------LOGO-------------
100 CLS:LINE (10,2)-(228,60),1,B:LINE (12,4)-(226,58),1,B
110 PRINT @47,"MEDICAL MICROSYSTEMS, INC."
120 PRINT @133,"Copyright 1984"
130 PRINT @248,"Monitor Loading Routine"
135 PRINT @275,"A4"
140 FOR I=1 TO 1000:NEXT I
145 REM ------------ENTER DATA---------
150 CLS:LINE (184,30)-(221,41),1,B
160 PRINT @163,"";:LINE INPUT "ENTER STUDY ID.# (6 Digits) ";SI$
161 LE=LEN(SI$):IF LE>6 THEN SI$=LEFT$(SI$,6)
162 IF LE<6 THEN 164 ELSE 170
164 FOR I=1 TO 6-LE:SI$=" "+SI$:NEXT I
170 CLS:LINE (190,30)-(227,41),1,B
180 PRINT @162,"";:LINE INPUT "ENTER PATIENT ID.# (6 DIGITS) ";PI$
181 LF=LEN(PI$):IF LF>6 THEN PI$=LEFT$(PI$,6)
182 IF LF<6 THEN 184 ELSE 185
184 FOR I=1 TO 6-LF:PI$=" "+PI$:NEXT I
185 DIM SC(3),TI$(3),D$(49),IN(3)
190 SN=0:CLS:LINE (8,11)-(189,44),1,B
200 LINE (200,19)-(213,36),1,B:LINE(218,19)-(231,36),1,B
210 PRINT @1,"DAILY SCHEDULE SELECTION (1-4 Entries)"
220 PRINT @83,"1    AM     11    1    PM     11"
230 PRINT @123,"212345678901    212345678901"
240 PRINT @154,"X":PRINT @157,"C"
250 PRINT @241,"Move cursor over hour and press 'ENTER'";
260 PRINT @286,"Restart - X      Complete - C";
270 PRINT @122,"";
280 A$=INPUT$(1)
290 IF ASC(A$)=28 THEN PRINT @(120+POS(0)+1),"";
300 IF ASC(A$)=29 THEN PRINT @(120+POS(0)-1),"";
310 IF ASC(A$)<>13 THEN 280
320 IF CSRLIN<>3 THEN 280
330 IF POS(0)=34 THEN 190
340 IF POS(0)=37 THEN 440
350 IF POS(0)>29 OR POS(0)<3 THEN 280
360 IF POS(0)>14 AND POS(0)<18 THEN 280
370 IF POS(0)>14 THEN 390
380 SC(SN)=POS(0)-3:LA=SC(SN):IF LA=0 THEN LA=12
385 TI$(SN)=STR$(LA)+" AM":GOTO 393
390 SC(SN)=POS(0)-6:LA=SC(SN)-12:IF LA=0 THEN LA=12
392 TI$(SN)=STR$(LA)+" PM"
393 IF SN=0 THEN 395
394 IF SC(SN)<SC(SN-1) THEN 280
395 IF LA<10 THEN TI$(SN)=" "+TI$(SN)
400 IF LA>9 THEN LA=LA-10
405 L$=MID$(STR$(LA),2)
410 PRINT @(160+POS(0)),L$;:PRINT @(120+POS(0)),"";
420 SN=SN+1:IF SN=4 THEN 460
425 GOTO 280
430 IF ERR=9 THEN RESUME 190
431 CLS:PRINT "ERROR";ERR:END
432 IF ERR=2 THEN RESUME 1200
434 PRINT "ERROR";:FOR I=1 TO 500:NEXT I:RESUME
440 IF SN=0 THEN 190
450 IF SN=1 THEN D1=(   )TO 620
460 CLS:PRINT @8,"SELECT FIRST DOSAGE TIME";
470 FOR I=0 TO SN-1:PRINT @128+I*8,TI$(I);:NEXT I
```

```
480 PRINT @240,"Move box over first dosage & press ENTER";
490 LINE (3,20)-(39,36),1,B:PRINT @80,"";
500 A$=INPUT$(1):L1=POS(0)*6+3:L2=(POS(0)+6)*6+3
510 IF ASC(A$)<>28 THEN 550
520 IF (POS(0)-8)/8=SN-1 THEN 500
530 LINE (L1,20)-(L2,36),0,B:LINE(L1+48,20)-(L2+48,36),1,B
540 PRINT @88+POS(0),"";:GOTO 500
550 IF ASC(A$)<>29 THEN 590
560 IF POS(0)<9 THEN 500
570 LINE(L1,20)-(L2,36),0,B:LINE(L1-48,20)-(L2-48,36),1,B
580 PRINT @72+POS(0),"";:GOTO 500
590 IF ASC(A$)<>13 THEN 500
600 IF POS(0)=0 THEN 500
610 D1=(POS(0)-8)/8
620 CLS:PRINT @162,"";:LINE INPUT "ENTER STARTING DAY OFFSET ";SD$
630 SD=VAL(SD$)
640 CLS:PRINT @162,"";:LINE INPUT "ENTER # OF DOSES LOADED (1-40) ";TD$
650 TD=VAL(TD$)
700 CLS:LINE(172,30)-(209,41),1,B
710 PRINT @166,"";:LINE INPUT "ENTER MONITOR SERIAL # ";SN$
715 LG=LEN(SN$):IF LG>6 THEN SN$=LEFT$(SN$,6)
720 IF LG<6 THEN 730 ELSE 800
730 FOR I=1 TO 6-LG:SN$=" "+SN$:NEXT I
800 I=1
801 IF I=7 THEN 805
802 IF MID$(SN$,I,1)=" " THEN I=I+1:GOTO801
804 IF MID$(SN$,I,1)="L" THEN 810
805 UP$="  ALWAYS":UP=0:GOTO 1000
810 CLS:PRINT @10,"SELECT UNLOCK PERIOD";
820 PRINT @96,"  2 Min.";CHR$(155);
830 PRINT @136," 30 Min.";
840 PRINT @176," 59 Min.";
850 PRINT @217,"Always";
860 PRINT @280,"Move arrow to selection and press ENTER";:PRINT @105,"";
870 A$=INPUT$(1)
880 IF ASC(A$)<>31 THEN 920
890 IF CSRLIN=5 THEN 870
900 GOSUB 910:PRINT @(CSRLIN+1)*40+24,CHR$(155);:GOTO 870
910 LINE (144,16)-(149,48),0,BF:RETURN
920 IF ASC(A$)<>30 THEN 950
930 IF CSRLIN=2 THEN 870
940 GOSUB 910:PRINT @(CSRLIN-1)*40+24,CHR$(155);:GOTO 870
950 IF ASC(A$)<>13 THEN 870
960 UP=CSRLIN-1
970 ON UP GOTO 972,974,976,978
972 UP$="  2 Min.":UP=58:GOTO 1000
974 UP$=" 30 Min.":UP=30:GOTO 1000
976 UP$=" 59 Min.":UP=1:GOTO 1000
978 UP$="  ALWAYS":UP=61
1000 CLS:PRINT @11,"SELECT ALARM START";
1010 PRINT @97," 2 Min.";CHR$(155);
1020 PRINT @137,"15 Min.";
1030 PRINT @177,"30 Min.";
1040 PRINT @219,"NONE";
1050 PRINT @280,"Move arrow to selection and press ENTER";:PRINT @105,"";
1060 A$=INPUT$(1)
1080 IF CSRLIN=5 THEN 1060
1090 GOSUB 910:PRINT @(CSRLIN+1)*40+24,CHR$(155);:GOTO 1060
1100 IF ASC(A$)<>30 THEN 1130
1110 IF CSRLIN=2 THEN 1060
1120 GOSUB 910:PRINT @(CSRLIN-1)*40+24,CHR$(155);:GOTO 1060
1130 IF ASC(A$)<>13 THEN 1060
1140 AP=CSRLIN-1
1150 ON AP GOTO 1160,1170,1180,1190
1160 AP$=" 2 Min.":AP=58:GOTO 1200
1170 AP$="15 Min.":AP=45:GOTO 1200
1180 AP$="30 Min.":AP=30:GOTO 1200
1190 AP$="   NONE":AP=61
1200 CLS:PRINT @48,"DATE IS: ";DATE$;
1210 PRINT @128,"TIME IS: ";TIME$;
1220 PRINT @205,"If correct press 'C'";
1230 PRINT @245,"If incorrect press 'I'";:PRINT @230,"";
1240 A$=INPUT$(1)
```

```
1250 IF ASC(A$)=67 THEN 1255 ELSE 1260
1255 DA$=DATE$:TM$=TIME$:GOTO 1400
1260 IF ASC(A$)<>73 THEN 1240
1270 LINE(0,32)-(239,63),0,BF
1280 PRINT @201,"Enter correct date using format shown";:PRINT @70,"";
1290 LINE INPUT DA$
1300 LINE(0,32)-(239,63),0,BF
1310 PRINT @201,"Enter correct time using format shown";:PRINT @150,"";
1320 LINE INPUT TM$
1330 DATE$=DA$:TIME$=TM$:GOTO 1200
1400 FOR I=1 TO 6:D$(I-1)=MID$(SI$,I,1):NEXT I
1410 FOR I=1 TO 6:D$(I+5)=MID$(PI$,I,1):NEXT I
1420 D$(12)=CHR$(SN):FOR I=1 TO 4:D$(I+12)=CHR$(SC(I-1)):NEXT I
1430 D$(17)=CHR$(D1)
1440 FOR I=1 TO 6:D$(I+17)=MID$(SN$,I,1):NEXT I
1450 D$(24)=CHR$(UP)
1460 D$(25)=CHR$(AP)
1470 FOR I=1 TO 8:D$(I+25)=MID$(DA$,I,1):NEXT I
1480 FOR I=1 TO 8:D$(I+33)=MID$(TM$,I,1):NEXT I
1490 D$(42)=CHR$(VAL(MID$(TM$,4,2)))
1492 IF ASC(D$(42))=26 THEN D$(42)=CHR$(27)
1495 D$(43)=CHR$(VAL(LEFT$(TM$,2)))
1496 D$(44)=CHR$(SD)
1497 D$(45)=CHR$(TD)
1498 IF ASC(D$(45))=26 THEN D$(45)=CHR$(27)
1508 FOR I=1 TO 4:D$(45+I)=CHR$(0):NEXT I
1509 REM ---------LOAD FIELD UNIT-------
1510 OPEN "COM:28N1D" FOR INPUT AS 1
1520 OPEN "COM:28N1D" FOR OUTPUT AS 2
1530 CLS:PRINT @41,"Verify that Monitor has fresh battery";
1540 PRINT @123,"Connect Interface Unit to Monitor";
1550 PRINT @169,"Turn On Interface Unit";
1560 PRINT @247,"Press Monitor Reset Switch";
1600 B$=INPUT$(1,1)
1610 IF B$<>"R" THEN 1620 ELSE 1650
1620 CLS:PRINT @91,"BAD COMMUNICATION";
1630 PRINT @175,"RESTARTING";
1640 FOR I=1 TO 500: NEXT I:GOTO 1530
1650 CLS:PRINT @0,"Communications Established";
1700 PRINT #2,"L";:B$=INPUT$(1,1):IF B$<>"L" THEN 1620
1710 PRINT @80,"Monitor Verifies Load Mode";
1800 PRINT #2,"C";:B$=INPUT$(1,1):IF B$<>"R" THEN 1620
1820 FOR I=0 TO 49:T[illegible](I):PRINT @176,I+1;:PRIN[illegible],T$;:E$=INPUT$(1,1)
1830 IF E$<>T$ THEN 2445
1835 NEXT I
1840 PRINT @240,"Data Transmission Complete";
1850 FOR I=1 TO 500:NEXT I
1860 CLS:PRINT @7,"Press key 'B' to test alarm";
1870 PRINT @89,"Press key 'U' to unlock";
1900 PRINT @161,"Press Key 'C' When Tests Are Complete";
1920 PRINT @260,"";:A$=INPUT$(1):IF A$="Y" THEN 1990
1922 IF A$="B" THEN PRINT#2,"B";:GOTO 1920
1924 IF A$="U" THEN PRINT#2,"U";:GOTO 1920
1930 IF A$<>"C" THEN 1920
1990 PRINT #2,"C";
2000 B$=INPUT$(1,1):IF B$<>"F" THEN 1620
2005 REM ----------PRINT RECORD---------
2010 CLS:PRINT @46,"Monitor Loading Is Complete";
2020 PRINT @121,"Turn off and disconnect Interface Unit";
2030 PRINT @203,"Printer On?, Align Top, Press 'P'";
2040 PRINT @237,"";:A$=INPUT$(1)
2050 IF A$<>"P" THEN 2040
2060 PRINT @292,"Printing Record";
2100 LPRINT:LPRINT
2105 LPRINT TAB(27);"MONITOR LOAD RECORD"
2107 LPRINT:LPRINT
2110 LPRINT "Study I.D.#";TAB(65);SI$
2120 LPRINT:LPRINT
2130 LPRINT "Patient I.D.#";TAB(65);PI$
2140 LPRINT:LPRINT
2150 LPRINT STRING$(71,"-")
2160 LPRINT:LPRINT
```

```
2170 LPRINT "Delivery Schedule:";TAB(65);TI$(0)
2180 IF SN>1 THEN LPRINT:LPRINT TAB(65);TI$(1) ELSE 2210
2190 IF SN>2 THEN LPRINT:LPRINT TAB(65);TI$(2) ELSE 2210
2200 IF SN>3 THEN LPRINT:LPRINT TAB(65);TI$(3)
2210 LPRINT:LPRINT
2220 LPRINT "     First Dosage:";TAB(65);TI$(D1)
2230 LPRINT:LPRINT
2234 LPRINT "     Start Offset:";TAB(69);SD
2236 LPRINT:LPRINT
2237 LPRINT "     Doses Loaded:";TAB(68);TD
2238 LPRINT:LPRINT
2240 LPRINT STRING$(71,"-")
2250 LPRINT:LPRINT
2260 LPRINT "Monitor Serial #";TAB(65);SN$
2270 LPRINT:LPRINT
2280 LPRINT "  Unlock Period:";TAB(63);UP$
2290 LPRINT:LPRINT
2300 LPRINT "    Alarm Start:";TAB(64);AP$
2310 LPRINT:LPRINT
2320 LPRINT "Date Monitor Loaded:";TAB(63);DA$
2330 LPRINT:LPRINT
2340 LPRINT "Time Monitor Loaded:";TAB(63);TM$
2350 LPRINT CHR$(12):LPRINT CHR$(12)
2360 REM -------------EXIT--------------
2400 CLS:PRINT @166,"Load Another Unit? (Y or N)";
2410 PRINT @195,"";:A$=INPUT$(1)
2420 IF A$="Y" THEN CLEAR:GOTO 150
2430 IF A$<>"N" THEN 2410
2440 CLEAR:MENU
```

MONITOR LOAD RECORD

| | |
|---|---|
| Study I.D.# | 123456 |
| Patient I.D.# | 333333 |

-----------------------------------------------------------------------

| | |
|---|---|
| Delivery Schedule: | 3 AM |
| | 8 AM |
| | 12 PM |
| | 6 PM |
| First Dosage: | 8 AM |
| Start Offset: | 0 |

-----------------------------------------------------------------------

| | |
|---|---|
| Monitor Serial # | L00000 |
| Unlock Period: | 2 Min. |
| Alarm Start: | 2 Min. |
| Date Monitor Loaded: | 03/23/84 |
| Time Monitor Loaded: | 17:03:02 |

CONTROLLED DISPENSING DEVICE

"READ-M" PROGRAM LISTING

Appendix III

```
10 REM        READ-M
20 REM        10/13/8
30 REM        REV 05
100 CLS:LINE (10,2)-(228,60),1,B:LINE (12,4)-(226,58),1,B
110 PRINT @47,"MEDICAL MICROSYSTEMS, INC."
120 PRINT @133,"Copyright 1984"
130 PRINT @247,"Monitor Debriefing Routine"
135 PRINT @275, "A4"
140 FOR I=1 TO 1000:NEXT I
150 CLOSE:CLEAR
200 MAXFILES=2
205 DIM D$(134),SC(3),SC$(3),IN(3)
210 OPEN "COM:28N1D" FOR INPUT AS 1
220 OPEN "COM:28N1D" FOR OUTPUT AS 2
230 REM ----------------UNLOAD-------------------------------------
300 CLS:PRINT @83,"Connect Interface Unit to Monitor";
310 PRINT @169,"Turn ON Interface Unit";
320 PRINT @247,"Press Monitor Reset Switch";
400 B$=INPUT$(1,1)
410 IF B$<>"R" THEN 420 ELSE 450
420 CLS:PRINT @91,"BAD COMMUNICATION";
430 PRINT @175,"RESTARTING";
440 FOR I=1 TO 500:NEXT I:GOTO 150
450 CLS:PRINT @0,"Communications Established";
460 PRINT #2,"U";:B$=INPUT$(1,1):IF B$<>"U" THEN 420
470 PRINT @80,"Monitor Verifies Unload Mode";
480 PRINT #2,"C";:PRINT @160,"Unloading Data";
485 ON ERROR GOTO 2000
490 FOR I=I TO 131:R$=INPUT$(1,1)
495 D$(I-1)=R$
496 IF I=25 OR I=26 OR I=43 OR I=46 THEN 510
500 IF ASC(R$)=30 THEN 420
510 PRINT @176,I;:PRINT #2,R$;:NEXT I
530 PRINT @240,"Data Transmission Complete"
540 FOR I=1 TO 500:NEXT I
600 CLS:PRINT @45,"Monitor Unloading is Complete";
610 PRINT @121,"Turn OFF and disconnect Interface Unit";
620 PRINT @203,"Printer ON?, Align Top, Press 'P'";
630 PRINT @237,"";:A$=INPUT$(1)
639 IF A$<>"P" THEN 630
640 PRINT @295,"Computing";
641 REM -----------------ASSEMBLE IDENTIFYING DATA--------------------
642 SI$=D$(0)+D$(1)+D$(2)+D$(3)+D$(4)+D$(5)
644 PI$=D$(6)+D$(7)+D$(8)+D$(9)+D$(10)+D$(11)
646 SN=ASC(D$(12))
648 SC(0)=ASC(D$(13)):SC(1)=ASC(D$(14)):SC(2)=ASC(D$(15)):SC(3)=ASC(D$(16))
650 D1=ASC(D$(17))
651 SD=ASC(D$(44)):DT=ASC(D$(45))
652 SN$=D$(18)+D$(19)+D$(20)+D$(21)+D$(22)+D$(23)
654 UP=ASC(D$(24)):AP=ASC(D$(25))
656 DA$=D$(26)+D$(27)+D$(28)+D$(29)+D$(30)+D$(31)+D$(32)+D$(33)
658 TM$=D$(34)+D$(35)+D$(36)+D$(37)+D$(38)+D$(39)+D$(40)+D$(41)
660 CT=ASC(D$(50)):IF CT>40 THEN CT=40
661 ON SN GOTO 662,663,664,665
662 IN(0)=24:GOTO 670
663 IN(0)=SC(1)-SC(0):IN(1)=SC(0)+24-SC(1):GOTO 670
664 IN(0)=SC(1)-SC(0):IN(1)=SC(2)-SC(1):IN(2)=SC(0)+24-SC(2):GOTO 670
665 IN(0)=SC(1)-SC(0):IN(1)=SC(2)-SC(1):IN(2)=SC(3)-SC(2):IN(3)=SC(0)+24-SC(3)
670 IF AP=58 THEN AP$="T-2 Minutes"
672 IF AP=45 THEN AP$="T-15 Minutes"
676 IF AP=61 THEN AP$="No Alarm"
680 IF UP=58 THEN UP$="T-2 Minutes"
682 IF UP=30 THEN UP$="T-30 Minutes"
684 IF UP=1 THEN UP$="T-59 Minutes"
686 IF UP=61 THEN UP$="Always Unlocked"
690 FOR I=1 TO 4
```

```
692 IF SC(I-1)<10 THEN SC$(I-1)="0"+RIGHT$(STR$(SC(I-1)),1)+"00":GOTO 696
694 SC$(I-1)=RIGHT$(STR$(SC(I-1)),2)+"00"
696 NEXT I
698 D1$=SC$(D1)
699 REM ------------------------LCD REPORT-------------------------
700 CLS:PRINT @2,"STUDY ID#:";SI$;
720 PRINT @21,"LOAD:";DA$;
735 PRINT " ";LEFT$(TM$,5);
740 PRINT @40,"PATIENT ID#:";PI$;
760 PRINT @59,"UNLOAD:";DATE$;" ";LEFT$(TIME$,5);
770 PRINT @91,"SCH: ";
780 FOR I=1 TO SN:PRINT " ";SC$(I-1);:NEXT I
920 LINE (0,24)-(239,63),1,B
930 LINE (0,43)-(239,43)
940 PRINT @200,"";
1000 J=51:K=D1:TT=((SD+1)*24+SC(D1))*60
1010 FOR I=1 TO CT
1030 GOSUB 1720
1040 IF TB<>6 THEN 1200
1050 PRINT @200+POS(0),"M";
1060 K=K+1:GOSUB 1220:TT=T1:GOSUB 1745:GOTO 1040
1200 PRINT @200+POS(0)+(TB-3)*40,"*";
1210 J=J+2:K=K+1:GOSUB 1220:TT=T1:GOTO 1230
1220 IF K=SN THEN K=0:Z=POS(0):LINE(Z*6-1,24)-(Z*6-1,63):PRINT @200+Z,"";
1225 RETURN
1230 NEXT I
1240 REM ---------------------HARD COPY REPORT----------------------
1300 LPRINT:LPRINT
1310 LPRINT TAB(19);"COMPLIANCE MONITOR DEBRIEFING REPORT"
1320 LPRINT:LPRINT "Study I.D.#";TAB(65);SI$
1330 LPRINT "Patient I.D.#";TAB(65);PI$
1340 GOSUB 1345:GOTO 1350
1345 FOR I=1 TO 71:LPRINT "-";:NEXT I:LPRINT:RETURN
1350 LPRINT "Monitor Serial #";TAB(65);SN$
1360 LPRINT "Loaded   on: ";DA$;" @ ";TM$
1370 LPRINT "Unloaded on: ";DATE$;" @ ";TIME$
1380 GOSUB 1345
1390 LPRINT "Dosage Schedule:";
1400 FOR I=1 TO SN:LPRINT "  ";SC$(I-1);:NEXT I
1410 LPRINT:LPRINT "First Dosage:      ";D1$
1415 LPRINT "Start Day Offset:  ";SD
1417 LPRINT "Doses Loaded:      ";DT
1420 LPRINT "Unlock Period:     ";UP$
1430 LPRINT "Alarm Period:      ";AP$
1440 GOSUB 1345
1500 LPRINT:LPRINT "Compliance Profile:"
1510 LPRINT TAB(12);:FOR I=1 TO 59:LPRINT "-";:NEXT I:LPRINT
1520 LPRINT TAB(12);CHR$(124);">2Hr Early  <2Hr Early   +-1 Hour   <2Hr Late
2Hr Late";CHR$(124)
1530 GOSUB 1345
1600 J=51:K=D1:TT=((SD+1)*24+SC(D1))*60
1602 FOR I=1 TO CT
1604 GOSUB 1720
1606 GOSUB 1630:GOSUB [illegible]:K=K+1:GOSUB 1820:TT=T[illegible]SUB 1745:GOTO 1606
1610 GOSUB 1630:GOSUB 1800:GOTO 1810
1620 REM ------------------------TIME LABEL-------------------------
1630 TA$=SC$(K)
1635 IF TB=6 THEN TI$="MISSED":TB=3:RETURN
1640 IF AH<10 THEN H$="0"+RIGHT$(STR$(AH),1):GOTO 1660
1650 H$=RIGHT$(STR$(AH),2)
1660 IF AM<10 THEN M$="0"+RIGHT$(STR$(AM),1):GOTO 1680
1670 M$=RIGHT$(STR$(AM),2)
1680 TI$=H$+M$
1685 DY=AD-INT(TT/1440)
1690 IF DY=0 THEN 1715
1700 IF DY<0 THEN TI$=TI$+" -"+MID$(STR$(ABS(DY)),2):GOTO 1715
1710 TI$=TI$+" +"+MID$(STR$(ABS(DY)),2)
1715 RETURN
1717 REM ----------------UNPACK DATA & ERROR CALC------------------
1720 B1=ASC(D$(J)):IF B1=31 THEN B1=26
1721 B2=ASC(D$(J+1)):IF B2=31 THEN B2=26
1722 B3=B1:GOSUB 1726:AH=B3
1724 B3=B2:GOSUB 1726:AM=B3*2:GOTO 1734
```

```
1726 IF B3>127 THEN B3=B3-128
1728 IF B3>63 THEN B3=B3-64
1730 IF B3>31 THEN B3=B3-32
1732 RETURN
1734 AD=0:B3=B2
1736 IF B3>127 THEN AD=AD+32:B3=B3-128
1737 IF B3>63 THEN AD=AD+16:B3=B3-64
1738 IF B3>31 THEN AD=AD+8
1739 B3=B1
1740 IF B3>127 THEN AD=AD+4:B3=B3-128
1742 IF B3>63 THEN AD=AD+2:B3=B3-64
1744 IF B3>31 THEN AD=AD+1
1745 T1=TT+IN(K)*60:R2=((AD*24+AH)*60+AM)-T1
1746 IF R2>-61 THEN TB=6:RETURN
1747 ER=((AD*24+AH)*60+AM)-TT
1750 IF ER>120 THEN TB=5:GOTO 1790
1760 IF ER>60  THEN TB=4:GOTO 1790
1770 IF ER>-61 THEN TB=3:GOTO 1790
1780 IF ER>-121 THEN TB=2:GOTO 1790
1785 TB=1
1790 RETURN
1795 REM ----------------------PRINT LOCATION-------------------------
1800 LPRINT CHR$(124);RIGHT$(STR$(I),2);CHR$(124);"  ";TA$;"  ";CHR$(124);TAB(3
TB*12);TI$;TAB(70);CHR$(124)
1805 RETURN
1810 J=J+2:K=K+1:GOSUB 1820:TT=T1:GOTO 1825
1820 IF K=SN THEN K=0:Z1=I:GOSUB 1345:I=Z1
1822 RETURN
1825 NEXT I
1826 REM ---------------------------EXIT------------------------------
1830 GOSUB 1345:LPRINT CHR$(12):LPRINT CHR$(12)
1900 CLS:PRINT @165,"Unload Another Unit? (Y or N)";
1910 PRINT @195,"";:A$=INPUT$(1)
1920 IF A$="Y" THEN CLEAR:GOTO 150
1930 IF A$<>"N" THEN 1910
1940 CLEAR:MENU
2000 IF ERR = 54 THEN 2020
2005 IF ERR=5 THEN 1240
2010 PRINT ERR:PRINT ERL:STOP
```

COMPLIANCE MONITOR DEBRIEFING REPORT

```
Study I.D.#                                                  123456
Patient I.D.#                                                333333
--------------------------------------------------------------------
Monitor Serial #                                             L00000
Loaded   on: 03/23/84 @ 17:03:02
Unloaded on: 03/23/84 @ 17:11:52
--------------------------------------------------------------------
Dosage Schedule:  0300  0800  1200  1800
First Dosage:     0800
Start Day Offset:   0
Unlock Period:    T-2 Minutes
Alarm Period:     T-2 Minutes
--------------------------------------------------------------------
```

Compliance Profile:

| | | >2Hr Early | <2Hr Early | +-1 Hour | <2Hr Late | >2Hr Late |
|---|---|---|---|---|---|---|
| 1 | 0800 | | | | | 1702 |
| 2 | 1200 | | | | | 1702 |
| 3 | 1800 | | | 1704 | | |
| 4 | 0300 | 1704 -1 | | | | |
| 5 | 0800 | 1704 -1 | | | | |
| 6 | 1200 | 1706 -1 | | | | |
| 7 | 1800 | 1706 -1 | | | | |
| 8 | 0300 | 1706 -2 | | | | |
| 9 | 0800 | 1706 -2 | | | | |
| 10 | 1200 | 1708 -2 | | | | |
| 11 | 1800 | 1708 -2 | | | | |

```
!12!  0300  !    1708 -3                                                    !
!13!  0800  !    1708 -3                                                    !
!14!  1200  !    1708 -3                                                    !
!15!  1800  !    1708 -3                                                    !
-------------------------------------------------------------------------------
!16!  0300  !    1710 -4                                                    !
!17!  0800  !    1710 -4                                                    !
-------------------------------------------------------------------------------
```

What is claimed is:

1. A dispensing device comprising:

a storage compartment for storing a plurality of cylindrical containers to be dispensed one at a time in predetermined order said containers being supported along a flexible strip such that said strip intersects said containers along a diameter and such that the minimum spacing between said containers along said strip is substantially equal to one-third the circumference of a said container;

means, upon an actuation thereof, for dispensing a container from said storage compartment regardless of the positional orientation of said dispensing device;

means for storing a dispensing schedule specifying when a dispensing operation can be carried out by said dispensing means;

means for modifying a schedule stored in said storing means in response to dispensing operations of said dispensing means; and means for inhibiting operation of said dispensing means other that at time specified by said schedule, as modified.

2. A dispensing device according to claim 1 wherein said alerting means comprises an audible alarm and programming means for selecting criteria for the start and duration of an alert period.

3. A dispensing device according to claim 1 wherein said alerting means comprises a visual indicator and programming means for selecting criteria for the start and duration of an alert period.

4. A dispensing device, comprising:

storage means for storing a plurality of individual containers;

dispensing means for dispensing one container at a time from said storage means, each container being dispensed by executing an individual dispensing operation regardless of the positional orientation of said dispensing device;

said containers being supported along a flexible strip such that said strip intersects said containers along a diameter and such that the minimum spacing between said containers along said strip is substantially equal to one-third the circumference of said container;

means for maintaining a predetermined order among the individual containers along said flexible strip so that the individual containers are dispensed in said predetermined order by said dispensing means, and for providing a predetermined spacing relationship between containers so that they can be engaged by the dispensing means;

electronic memory means for storing data including instructions for operating the device;

electronic time keeping means for providing time information;

electronic logic means for interpreting and executing said instructions;

means for supplying electrical power to the time keeping means, logic means and memory means; and a housing containing said storage means, dispensing means, sequencing means, memory means, time keeping means, logic means, and power supplying means.

5. A device according to claim 4 further including means for sensing and signalling for said logic means, each completed dispensing operation of said dispensing means.

6. A device according to claim 5 further comprising second memory means for storing data, including times of actual dispensing of containers.

7. A device according to claim 6 further comprising communication means for transmitting said data from the device.

8. A device according to claim 5 wherein said sensing and signalling means comprises electrical switches activated by actuators following cams of the dispensing means.

9. A device according to claim 4 wherein said storage means includes a substantially 'U' shaped partition defining passageways having everywhere a width less than two container diameters.

10. A device according to claim 4 wherein said storage means has passageways having everywhere a width less than two container diameters.

11. A device according to claim 4 wherein said dispensing means comprises: an ejector element mounted for rotation about a longitudinal axis thereof and having container conforming depressions around its periphery, said depressions being shaped so as to engage and convey individual containers arranged in said storage means in said predetermined order; said ejector element, when rotated through a predetermined angle, causing one container to be dispensed and the next container in sequence to be moved into a position ready to be dispensed upon the next ejector rotation and inaccessible to the operator.

12. A device according to claim 11 wherein said ejector element has substantially a cross-sectional form of a square with semicircular depressions in each side of the square for engaging cylindrical-shaped containers.

13. A device according to claim 11 wherein said dispensing means further includes reverse rotation preventing means for preventing potentially harmful rotation of the ejector element in the direction opposite that used to dispense a container.

14. A device according to claim 13 wherein operation of said reverse rotation preventing means, through a common mechanism, simultaneously produces a completed dispensing operation signal.

15. A device according to claim 4 wherein said dispensing means includes a stop arrangement, operable in set and reset positions, that prevents, after each container is dispensed, further dispensing action until the stop mechanism is reset.

16. A device according to claim 15 further including means for resetting said stop mechanism by means of linkages accessible to a user.

17. A device according to claim 15 further including a solenoid and linkages for resetting said stop mechanism under control of said electronic logic means in accordance with said stored instructions thereby controlling the operator's ability to dispense containers, according to said instructions.

18. A device according to claim 17 further comprising a power source separate from said power supplying means for powering the solenoid.

19. A device according to claim 15 wherein the stop mechanism includes latching means for preventing movement of the stop mechanism out of its set or reset positions except as provided for by said instructions.

20. A device according to claim 4 further comprising audible indicating means, controlled by said logic means, for alerting a user as to when a container should be dispensed according to a predetermined schedule defined by said instructions and programming means for selecting said instructions.

21. A device according to claim 20 wherein said audible indicating means comprises a piezoelectric alarm.

22. A device according to claim 4 further comprising visual indicating means, controlled by said logic means, for prompting a user as to when a container should be dispensed according to a predetermined schedule defined by said instructions and programming means for selecting said instructions.

23. A device according to claim 22 wherein said visual indicating means comprises a liquid crystal display.

24. A device according to claim 4 wherein said flexible strip is adapted so that after it is loaded with containers, it can be folded into said storage means back and forth across a passageway thereof such that the containers may be closest packed.

25. A device according to claim 4 further comprising communicating means for receiving all or part of said instructions from a separate computer and storing them in said memory means.

26. A device according to claim 4 wherein the means for supplying electrical power comprises a battery.

27. A device according to claim 4 wherein said storage means is in a portion of said housing that is separable from the remainder of the device to facilitate the use of alternative storage means in an interchangeable manner.

28. A device according to claim 4 wherein the means for supplying electrical power comprises a connector for coupling to an external power source.

29. A device according to claim 4 wherein the housing includes a cabinet lock and tamper-resistant fasteners for preventing unauthorized access to the containers and mechanisms interior of said housing.

30. A device according to claim 4 wherein said dispensing means is driven manually.

31. A device according to claim 4 wherein said dispensing means is driven primarily by means of power not supplied by a user.

32. A dispensing system comprising:

one or more field units, each field unit including storage means storing a plurality of individual containers;

dispensing means for dispensing one container at a time from said storage means, each container being dispensed by executing an individual dispensing operation, regardless of the positional orientation of said field unit;

said containers being supported along a flexible strip such that said strip intersects said containers along a diameter and such that the minimum spacing between said containers along said strip is substantially equal to one-third the circumference of a said container;

means for maintaining a predetermined order among the individual containers along the flexible strip so that the individual containers are dispensed in said predetermined order by said dispensing means, and for providing a predetermined spacing relationship between containers so that they can be engaged by the dispensing means;

electronic memory means for storing data, including instructions for operating the device;

electronic time keeping means for providing time information;

electronic logic means for interpreting and executing said instructions;

means for communicating data to/from said field unit;

means for supplying electrical power to the time keeping means, logic means, memory and communincating means; and a housing containing said storage means, dispensing means, sequencing means, memory means, time keeping means, logic means, communicating means and power supplying means; and a base unit for transferring said data to/from said field unit and/or preparing a report of said data sent or received.

33. A system according to claim 32 wherein said field unit further includes means for sensing and signalling to said logic means, each completed dispensing operation of said dispensing means.

34. A system according to claim 32 wherein said storage means includes a substantially 'U' shaped partition defining passageway having everywhere a width less than two container diameters.

35. A system according to claim 32 wherein said storage means has passageways having everywhere a width less than two container diameters.

36. A system according to claim 32 wherein said dispensing means comprises: an ejector element mounted for rotation about a longitudinal axis thereof and having container conforming depressions around its periphery, said depressions being shaped so as to engage and convey individual containers arranged in said storage means in said predetermined order; said ejector element, when rotated through a predetermined angle, causing one container to be dispensed and the next container in sequence to be moved into a position ready to be dispensed upon the next ejector rotation and inaccessible to the operator.

37. A system according to claim 36 wherein said ejector element has substantially a cross-sectional form of a square with semicircular depressions in each side of the square for engaging cylindrical-shaped containers.

38. A system according to claim 36 wherein said dispensing means further includes reverse rotation preventing means for preventing potentially harmful rotation of the ejector element in the direction opposite that used to dispense a container.

39. A system according to claim 38 wherein operation of said reverse rotation preventing means, through a common mechanism simultaneously produces a completed dispensing operation signal.

40. A system according to claim 32 wherein said dispensing means includes a stop arrangement, operable in set and reset positions, that prevents, after each container is dispensed, further dispensing action until the stop mechanism is reset.

41. A system according to claim 40 further including means for resetting said stop mechanism by means of linkages accessible to a user.

42. A system according to claim 40 further including a solenoid and linkages for resetting said stop mechanism under control of said electronic logic means in accordance with said stored instructions thereby controlling the operator's ability to dispense containers, according to said instructions.

43. A system according to claim 42 wherein a power source separate from said power supplying means is used for powering the solenoid.

44. A system according to claim 40 wherein the stop mechanism includes latching means for preventing movement of the stop mechanism out of its set or reset positions except as provided by said instructions.

45. A system according to claim 32 further comprising audible indicating means, controlled by said logic means, for alerting a user as to when a container should be dispensed according to a predetermined schedule defined by said instructions and programming means for selecting said instructions.

46. A system according to claim 45 wherein said audible indicating means comprises a piezoelectric alarm.

47. A system according to claim 32 further comprising visual indicating means, controlled by said logic means, for prompting a user as to when a container should be dispensed according to a predetermined schedule defined by said instructions and programming means for selecting said instructions.

48. A system according to claim 47 wherein said visual indicating means comprises a liquid crystal display.

49. A system according to claim 32 wherein said flexible strip is adapted so that after it is loaded with containers, it can be folded into said storage means back and forth across a passageway thereof so that the containers may be closest packed.

50. A system according to claim 33 further comprising second memory means for storing data including times of actual dispensing of containers.

51. A system according to claim 50 wherein said communicating means transmits said data from the device to said base unit.

52. A system according to claim 51 wherein said base unit comprises a general purpose computer, specially programmed to carry out its functions of debriefing said field unit of said data including times of actual dispensing and preparing a report of actual dispensing data.

53. A system according to claim 32 wherein said communicating means receives from the base unit all or part of said instructions for storage in said memory means.

54. A system according to claim 53 wherein said base unit comprises a general purpose computer, programmed to carry out its functions of transmitting all or part of said instructions to said field unit before the field unit is used for dispensing.

55. A system according to claim 33 wherein said sensing and signalling means comprises electrical switches activated by actuators following cams of the dispensing means.

56. A system according to claim 32 wherein the means for supplying electrical power comprises a battery.

57. A system according to claim 32 wherein the means for supplying electrical power comprises a connector for coupling to an external power source.

58. A system according to claim 32 wherein said housing includes a cabinet lock and tamper-resistant fasteners for preventing unauthorized access to said containers and mechanisms interior of said housing.

59. A device according to claim 32 wherein said dispensing means is driven manually.

60. A device according to claim 32 wherein said dispensing means is driven primarily by power not supplied by a user.

61. A system according to claim 32 wherein the storage means is in a portion of the housing that is separable from the remainder of the device, such that alternative storage means, each holding containers of different capacity, may be used interchangeably.

62. A medication dispensing device, comprising:

medication storage means for storing a plurality of individual medication containers arranged in a predetermined sequence;

said medication containers being supported along a flexible strip such that said strip intersects said medication containers along a diameter and such that the minimum spacing between said medication containers along said strip is substantially equal to one-third the circumference of a said medication container;

means for storing a drug therapy schedule defining predetermined times and conditions under which medication containers should be dispensed from said medication storage means;

dispensing means for dispensing from said medication storage means, in response to a patient manipulation thereof at one of said predetermined times of said drug therapy schedule, a medication container regardless of the positional orientation of said device; and means for storing information as to the times of actual dispensing of containers for reporting patient compliance with the drug therapy schedule.

63. A device according to claim 62 further including indicator means for indicating to a patient when he should dispense a medication container and administer to himself a medication contained therein and programing means for selecting criteria for the start and duration of the indication period.

64. A device according to claim 63 wherein said indicating means comprises audible alarm means for alerting the patient when one of said predetermined times is near or has passed without a dispensing of a medication container and programming means for selecting criteria for the start and duration of an alarm period.

65. A device according to claim 64 wherein said audible alarm means comprises a piezoelectric alarm.

66. A device according to claim 63 wherein said indicator means comprises a digital display for indicating when a next dosage is due to be dispensed according to said schedule and programming means for selecting the dosing periods.

67. A device according to claim 62 wherein said dispensing means further includes means for preventing the dispensing of a container at times other than .said predetermined times of said drug therapy schedule.

68. A device according to claim 67 wherein said dispensing means comprises a locking arrangement for blocking free access to said containers; an solenoid for unlocking said locking arrangement so that the dispensing means can be manually manipulated at said predetermined times; and microprocessor means for controlling said solenoid according to said schedule.

69. A device according to claim 62 wherein said therapy schedule further includes instructions for changing the drug therapy schedule in response to a failure of the patient to dispense a medication container at one or more of said predetermined times.

70. A device according to claim 62 further comprising means for transmitting information stored in said storing means.

71. A device according to claim 62 further comprising means for communicating the drug therapy schedule to said drug schedule storage means.

72. A device according to claim 62 wherein said medication containers are vials attached to a belt.

73. A devlce according to claim 62 wherein said dispensing means comprises a sprocket mounted for rotation about a longitudinal axis thereof and having grooves therein for accommodating and conveying said containers.

74. A device according to claim 73 further comprising electrical switches coupled so as to be actuated by rotation of said sprocket, said switches providing said information as to the times of actual dispensing of containers.

75. A medication dispensing system, comprising:

a base unit for defining a drug dispensing schedule according to which a field unit is to dispense drugs, debriefing the field unit after it has dispensed drugs, and providing a report on the information debriefed; and a field unit including means for receiving drugs to be dispensed, means for receiving and storing the dispensing schedule from said base unit, means for permitting drugs to be dispensed according to said schedule, means for recording actual times of drug dispensing, and means for transmitting the recorded information to said base unit.

76. A system according to claim 73 further comprising additional field units, each of which can be operated with said base unit.

77. A system according to claim 75 wherein said base unit comprises a computer programmed to carry out its defining, debriefing and reporting functions.

78. A system according to claim 77 wherein said field unit comprises:

medication storage means for storing a plurality of individual medication containers arranged in a predetermined sequence;

said medication containers being supported along a flexible strip such that said strip intersects said medication containers along a diameter and such that the minimum spacing between said medication containers along said strip is substantially equal to one-third the circumference of a said medication container;

means for storing said dispensing schedule;

indicator means for indicating to a user when he should dispense a medication container and administer to himself a medication contained therein; and dispensing means for dispensing from said medication storage means, in response to a patient manipulation thereof at one of said predetermined times of said schedule, a medication container, regardless of the positional orientation of said field unit.

79. A system according to claim 78 wherein said dispensing means further comprises means for preventing the dispensing of a container at times other than said predetermined times of said schedule.

80. A system according to claim 79 wherein said dispensing means comprises a locking arrangement for blocking free access to said containers; a solenoid for unlocking said locking arrangement so that the dispensing means can be manually manipulated at said predetermined times; and microprocessor means for controlling said solenoid according to said schedule.

81. A system according to claim 78 wherein said field unit further comprises means for storing information as to the times of actual dispensing of containers for reporting compliance with said schedule.

82. A system according to claim 78 wherein said indicator means includes audible alarm means for alerting the user when a dispensing time is near or has passed without a dispensing of a medication container and programming means for selecting the criteria for the start and duration of an alarm period.

83. A system according to claim 82 wherein said alarm means comprises a piezoelectric alarm.

84. A system according to claim 78 wherein said field unit further includes means for changing the dispensing schedule in response to a failure of the patient to dispense a medication container at a dispensing time.

85. A system according to claim 78 wherein said medication containers are vials attached to a belt.

86. A system according to claim 78 wherein said indicator means comprises a digital display for indicating when a next dosage is due to be dispensed according to said schedule and programming means to select the dosing periods.

87. A system according to claim 78 wherein said dispensing means comprises a sprocket mounted for rotation about a longitudinal axis thereof and having grooves therein for accommodating and conveying said containers.

88. A system according to claim 87 further comprising electrical switches coupled so as to be actuated by rotation of said sprocket, said switches providing said information as to the times of actual dispensing of containers.

* * * * *